United States Patent
Ueda

(10) Patent No.: US 6,538,764 B2
(45) Date of Patent: *Mar. 25, 2003

(54) PRINTING APPARATUS, INFORMATION PROCESSING APPARATUS, DATA PROCESSING METHOD FOR USE IN SUCH AN APPARATUS, AND STORAGE MEDIUM STORING COMPUTER-READABLE PROGRAM

(75) Inventor: Shigeru Ueda, Wako (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 08/835,742

(22) Filed: Apr. 10, 1997

(65) Prior Publication Data

US 2001/0043725 A1 Nov. 22, 2001

(30) Foreign Application Priority Data

Apr. 12, 1996 (JP) .............................................. 8-091426
May 23, 1996 (JP) .............................................. 8-128480

(51) Int. Cl.⁷ .......................................... B41B 001/00
(52) U.S. Cl. .................... 358/1.16; 358/1.15; 358/1.16; 358/1.17; 358/426; 382/232
(58) Field of Search ................. 395/116, 114, 395/115, 101; 358/426, 1.15, 1.16, 1.17

(56) References Cited

U.S. PATENT DOCUMENTS

| | | | |
|---|---|---|---|
| 4,941,108 A | * 7/1990 | Aoyagi ........................ 395/112 |
| 5,084,831 A | * 1/1992 | Morikawa et al. ........... 395/116 |
| 5,136,688 A | * 8/1992 | Morikawa et al. ........... 395/115 |
| 5,185,724 A | * 2/1993 | Toda ........................... 365/234 |
| 5,229,866 A | * 7/1993 | Kashiwaga et al. ......... 358/444 |
| 5,463,476 A | * 10/1995 | Oya ............................. 358/426 |
| 5,485,568 A | * 1/1996 | Venable et al. .............. 707/500 |
| 5,535,312 A | * 7/1996 | Hammer et al. ............. 395/115 |
| 5,539,865 A | * 7/1996 | Gentile ....................... 358/1.16 |
| 5,604,846 A | * 2/1997 | Kadota ........................ 395/115 |
| 5,638,498 A | * 6/1997 | Tyler et al. ................. 358/1.18 |
| 5,699,459 A | * 12/1997 | Kawahara ................... 382/268 |
| 5,768,486 A | * 6/1998 | Sugaya ....................... 395/116 |
| 5,787,239 A | * 7/1998 | Horie et al. ................ 395/114 |
| 5,852,710 A | * 12/1998 | Shichara et al. ............ 395/115 |
| 5,991,515 A | * 11/1999 | Fall et al. ................... 358/1.15 |

* cited by examiner

Primary Examiner—Jose L. Couso
Assistant Examiner—Gregory Desire
(74) Attorney, Agent, or Firm—Fitzpatrick, Cella, Harper & Scinto

(57) ABSTRACT

Print data including text or graphics data is transferred from a host computer to a printer. The printer develops the received data on a band basis. When data processing to be performed by the printer is expected to fail due to shortage of the memory area size, the host computer cancels the data which has already been sent to the printer, and develops the text or graphics data to form image data. The image data thus formed is sent to the printer. Image data is transferred in a hierarchical manner. Disclosed also is a method which makes it possible to eliminate as much as possible any data processing failure in the printer attributable to shortage of memory capacity.

12 Claims, 25 Drawing Sheets

FIG. 3

| | |
|---|---|
| 301 | HEADER CODE (START) |
| 302 | STRAIGHT LINE SCRIBING COMMAND 201 → 202 |
| 303 | STRAIGHT LINE SCRIBING COMMAND 202 → 203 |
| 304 | STRAIGHT LINE SCRIBING COMMAND 203 → 204 |
| 305 | STRAIGHT LINE SCRIBING COMMAND 204 → 201 |
| 306 | CHARACTER START ADDRESS DESIGNATING COMMAND |
| 307 | CHARACTER FONT TYPE DESIGNATING COMMAND |
| 308 | CHARACTER FONT SIZE DESIGNATING COMMAND |
| 309 | CHARACTER CODE "A" |
| 310 | CHARACTER CODE "B" |
| 311 | CHARACTER CODE "C" |
| 312 | CHARACTER CODE "D" |
| 313 | IMAGE START ADDRESS DESIGNATING COMMAND |
| 314 | X-DIRECTION IMAGE WIDTH DESIGNATING COMMAND |
| 315 | IMAGE DATA |
| | IMAGE DATA |
| | ⋮ |
| 316 | FOOTER CODE (END) |

FIG. 4

| | | |
|---|---|---|
| 401 | BAND 221 START CODE | ⎫ |
| 402 | STRAIGHT LINE SCRIBING COMMAND 201 → 202 | ⎬ FOR BAND 221 |
| 403 | STRAIGHT LINE SCRIBING COMMAND 202 → 210 | |
| 404 | STRAIGHT LINE SCRIBING COMMAND 207 → 201 | |
| 405 | BAND 221 END CODE | ⎭ |
| 406 | BAND 222 START CODE | ⎫ |
| 407 | STRAIGHT LINE SCRIBING COMMAND 210 → 211 | |
| 408 | STRAIGHT LINE SCRIBING COMMAND 208 → 207 | |
| 409 | CHARACTER START ADDRESS DESIGNATING COMMAND | |
| 410 | CHARACTER FONT TYPE DESIGNATING COMMAND | |
| 411 | CHARACTER FONT SIZE DESIGNATING COMMAND | FOR BAND 222 |
| 412 | DEVELOP PORTION OF CHARACTER CODE "A" IN BAND 222 | |
| 413 | DEVELOP PORTION OF CHARACTER CODE "B" IN BAND 222 | |
| 414 | DEVELOP PORTION OF CHARACTER CODE "C" IN BAND 222 | |
| 415 | DEVELOP PORTION OF CHARACTER CODE "D" IN BAND 222 | |
| 416 | BAND 222 END CODE | ⎭ |
| 417 | BAND 223 START CODE | ⎫ |
| 418 | STRAIGHT LINE SCRIBING COMMAND 211 → 212 | |
| 419 | STRAIGHT LINE SCRIBING COMMAND 209 → 208 | |
| 420 | CHARACTER START ADDRESS DESIGNATING COMMAND | |
| 421 | CHARACTER FONT TYPE DESIGNATING COMMAND | |
| 422 | CHARACTER FONT SIZE DESIGNATING COMMAND | |
| 423 | DEVELOP PORTION OF CHARACTER CODE "A" IN BAND 223 | |
| 424 | DEVELOP PORTION OF CHARACTER CODE "B" IN BAND 223 | FOR BAND 223 |
| 425 | DEVELOP PORTION OF CHARACTER CODE "C" IN BAND 223 | |
| 426 | DEVELOP PORTION OF CHARACTER CODE "D" IN BAND 223 | |
| 427 | IMAGE START ADDRESS DESIGNATING COMMAND | |
| 428 | X-DIRECTION IMAGE WIDTH DESIGNATING INSTRUCTION | |
| 429 IMAGE DATA (PORTION IN BAND 223) | ⋮ | |
| 430 | BAND 223 END CODE | ⎭ |

FIG. 10

STORAGE MEDIUM SUCH AS FD/CD-ROM

| DIRECTORY INFORMATION |
|---|
| FIRST DATA PROCESSING PROGRAM, PROGRAM CODES CORRESPONDING TO STEPS OF FLOW CHART IN FIG. 5 |
| SECOND DATA PROCESSING PROGRAM, PROGRAM CODES CORRESPONDING TO STEPS OF FLOW CHART IN FIG. 7 |
| THIRD DATA PROCESSING PROGRAM, PROGRAM CODES CORRESPONDING TO STEPS OF FLOW CHART IN FIG. 8 |
| FOURTH DATA PROCESSING PROGRAM, PROGRAM CODES CORRESPONDING TO STEPS OF FLOW CHART IN FIG. 9 |

MEMORY MAP OF STORAGE MEDIUM

FIG. 16A

INPUT DATA (DOCUMENT DATA)

| | |
|---|---|
| 5001 | DESIGNATE COORDINATES (X, Y) OF POINTER |
| 5002 | CHARACTER CODE "A" |
| 5003 | DESIGNATE CHARACTER SIZE AND TYPE |
| 5004 | STRAIGHT LINE SCRIBING COMMAND |
| 5005 | DESIGNATE THICKNESS AND TYPE OF STRAIGHT LINE |
| 5006 | DESIGNATE COORDINATES OF STRAIGHT LINE START POINT |
| 5007 | DESIGNATE COORDINATES OF STRAIGHT LINE TERMINAL POINT |
| | ...... |

FIG. 16B

DISPLAY LIST

| | | |
|---|---|---|
| 5008 | START DATA FOR BAND 1001 | DISPLAY LIST FOR BAND 1001 |
| 5009 | COORDINATES OF POINTER IN BAND (FOR CHARACTER) | |
| 5010 | CHARACTER CODE "A" | |
| 5011 | DESIGNATE SIZE AND TYPE OF CHARACTER | |
| 5012 | START COORDINATES IN CHARACTER "A" (FROM HEAD) | |
| 5013 | STRAIGHT LINE SCRIBING COMMAND | |
| 5014 | DESIGNATE THICKNESS AND TYPE OF STRAIGHT LINE | |
| 5015 | DESIGNATE COORDINATES OF STRAIGHT LINE START POINT IN BAND | |
| 5016 | DESIGNATE COORDINATES OF STRAIGHT LINE TERMINAL POINT IN BAND | |
| 5017 | DATA FOR BAND 1001 END | |
| 5018 | START DATA FOR BAND 1002 | DISPLAY LIST FOR BAND 1002 |
| 5019 | COORDINATES OF POINTER IN BAND (FOR CHARACTER) | |
| 5020 | CHARACTER CODE "A" | |
| 5021 | SIZE AND TYPE OF CHARACTER | |
| 5022 | START COORDINATES IN CHARACTER "A" (FROM INTERMEDIATE PORTION) | |
| 5023 | STRAIGHT LINE COMMAND | |
| 5024 | DESIGNATE THICKNESS AND TYPE OF STRAIGHT LINE | |
| 5025 | DESIGNATE COORDINATES OF STRAIGHT LINE START POINT IN BAND | |
| 5026 | DESIGNATE STRAIGHT LINE TERMINAL POINT IN BAND | |
| 5027 | DATA FOR BAND 1002 END | |
| | ... | |

FIG. 17

| $a_1$ | $c_1$ | $a_2$ | $c_2$ | $a_3$ | $c_3$ | $a_4$ | $c_4$ |
|---|---|---|---|---|---|---|---|
| $c_5$ | $b_1$ | $c_6$ | $b_2$ | $c_7$ | $b_3$ | $c_8$ | $b_4$ |
| $a_5$ | $c_9$ | $a_6$ | $c_{10}$ | $a_7$ | $c_{11}$ | $a_8$ | $c_{12}$ |
| $c_{13}$ | $b_5$ | $c_{14}$ | $b_6$ | $c_{15}$ | $b_7$ | $c_{16}$ | $b_8$ |
| $a_9$ | $c_{17}$ | $a_{10}$ | $c_{18}$ | $a_{11}$ | $c_{19}$ | $a_{12}$ | $c_{20}$ |
| $c_{21}$ | $b_9$ | $c_{22}$ | $b_{10}$ | $c_{23}$ | $b_{11}$ | $c_{24}$ | $b_{12}$ |
| $a_{13}$ | $c_{25}$ | $a_{14}$ | $c_{26}$ | $a_{15}$ | $c_{27}$ | $a_{16}$ | $c_{28}$ |
| $c_{29}$ | $b_{13}$ | $c_{30}$ | $b_{14}$ | $c_{31}$ | $b_{15}$ | $c_{32}$ | $b_{16}$ |

FIG. 18

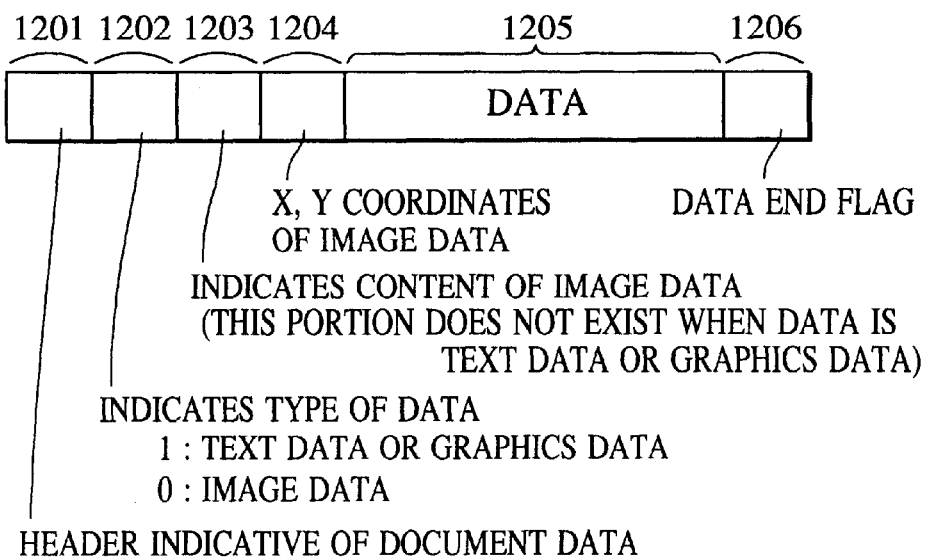

1201 1202 1203 1204 1205 1206

- 1204: X, Y COORDINATES OF IMAGE DATA
- 1206: DATA END FLAG
- 1203: INDICATES CONTENT OF IMAGE DATA (THIS PORTION DOES NOT EXIST WHEN DATA IS TEXT DATA OR GRAPHICS DATA)
- 1202: INDICATES TYPE OF DATA
  - 1 : TEXT DATA OR GRAPHICS DATA
  - 0 : IMAGE DATA
- 1201: HEADER INDICATIVE OF DOCUMENT DATA

```
00 : ALL DATA ( a + b + c )
01 : INITIAL 1/4 DATA ( a )
10 : NEXT 1/4 DATA ( b )
11 : REMAINDER 1/2 DATA ( c )
```

FIG. 19A

| $a_1$ | $b_1$ | $a_2$ | $b_2$ | $a_3$ | $b_3$ | $a_4$ | $b_4$ |
|---|---|---|---|---|---|---|---|
| $a_1$ | $b_1$ | $a_2$ | $b_2$ | $a_3$ | $b_3$ | $a_4$ | $b_4$ |
| $a_5$ | $b_5$ | $a_6$ | $b_6$ | $a_7$ | $b_7$ | $a_8$ | $b_8$ |
| $a_5$ | $b_5$ | $a_6$ | $b_6$ | $a_7$ | $b_7$ | $a_8$ | $b_8$ |
| $a_9$ | $b_9$ | $a_{10}$ | $b_{10}$ | $a_{11}$ | $b_{11}$ | $a_{12}$ | $b_{12}$ |
| $a_9$ | $b_9$ | $a_{10}$ | $b_{10}$ | $a_{11}$ | $b_{11}$ | $a_{12}$ | $b_{12}$ |
| $a_{13}$ | $b_{13}$ | $a_{14}$ | $b_{14}$ | $a_{15}$ | $b_{15}$ | $a_{16}$ | $b_{16}$ |
| $a_{13}$ | $b_{13}$ | $a_{14}$ | $b_{14}$ | $a_{15}$ | $b_{15}$ | $a_{16}$ | $b_{16}$ |

FIG. 19B

| $a_1$ | $a_1$ | $a_2$ | $a_2$ | $a_3$ | $a_3$ | $a_4$ | $a_4$ |
|---|---|---|---|---|---|---|---|
| $a_1$ | $a_1$ | $a_2$ | $a_2$ | $a_3$ | $a_3$ | $a_4$ | $a_4$ |
| $a_5$ | $a_5$ | $a_6$ | $a_6$ | $a_7$ | $a_7$ | $a_8$ | $a_8$ |
| $a_5$ | $a_5$ | $a_6$ | $a_6$ | $a_7$ | $a_7$ | $a_8$ | $a_8$ |
| $a_9$ | $a_9$ | $a_{10}$ | $a_{10}$ | $a_{11}$ | $a_{11}$ | $a_{12}$ | $a_{12}$ |
| $a_9$ | $a_9$ | $a_{10}$ | $a_{10}$ | $a_{11}$ | $a_{11}$ | $a_{12}$ | $a_{12}$ |
| $a_{13}$ | $a_{13}$ | $a_{14}$ | $a_{14}$ | $a_{15}$ | $a_{15}$ | $a_{16}$ | $a_{16}$ |
| $a_{13}$ | $a_{13}$ | $a_{14}$ | $a_{14}$ | $a_{15}$ | $a_{15}$ | $a_{16}$ | $a_{16}$ |

FIG. 26

STORAGE MEDIUM SUCH AS FD/CD-ROM

| DIRECTORY INFORMATION |
|---|
| FIRST DATA PROCESSING PROGRAM PROGRAM CODES CORRESPONDING TO STEPS IN FLOW CHARTS OF FIGS. 20 AND 21 |
| SECOND DATA PROCESSING PROGRAM PROGRAM CODES CORRESPONDING TO STEPS IN FLOW CHARTS OF FIGS. 22 TO 25 |
| ⋮ |

MEMORY MAP OF STORAGE MEDIUM

# PRINTING APPARATUS, INFORMATION PROCESSING APPARATUS, DATA PROCESSING METHOD FOR USE IN SUCH AN APPARATUS, AND STORAGE MEDIUM STORING COMPUTER-READABLE PROGRAM

BACKGROUND OF THE INVENTION

1. Field of the Invention

The present invention relates to a printing apparatus having a memory resource of a predetermined capacity and communicable capable of communicating with an information processing apparatus through a predetermined communication medium. The invention also relates to an information processing apparatus communicable capable of communicating with such a printing apparatus, as well as to a printing system which has both a printing apparatus and an information processing apparatus of the types stated above. The invention in its further aspect pertains to a data processing method for use in such a printing apparatus, information processing apparatus or a printing system having both the printing and information processing apparatuses. The invention also is concerned with a storage medium storing a computer-readable program implementing such a data processing method.

Still more particularly, the present invention relates to a printing apparatus which receives printing information from an information processing apparatus through a predetermined communication medium and which has a memory resource divided into a plurality of band areas in which the received printing information is image-developed so as to be printed, and relates also to such an information processing apparatus, as well as to a printing system which has the combination of such printing apparatus and information processing apparatus. Furthermore, the invention pertains to data processing methods which are suitable for use in such printing apparatus, information processing apparatus or printing system. The invention also is concerned with a storage medium which stores a computer-readable program to be used in such a printing system.

2. Description of the Related Arts

In general, a page printer employed in a printing system of the type specified above deals with data on page basis. To this end, the page printer has a bit map memory of a size corresponding to one page of data. Document data sent from a host computer is dot-developed on this bit map memory, and the printing is performed in accordance with the dot patterns developed on the one-page bit map.

This type of printing system is necessarily expensive, due to the use of the bit map memory, the size of which must be large enough to accommodate one-page data, at the least. Under this circumstance, a method has been proposed in which one-page size is divided into a plurality of bands, e.g., 16 bands. According to this method, the document data transmitted from a host computer is converted into intermediate codes so as to be handled on a band basis. The intermediate codes in each band are developed in a band memory having a capacity corresponding to the size of a bit map memory for one band. The printing is performed based on the dot data read from the band memory.

It will be seen that this method requires at least two band memories: namely, it is necessary to arrange such that, while dot data is being read from one band memory for printing, the other band memory receives and develops the next band of dot data.

According to this method, it is possible to optimize the memory capacity which is necessary for the purpose of processing printing information, as will be understood from comparison between FIG. 11A and FIG. 11B which show, respectively, memory resource allocation employed in the method in which the printing information is developed on a band basis and memory resource allocation employed in the method in which printing information is developed on a one-page size bit map memory.

It will be seen that, whilst the method employing a one-page size bit map memory requires a total memory capacity of 6.5 MB in order to perform printing at 600 dpi on an A-4 size sheet, as shown in FIG. 11B, the method which employs an intermediate code memory in combination with band memories requires only a small total memory capacity of 2 MB, which is less than $\frac{1}{3}$ of that necessitated in the method which uses a one-page size bit map memory.

The method employing intermediate code memory in combination with band memories, however, suffers from the following problem. In the memory resource allocation shown in FIG. 11B, the memory area of 1 MB size is allocated for intermediate codes, on an assumption that the printing is performed at 600 dpi. However, this memory area easily overflows with data when numerous intermediate codes are required due to the complexity of document data, or when the whole page is occupied by image data, which requires 4 MB at 600 dpi printing on an A-4 size sheet. Consequently, the printing apparatus fails to print. This problem would be overcome if the size of the memory area is increased, but such a solution leads to a rise of the costs of the apparatus due to use of expensive memory resources.

Another problem encountered with page printer used in conventional printing apparatus is as follows. Basically, such a printer performs printing on a page basis, so that, once the printing is started, it is not allowed to stop the printing halfway, i.e., until the printing of the page is completed. Thus, the page printer has had to be equipped with a memory of a size large enough to accommodate dot image corresponding to data of one page.

The use of a memory having a large storage capacity raises the price of the page printer. In order to obviate this problem, a method referred to as "band processing" has been proposed in which the data contained in one page is divided into a plurality of bands, while a plurality of band memories are preserved in the memory resource of the page printer. In operation, printing is performed by alternately and repeatedly using the band memories such that, while printing is performed based on dot-developed image data read from one of the band memories, the next band data is dot-developed in the other band memory.

The described band processing of printing information, however, encounters the following problem. Namely, the printing system relying upon this processing method inherently has a risk that the printing may unexpectedly fail, when the dot development cannot be finished before the delivery of data to the printer engine, due to the complexity of the document, i.e., the presence of too many characters or presence of graphics command, or when the amount of data exceeds the size of the area allocated in the memory resource for printing. In addition, the printing also fails when a large volume of image data is inputted, because the size of the memory resource of the printer is too large to accommodate such a big volume of image data.

In the meantime, the method which employs a memory for storing full one-page dot image is inevitably expensive, due to the use of such a memory having a large size. In addition, this type of method is disadvantageous in that the throughput of the printer is reduced due to the fact that development of one-page document data cannot be performed until the delivery of the whole dot data of the preceding one page to the printer engine is completed. For instance, when the page-based document data delivered to the page printer contains such a command as to cause the printer to draw a vertical line from the top to the bottom of a page, vacant areas are formed in the bit map of the memory. However, it is not allowed to develop the next page data until the vertical line data is delivered to the printer engine, despite the presence of such vacant areas.

SUMMARY OF THE INVENTION

It is an object of the present invention to overcome the above-described problems of the known arts, by providing in its first to fifteenth aspects an improved printing apparatus, an information processing apparatus, a printing system, a data processing for use in a printing apparatus or printing system, and a storage medium storing a computer-readable program.

According to the invention, printing information from a host computer as an information processing apparatus is converted into intermediate code information so as to enable printing on band basis, and the intermediate code information thus obtained are stored in a predetermined area preserved in a memory resource of a printing apparatus. When the size of the intermediate codes exceeds the size of the storage area, the intermediate code information is suitably processed so as to form a vacancy in the memory, thereby making it possible to store the entire one-page intermediate code information in the memory resource, without requiring expansion of the memory resource.

According to the first aspect of the present invention, there is provided a printing apparatus communicable with an information processing apparatus through a predetermined communication medium, comprising: first conversion means for converting page-basis printing information received from the information processing apparatus into predetermined intermediate code information, the conversion being executed on a predetermined band basis; first storage means for storing, in a first storage area of a memory resource, the intermediate code information obtained through conversion performed by the first conversion means; second conversion means for converting the intermediate code information into image data on a predetermined band basis; second storage means for storing, in a second storage area of the memory resource, a plurality of bands of the image data obtained through conversion performed by the second conversion means; first judging means for judging whether or not the intermediate code information corresponding to one page has been stored in the first storage area; and first memory control means operative based on the result of judgment conducted by the first judging means so as to cause the second conversion means to convert the intermediate code information stored in the first storage area on the predetermined band basis into image and to develop the image in the second storage area, thereby forming a vacant area in the first storage area.

In accordance with the second aspect of the present invention, the printing apparatus of the first aspect further comprises: second memory control means operative after the preservation of the vacant area by the first memory control means and operative based on the result of the judgment performed by the first judging means, so as to cause the second conversion means to convert into image the intermediate code information of a band which does not contain image data from among the bands of intermediate code information stored in the first storage area, and to develop the image into the second storage area; compression means for compressing the output information image-developed by the second memory control means into a predetermined volume, thereby generating compressed output information; and third memory control means for causing the first storage area to store the compressed output information generated by the compression means.

According to the third aspect of the present invention, there is provided an information processing apparatus communicable with a printing apparatus through a predetermined communication medium, comprising: transfer means for transferring to the printing apparatus the page printing information except for image data in the page; inquiry means for inquiring, after the data transfer performed by the transfer means, about the size of vacancy in an intermediate code information storage area preserved in a memory resource of the printing apparatus; and transfer control means for comparing the size of the image data with the size of the vacancy informed by the printing apparatus in response to the inquiry made by the inquiry means, and for controlling the size of the image data to be transferred, based on the result of the comparison.

In accordance with the fourth aspect of the present invention, the transfer control means, when judging that the size of the image data exceeds the size of vacancy, compresses the image data so as to reduce the size of the image data to be transferred.

According to a fifth aspect of the present invention, there is provided a printing apparatus communicable with an information processing apparatus through a predetermined communication medium, comprising: first conversion means for converting page-basis printing information received from the information processing apparatus into predetermined intermediate code information, the conversion being executed on a predetermined band basis; first storage means for storing, in a first storage area of a memory resource, the intermediate code information obtained through conversion performed by the first conversion means; second conversion means for converting the intermediate code information into image data on a predetermined band basis; second storage means for storing, in a second storage area of the memory resource, a plurality of bands of the image data obtained through conversion performed by the second conversion means; and informing means for informing the information processing apparatus of the size of vacancy formed in the first storage area after conversion performed by the first conversion means, in response to an inquiry made by the information processing apparatus about the vacancy size.

According to the sixth aspect of the present invention, there is provided a printing system comprising an information processing apparatus and a printing apparatus communicable with each other through a predetermined communication medium, wherein the printing apparatus comprises: first conversion means for converting page-basis printing information received from the information processing apparatus into predetermined intermediate code information, the conversion being executed a on predetermined band basis; first storage means for storing, in a first storage area of a memory resource, the intermediate code information obtained through conversion performed by the first conversion means; second conversion means for converting the intermediate code information into image data on predetermined band basis; second storage means for storing, in a second storage area of the memory resource, a plurality of bands of the image data obtained through conversion performed by the second conversion means; and informing means for informing the information processing apparatus of the size of vacancy formed in the first storage area after conversion performed by the first conversion means, in response to an inquiry made by the information processing apparatus about the vacancy size; and wherein the information processing apparatus comprises: transfer means for transferring to the printing apparatus the page printing information except for image data in the page; inquiry means for inquiring, after the data transfer performed by the transfer means, about the size of vacancy in an intermediate code information storage area preserved in the memory resource of the printing apparatus; and transfer control means for comparing the size of the image data with the size of the vacancy informed by the printing apparatus in response to the inquiry made by the inquiry means, and for controlling the size of the image data to be transferred, based on the result of the comparison.

In accordance with the seventh aspect of the present invention, the transfer control means, when judging that the size of the image data exceeds the size of vacancy, compresses the image data so as to reduce the size of the image data to be transferred.

According to the eighth aspect of the present invention, there is provided a data processing method for use in a printing apparatus communicable with an information processing apparatus through a predetermined communication medium, the method comprising: a first converting step for converting page-basis printing information received from the information processing apparatus into predetermined intermediate code information, the conversion being executed on a predetermined band basis; a first storing step for storing, in a first storage area preserved in a memory resource, the intermediate code information obtained through the conversion; a second converting step for converting the intermediate code information stored in the first storage area into image data on a predetermined band basis; a second storing step for storing, in a second storage area preserved in the memory resource, a plurality of bands of the image data obtained through the conversion performed in the second converting step; a first judging step for judging whether or not the intermediate code information corresponding to one page has been stored in the first storage area; and a third storing step conducted based on the result of judgment conducted by the first judging means, so as to cause the intermediate code information stored on the predetermined band basis in the first storage area to be developed into image in the second storage area, thereby preserving vacant area in the first storage area, and to store subsequent intermediate code data into the vacant area.

In accordance with the ninth aspect of the present invention, the data processing method of the eighth aspect further comprises: a second judging step conducted after storage of the subsequent intermediate code information in the vacant area, so as to judge whether or not the intermediate code information corresponding to one page has been stored in the first storage area; a fourth storing step conducted based on the result of the judgment performed in the second judging step, so as to develop into image the intermediate code information of a band which does not contain image data from among the bands of intermediate code information stored in the first storage area, and to store the developed image in the second storage area; a compressing step for compressing the image-developed output information into a predetermined volume, thereby generating compressed output information; and a fifth storing step for storing the compressed output information in the first storage area.

According to the tenth aspect of the present invention, there is provided a data processing method for use in a printing system comprising an information processing apparatus and a printing apparatus communicable with each other through a predetermined communication medium, the method comprising: a first transferring step for transferring first printing information formed by removing image data from one-page printing information to be transferred; a first converting step for converting, on a predetermined band basis, the first printing information received from the information processing apparatus into a predetermined intermediate code information; a first storing step for storing the intermediate code information obtained through the conversion in a first storage area preserved in a memory resource; and an informing step for informing, after the storage of the intermediate code information in the first storage area, the information processing apparatus of the size of vacancy in the first storage area, in response to an inquiry given by the information processing apparatus.

In accordance with the eleventh aspect of the present invention, the data processing method further comprises: judging step for comparing the size of the image data to be transmitted with the size of vacancy informed by the printing apparatus; reducing step for reducing the size of the image data to be transferred based on the result of the judgment; and a second transferring step for transferring the reduced image data to the printing apparatus.

According to the twelfth aspect of the present invention, there is provided storage medium storing a computer-readable program which comprises: a first converting step for converting page-basis printing information received from an information processing apparatus into predetermined intermediate code information, the conversion being executed on a predetermined band basis; a first storing step for storing, in a first storage area preserved in a memory resource, the intermediate code information obtained through the conversion; a second converting step for converting the intermediate code information stored in the first storage area into image data on a predetermined band basis; a second storing step for storing, in a second storage area preserved in the memory resource, a plurality of bands of the image data obtained through the conversion performed in the second converting step; a first judging step for judging whether or not the intermediate code information corresponding to one page has been stored in the first storage area; and a third storing step conducted based on the result of judgment conducted by the first judging means, so as to cause the intermediate code information stored on the predetermined band basis in the first storage area to be developed into image in the second storage area, thereby preserving vacant area in the first storage area, and to store subsequent intermediate code data into the vacant area.

According to the thirteenth aspect of the present invention, there is provided a storage medium storing a computer-readable program, wherein the computer-readable program further comprises: a second judging step conducted after storage of the subsequent intermediate code information in the vacant area, so as to judge whether or not the intermediate code information corresponding to one page has been stored in the first storage area; a fourth storing step conducted based on the result of the judgment performed in the second judging step, so as to develop into image the intermediate code information of a band which does not contain image data from among the bands of intermediate code information stored in the first storage area, and to store the developed image in the second storage area; a compressing step for compressing the image-developed output information into a predetermined volume, thereby generating compressed output information; and a fifth storing step for storing the compressed output information in the first storage area.

According to the fourteenth aspect of the present invention, there is provided a storage medium storing a computer-readable program, the computer-readable program comprising: a first transferring step for transferring first printing information formed by removing image data from one-page printing information to be transferred; a first converting step for converting, on a predetermined band basis, the first printing information received from the information processing apparatus into a predetermined intermediate code information; a first storing step for storing the intermediate code information obtained through the conversion in a first storage area preserved in a memory resource; and an informing step for informing, after the storage of the intermediate code information in the first storage area, the information processing apparatus of the size of vacancy in the first storage area, in response to an inquiry given by the information processing apparatus.

According to the fifteenth aspect of the present invention, there is provided a storage medium storing a computer-readable program according to claim 14, wherein the computer-readable program further comprises: judging step for comparing the size of the image data to be transmitted with the size of vacancy informed by the printing apparatus; a reducing step for reducing the size of the image data to be transferred based on the result of the judgment; and a second transferring step for transferring the reduced image data to the printing apparatus.

It is also an object of the present invention to provide, in its sixteenth to thirty-ninth aspects, an improved printing apparatus, an information processing apparatus, a printing system, a data processing for use in a printing apparatus or printing system, and a storage medium storing a computer-readable program. According to these aspects of the invention, when the printing information transferred from a host computer as an information processing apparatus cannot be processed due to restriction in the size of the printing information area allocated in a printer memory resource, the printing information is developed into image data by the information processing apparatus, not by the printing apparatus, and the thus developed image data is transferred to the printing apparatus, whereby printing information which otherwise may fail to be printed due to restriction in the memory resource allocation can be printed as much as possible. At the same time, in these aspects of the invention, image data from a host computer as the information processing apparatus is transferred to a printer in a stepped manner depending on the size of the image data. When the total image data size exceeds the size of the image area allocated in the printer memory resource, the printer performs restoration of the original image data based on the amount of the image data which has already been received by the printer. The printer then performs printing of the restored image data, whereby the original image data can be processed at high image quality as possible, even when the total size of the image data exceeds the size of the image area allocated in the memory resource.

More specifically, according to a sixteenth aspect of the present invention, there is provided an information processing apparatus capable of performing, through a predetermined communication medium, band communication with a printing apparatus having a memory resource divided to provide band areas each of which being capable of developing an image therein, the information processing apparatus comprising: developing means for acquiring memory resource use status information delivered by the printing apparatus and for developing printing information which has been transferred to the printing apparatus into image data of a form which can be outputted by the printing apparatus; and transfer control means for transferring the image data developed by the developing means to the printing apparatus.

In accordance with the seventeenth aspect of the present invention, the information processing apparatus of the sixteenth aspect further comprises: data processing means for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby generating transfer data to be transferred by the transfer control means.

In accordance with the eighteenth aspect of the present invention, the transfer control means transfers the image data in a dividing manner in a plurality of transfer cycles.

In accordance with the nineteenth aspect of the present invention, the transfer control means suspends the transfer of image data to the printing apparatus, depending on the memory resource use status acquired from the printing apparatus during the dividing transfer of the image data.

In accordance with the twentieth aspect of the present invention, the data processing means extracts non-overlapping pixel data in a stepping manner from the image data and generates the transfer data based on the extracted pixel data.

According to the twenty-first aspect of the present invention, there is provided a printing apparatus communicable with an information processing apparatus through a predetermined communication medium, comprising: first storage means for dividing printing information received from the information processing apparatus into a plurality of bands of data and for storing the bands of data; and first informing means for informing the information processing apparatus of the status of use of the first storage means.

According to the twenty-second aspect of the present invention, there is provided a printing apparatus communicable with an information processing apparatus through a predetermined communication medium, comprising: compression means for compressing, in accordance with a predetermined compression protocol, image data received from the information processing apparatus; second storage means for storing the compressed image data formed by the compression means; expansion means for expanding, in accordance with a predetermined expansion protocol, the compressed image data stored in the second storage means; and printing means for printing the image data which has been expanded by the expansion means.

In accordance with the third aspect of the present invention, the printing apparatus further comprises second informing means for informing the information processing apparatus of the status of use of the second storage means.

In accordance with the twenty-fourth aspect of the present invention, the printing apparatus further comprises: interpolation means for judging the state of development of the compressed image in the second storage means and for conducting a predetermined interpolation processing on the image data expanded by the expansion means, thereby restoring the image data.

According to a twenty-fifth aspect of the present invention, there is provided a printing system comprising an information processing apparatus and a printing apparatus having a memory resource divided to provide band areas each of which being capable of developing an image therein, the information processing apparatus and the printing apparatus being capable of band-communicating with each other through a predetermined communication medium, wherein the information processing apparatus comprises: developing means for acquiring memory resource use status information delivered by the printing apparatus and for developing printing information which has been transferred to the printing apparatus into image data of a form which can be outputted by the printing apparatus; and transfer control means for transferring the image data developed by the developing means to the printing apparatus; and wherein the printing apparatus comprises: first storage means for dividing printing information received from the information processing apparatus into a plurality of bands of data and for storing the bands of data; first informing means for informing the information processing apparatus of the status of use of the first storage means; compression means for compressing, in accordance with a predetermined compression protocol, image data received from the information processing apparatus; second storage means for storing the compressed image data formed by the compression means; expansion means for expanding, in accordance with a predetermined expansion protocol, the compressed image data stored in the second storage means; and printing means for printing the image data which has been expanded by the expansion means.

In accordance with the twenty-sixth aspect of the present invention, the information processing apparatus comprises: data processing means for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby generating transfer data to be transferred by the transfer control means.

In accordance with the twenty-seventh aspect of the present invention, the transfer control means transfers the image data in a dividing manner in a plurality of transfer cycles.

In accordance with the twenty-eighth aspect of the present invention, the transfer control means suspends the transfer of image data to the printing apparatus, depending on the memory resource use status acquired from the printing apparatus during the dividing transfer of the image data, while the printing apparatus further comprises second informing means for informing the information processing apparatus of the status of use of the second storage means.

In accordance with the twenty-ninth aspect of the present invention, the data processing means extracts non-overlapping pixel data in a stepping manner from the image data and generates the transfer data based on the extracted pixel data, while the printing apparatus further comprises interpolation means for judging the state of development of the compressed image in the second storage means and for conducting a predetermined interpolation processing on the image data expanded by the expansion means, thereby restoring the image data.

According to the thirtieth aspect of the present invention, there is provided a data processing method for use in an information processing apparatus capable of performing, through a predetermined communication medium, band communication with a printing apparatus having a memory resource divided to provide band areas each of which being capable of developing an image therein, the method comprising: a developing step for acquiring memory resource use status information delivered by the printing apparatus and for developing printing information which has been transferred to the printing apparatus into image data of a form which can be outputted by the printing apparatus; and a first transferring step for transferring the image data developed by the developing means to the printing apparatus.

In accordance with the thirty-first aspect of the present invention, the data processing method further comprises: a data processing step for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby generating transfer data to be transferred; and a second transferring step for transferring the transfer data in a dividing manner in a plurality of transfer cycles.

According to the thirty-second aspect of the present invention, there is provided a data processing method for use in printing apparatus communicable with an information processing apparatus through a predetermined communication medium, the method comprising: first storing step for dividing printing information received from the information processing apparatus into a plurality of bands of data and for storing the bands of data in first storage means; and first informing step for informing the information processing apparatus of the status of use of the first storage means.

According to the thirty-third aspect of the present invention, there is provided a data processing method for use in printing apparatus communicable with an information processing apparatus through a predetermined communication medium, the method comprising: a compressing step for compressing, in accordance with a predetermined compression protocol, image data received from the information processing apparatus; a second storing step for storing the compressed image data formed in the compressing step in a second storage means; a second informing step for informing the information processing apparatus of the status of use of the second storage means; an expanding step for expanding, in accordance with a predetermined expansion protocol, the compressed image data stored in the second storage means; and a printing step for printing the image data which has been expanded by the expansion means.

In accordance with the thirty-fourth aspect of the present invention, the data processing method further comprises an interpolating step for judging the state of development of the compressed image in the second storage means and for conducting a predetermined interpolation processing on the image data expanded by the expansion means, thereby restoring the image data.

According to the thirty-fifth aspect of the present invention, there is provided a storage medium storing a computer-readable program, the computer-readable program comprising: a developing step for acquiring memory resource use status information delivered by the printing apparatus and for developing printing information which has been transferred to the printing apparatus into image data of a form which can be outputted by the printing apparatus; and a first transfer step for transferring the image data developed by the developing means to the printing apparatus.

In accordance with the thirty-sixth aspect of the present invention, the computer-readable program further comprises: a data processing step for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby forming transfer data to be transferred; and a second transferring step for transferring the transfer data in a dividing manner in a plurality of transfer cycles.

In accordance with the thirty-seventh aspect of the present invention, the computer-readable program further comprises: first storing step for dividing printing information received from the information processing apparatus into a plurality of bands of data and for storing the bands of data in first storage means; and first informing step for informing the information processing apparatus of the status of use of the first storage means.

According to the thirty-eighth aspect of the present invention, there is provided a storage medium storing a computer-readable program, wherein the program comprises: a compressing step for compressing, in accordance with a predetermined compression protocol, image data received from the information processing apparatus; a second storing step for storing the compressed image data formed in the compressing step in a second storage means; a second informing step for informing the information processing apparatus of the status of use of the second storage means; an expanding step for expanding, in accordance with a predetermined expansion protocol, the compressed image data stored in the second storage means; and a printing step for printing the image data which has been expanded by the expansion means.

In accordance with the thirty-ninth aspect of the present invention, the computer-readable program further comprises an interpolating step for judging the state of development of the compressed image in the second storage means and for conducting a predetermined interpolation processing on the image data expanded by the expansion means, thereby restoring the image data.

As described at the beginning, in the printing apparatus in accordance with the first aspect of the present invention, the first judging means judges whether or not the intermediate code information corresponding to one page has been stored in the first storage area, while the first memory control means operative based on the result of judgment conducted by the first judging means so as to cause the second conversion means to convert the intermediate code information stored in the first storage area on the predetermined band basis into image and to develop the image in the second storage area, thereby forming a vacant area in the first storage area. Therefore, even when the printing information received from the information processing apparatus is too large to be stored in the first storage area allocated in the memory resource, the whole one-page printing information from the information processing apparatus can be received and stored in the form of intermediate code information by making an effective use of the second storage area.

According to the second aspect of the invention, after the preservation of the vacant area by the first memory control means, the second memory control means operates based on the result of the judgment performed by the first judging means, so as to cause the second conversion means to convert into image the intermediate code information of a band which does not contain image data from among the bands of intermediate code information stored in the first storage area, and to develop the image into the second storage area. Then, the compression means compresses the image-developed output information into a predetermined volume, thereby generating compressed output information. Then, the third memory control means for causes the first storage area to store the compressed output information generated by the compression means. In operation, the intermediate code information of the bands stored in the first storage area is image-developed through the second storage area and again stored in the first storage area. If full one-page intermediate code information cannot be stored in the first storage area despite such a technique, the compression means operates to compress the image-developed output information, so that full one-page printing information can be stored in the form of combination of predetermined intermediate codes and image data.

According to the third aspect, after the transfer to the printing apparatus of page printing information except for image data in the page performed by the transfer means, the inquiry means inquires about the size of vacancy in an intermediate code information storage area preserved in a memory resource of the printing apparatus. Then, the transfer control means compares the size of the image data with the size of the vacancy informed by the printing apparatus in response to the inquiry made by the inquiry means, and controls the size of the image data to be transferred, based on the result of the comparison. It is therefore possible to control the size of the image data to be transferred, in accordance with the size of the vacancy in the memory resource of the printing apparatus, in advance of the transfer.

According to the fourth aspect, the transfer control means, when judging that the size of the image data exceeds the size of vacancy, compresses the image data so as to reduce the size of the image data to be transferred. It is therefore possible to store the transferred image data without fail in the limited area of vacancy in the memory resource.

According to the fifth aspect, the informing means informs the information processing apparatus of the size of vacancy formed in the first storage area after conversion performed by the first conversion means, in response to an inquiry made by the information processing apparatus about the vacancy size. The information processing apparatus, therefore, can know the size of the vacancy in the first storage area which stores the intermediate code information corresponding to the printing information other than image data.

According to the sixth aspect, the informing means informs the information processing apparatus of the size of vacancy formed, in the first storage area after conversion performed by the first conversion means, in response to an inquiry made by the information processing apparatus about the vacancy size, so that the information processing apparatus can know the size of the vacancy in the first storage area which stores the intermediate code information corresponding to the printing information other than image data. Meanwhile, the transfer control means, when it is judged that the size of the vacancy is exceeded by the size of the image data, operates to adjust the size of the image data to be transferred. It is therefore possible to store the image data without fail, even when the size of the vacant area formed in the memory resource of the printing apparatus is limited.

According to the seventh aspect, the transfer control means, when it is judged that the size of the vacancy is exceeded by the size of the image data, operates to compress the image data to a predetermined size, thus reducing the size of the image data to be transferred. It is therefore possible to store the image data without fail, even when the size of the vacant area formed in the memory resource of the printing apparatus is limited.

According to the eighth aspect, a judgment is conducted as to whether or not the intermediate code information corresponding to one page has been stored in the first storage area and, thereafter, a step is executed based on the result of judgment, so as to cause the intermediate code information stored on the predetermined band basis in the first storage area to be developed into image in the second storage area, thereby preserving vacant area in the first storage area, whereby the subsequent intermediate code data can be stored in the vacant area formed in the first storage area. Therefore, even if the size of the received one-page printing information is too large to be stored in the first storage area, it is possible to store full one-page printing information in the form of intermediate code information, by making use of the second storage area preserved in the memory resource.

According to ninth aspect, after storage of the subsequent intermediate code information in the vacant area, judgment is conducted as to whether or not the intermediate code information corresponding to one page has been stored in the first storage area. Then, based on the result of the judgment, the intermediate code information of a band which does not contain image data, from among the bands of intermediate code information stored in the first storage area, is image-developed and stored in the second storage area. The image-developed output information is then compressed into a predetermined volume, whereby compressed output information is produced. The compressed output information is then stored in the first storage area. In operation, the intermediate code information of the bands stored in the first storage area is image-developed through the second storage area and again stored in the first storage area. If full one-page intermediate code information cannot be stored in the first storage area despite such a technique, the compression means operates to compress the image-developed output information, so that full one-page printing information can be stored in the form of combination of predetermined intermediate codes and image data.

According to the tenth aspect, a first transferring step is executed for transferring first printing information formed by removing image data from one-page printing information to be transferred, followed by execution of a first converting step for converting, on a predetermined band basis, the first printing information received from the information processing apparatus into a predetermined intermediate code information. The intermediate code information obtained through the conversion is stored in the first storage area preserved in the memory resource. After the storage of the intermediate code information in the first storage area, the information processing apparatus is informed of the size of vacancy in the first storage area, in response to an inquiry given by the information processing apparatus. Therefore, the information processing apparatus can know the size of the vacant space in the first storage area which stores the intermediate code information corresponding to the printing information other than the image data.

According to the eleventh aspect, a judging step is executed to compare the size of the image data to be transmitted with the size of vacancy informed by the printing apparatus, followed by the reducing step for reducing the size of the image data to be transferred based on the result of the judgment. The image data of the thus reduced size is transferred to the printing apparatus. It is therefore possible to store without fail the transferred image data even when the vacant area formed in the memory resource of the printing apparatus is limited.

According to the twelfth aspect, a storage medium stores a program which includes a step of performing a judgment as to whether or not the intermediate code information corresponding to one page has been stored in the first storage area, and a subsequent step conducted based on the result of judgment conducted by the first judging means so as to cause the intermediate code information stored on the predetermined band basis in the first storage area to be developed into image in the second storage area, thereby preserving vacant area in the first storage area, and to store subsequent intermediate code data into the vacant area. When this program is executed by a computer loaded with this storage medium, printing information of one page from the information processing apparatus can be stored in the form of intermediate code information by making effective use of the second storage area in the memory resource.

According to the thirteenth aspect, a storage medium stores a program which has the steps of: judging, after storage of the subsequent intermediate code information in the vacant area, whether or not the intermediate code information corresponding to one page has been stored in the first storage area; developing, based on the result of the judgment performed in the second judging step, into image the intermediate code information of a band which does not contain image data from among the bands of intermediate code information stored in the first storage area, and to store the developed image in the second storage area; compressing the image-developed output information into a predetermined volume, thereby generating compressed output information; and storing the compressed output information in the first storage area. This storage medium is loaded on a computer so as to be read and executed by the computer. In operation, the intermediate code information of the bands stored in the first storage area is image-developed through the second storage area and again stored in the first storage area. Even in the event that full one-page intermediate code information cannot be stored in the first storage area despite such a technique, the computer-readable program operates to compress the image-developed output information, so that full one-page printing information can safely be stored in the form of combination of predetermined intermediate codes and image data.

According to the fourteenth aspect, a storage medium stores a computer-readable program for executing steps of transferring first printing information formed by removing image data from one-page printing information to be transferred, converting, on a predetermined band basis, the first printing information received from the information processing apparatus into a predetermined intermediate code information, storing the intermediate code information obtained through the conversion in a first storage area preserved in a memory resource, and informing, after the storage of the intermediate code information in the first storage area, the information processing apparatus of the size of vacancy in the first storage area, in response to an inquiry given by the information processing apparatus. The program is read and executed by a computer loaded with this storage medium, so that the information processing apparatus can know the size of the vacant area available in the first storage area which stores intermediate code information corresponding to the printing information other than the image data.

According to the fifteenth aspect, a storage medium stores a computer-readable program which executes the steps of comparing the size of the image data to be transmitted with the size of vacancy informed by the printing apparatus, reducing the size of the image data to be transferred based on the result of the judgment, and a second transferring step for transferring the reduced image data to the printing apparatus. This program is read and executed by a computer loaded with the storage medium, so that the image data to be transferred is safely received and stored even in a limited area of vacancy available in the memory resource.

Thus, according to the first to fifteenth aspect of the present invention, it is possible to eliminate any unexpected-printing failure attributable to overflow of the memory without requiring expansion of the memory resource, thus ensuring safe printing of printing information sent form a host apparatus, despite any complexity of information.

According to the sixteenth aspect of the present invention, the developing means acquires memory resource use status information delivered by the printing apparatus and develops printing information which has been transferred to the printing apparatus into image data of a form which can be outputted by the printing apparatus. The transfer control means transfers the image data developed by the developing means again to the printing apparatus. Therefore, when the printing information transferred from the information processing apparatus cannot be processed due to restriction in the printing information storage area allocated in the memory resource of the printing apparatus, the printing information is developed into image data by the information processing apparatus before the transfer to the printing apparatus. Thus, the printing apparatus receives the printing information in the form of image data, so that it can directly and safely print the printing information, even if the original printing information cannot be processed due to restriction in the storage area allocated in the memory resource.

According to the seventeenth aspect, data processing means acquires information concerning development area size allocated in the memory resource of the printing apparatus, and compares based on the acquired information the image data development area size with the total size of the image data to be transferred. The data processing means then adjusts the size of the image data to be transferred to the printing apparatus based on the result of the comparison, thereby generating transfer data to be transferred by the transfer control means. Thus, when the size of the image data from the information processing apparatus exceeds the size of the image storage area allocated in the memory resource of the printing apparatus, the image data size is adjusted so that the image data can safely be stored in the image data area allocated in the memory resource of the printing apparatus, before the image data is transferred to the printing apparatus.

According to the eighteenth aspect, the transfer control means transfers the image data in a dividing manner in a plurality of transfer cycles. Therefore, when the size of the image data from the information processing apparatus exceeds the size of the image area allocated in the memory resource of the printing apparatus, the image data to be transferred to the printing apparatus is adjusted by being divided so a to be transferred in a plurality of cycles. Therefore, the printing apparatus can receive image data which can restore the whole original image data, without causing overflow of the image storage area allocated for the memory resource.

According to nineteenth aspect, the transfer control means suspends the transfer of image data to the printing apparatus, depending on the memory resource use status acquired from the printing apparatus during the dividing transfer of the image data. Therefore, the transfer of the image data to the printing apparatus is suspended whenever the size of the image data to be transferred from the information processing apparatus exceeds the size of the image storage area allocated in the memory resource of the printing apparatus. It is thus possible to prevent overflow of the image storage area in the memory resource which otherwise may occur due to transfer of excessively large size of image data to the printing apparatus.

According to the twentieth aspect, the data processing means extracts non-overlapping pixel data in a stepping manner from the image data and generates the transfer data based on the extracted pixel data. It is therefore possible to transfer image data which can restore the whole image to the printing apparatus in a stepped manner, while avoiding overlapping, without causing the image storage area allocated in the memory resource of the printing apparatus to overflow with the image data coming from the information processing apparatus. Consequently, it is possible to transfer image data which can approximate the whole image as much as possible, without causing overflow of the image storage area.

According to the twenty-first aspect, a first storage means divides printing information received from the information processing apparatus into a plurality of bands of data and stores the bands of data therein, and the first informing means informs the information processing apparatus of the status of use of the first storage means. Therefore, the information processing apparatus is informed of any risk of printing information processing failure which may occur due to restriction in the size of the storage area allocated in the memory resource of the printing apparatus. Namely, the information processing apparatus can know, in advance of completion of the transfer of the printing information, the risk of overflow of the storage area allocated in the memory resource.

According to the twenty-second aspect, the compression means compresses, in accordance with a predetermined compression protocol, image data received from the information processing apparatus. The second storage means stores the compressed image data formed by the compression means. The expansion means expands, in accordance with a predetermined expansion protocol, the compressed image data stored in the second storage means. The printing means then prints the image data which has been expanded by the expansion means. Thus, the image data is compressed so as to be safely stored in the image storage area allocated in the memory resource, so that the whole image can be printed at high degree of quality as possible.

According to the twenty-third aspect, the second informing means informs the information processing apparatus of the status of use of the second storage means. A host computer, therefore, can know that the amount of the image data transferred from the information processing apparatus has exceeded the size of the image storage area allocated in the memory resource.

According to the twenty-fourth aspect, the interpolation means judges the state of development of the compressed image in the second storage means and conducts a predetermined interpolation processing on the image data expanded by the expansion means, thereby restoring the image data. Therefore, in the case where the size of the image data transferred from the information processing apparatus exceeds the size of the image storage area allocated in the memory resource, the printing apparatus restores the original image data based on the amount of the data which already has been received, and performs the printing based on the thus restored image data. It is therefore possible to print the whole image data with high degree of quality as possible, based on the image data which already has been received, even when the total size of the image data to be transferred exceeds the size of the image area allocated in the memory resource.

According to the twenty-fifth aspect, when the use status information concerning the state of use of the memory resource, i.e., the first storage means, is received from the printing apparatus by means of the first informing means during transfer of the printing information, the transfer control means transfers the image data developed by the developing means to the printing apparatus. The directly printable image data is compressed by the compression means and stored in the memory resource, i.e., the second storage means. The compressed data is then expanded by the expanded means and printed by the printing apparatus. Thus, the state of use of the memory resource of the printing apparatus is monitored and, when there is a risk that the printing information to be sent to the printing apparatus may cause an overflow of the storage area allocated in the memory resource, the printing information is directly received from the information processing apparatus in the form of printable image data, and is compressed so as not to cause overflow of the memory. The compressed data is then expended and printed without fail.

According to the twenty-sixth aspect, the data processing means acquires information concerning image data development area size allocated in the memory resource of the printing apparatus, compares based on the acquired information the image data development area size with the total size of the image data to be transferred, and adjusts the size of the image data to be transferred to the printing apparatus based on the result of the comparison, thereby generating transfer data to be transferred by the transfer control means. In the event that the size of the image data to be transferred from the information processing apparatus exceeds the size of the image area allocated in the memory resource of the printing apparatus, the size of the image data to be transferred is adjusted to a size which can be accommodated by the image storage area allocated in the memory resource. The image data of the thus adjusted size is transferred to and printed by the printing apparatus.

According to the twenty-seventh aspect, the transfer control means transfers the image data in a dividing manner in a plurality of transfer cycles. Therefore, when the size of the image data from the information processing apparatus exceeds the size of the image area allocated in the memory resource of the printing apparatus, the image data to be transferred to the printing apparatus is adjusted by being divided so a to be transferred in a plurality of cycles. Therefore, the printing apparatus can receive image data which can restore the whole original image data, without causing overflow of the image storage area allocated for the memory resource.

According to the twenty-eighth aspect, the transfer control means suspends the transfer of image data to the printing apparatus, depending on the information concerning the status of use of the memory resource, i.e., the first storage means, acquired from the printing apparatus during the dividing transfer of the image data. Therefore, the printing apparatus gives a clear indication of any risk that the size of the image storage area allocated in memory resource is going to be exceeded by the size of the image data transferred from the information processing apparatus, and, upon receipt of such indication, the information processing apparatus can suspend the transfer of the image data to the printing apparatus. It is therefore possible to avoid transfer of image data to the printing apparatus in excess of the size of the image area allocated in the memory resource.

According to the twenty-ninth aspect, the data processing means extracts non-overlapping pixel data in a stepping manner from the image data and generates the transfer data based on the extracted pixel data, and the transfer data thus generated is transferred to the printing apparatus by the operation of the transfer control means. The printing apparatus then compresses the received image data and stores the compressed image data in the second storage means. Then, the interpolation means judges the state of development of the compressed image in the second storage means and conducts a predetermined interpolation processing on the image data expanded by the expansion means, thereby restoring the image data. It is therefore possible to supply, stepwise and in a non-overlapping manner, the printing apparatus with the image data which can produce the whole image, without causing the image storage area allocated in the memory resource of the printing apparatus to overflow with the image data supplied by the information processing apparatus. The printing apparatus thus restores the original image data by interpolation based on the image data which already has been received. It is therefore possible to transfer to the printing apparatus image data which can approximate the whole image as much as possible, without causing overflow of the image storage area allocated in the memory resource, whereby printing can be performed at high degree of quality as possible.

According to the thirtieth and thirty-fifth aspect, there is provided a data processing method for use in an information processing apparatus capable of performing, through a predetermined communication medium, band communication with a printing apparatus having a memory resource divided to provide band areas each of which being capable of developing an image therein. In this method, memory resource use status information is acquired from the printing apparatus and, based on this information, the printing information which has been transferred to the printing apparatus is developed into image data of a form which can be outputted by the printing apparatus. The thus-developed image data is sent again to the printing apparatus. According to this method, even when the processing of the printing information transferred from the information processing apparatus is failed due to restriction in the printing information storage area allocated in the memory resource, printing can be performed safely because the printing information is developed by the developing means of the information processing apparatus into image data which is then transferred to the printing apparatus.

According to the thirty-first and thirty-fifth aspects, the data processing method has the steps of acquiring information concerning image data development area size allocated in the memory resource of the printing apparatus, comparing based on the acquired information the image data development area size with the total size of the image data to be transferred, adjusting the size of the image data to be transferred to the printing apparatus based on the result of the comparison, thereby generating transfer data to be transferred, and transferring the transfer data in a dividing manner in a plurality of transfer cycles. It is therefore possible to transfer the image data as much as possible to the printing apparatus, even when the size of the image data exceeds the size of the image storage area allocated in the memory resource.

According to the thirty-second and thirty-seventh aspects, there is provided a data processing method for use in printing apparatus communicable with an information processing apparatus through a predetermined communication medium, wherein the printing information received from the information processing apparatus is divided into a plurality of bands of data and the bands of data thus obtained are stored in first storage means. At the same time, the information processing apparatus is informed of the status of use of the first storage means. Thus, the information processing apparatus is informed of any risk that the processing of the printing information transferred from the information processing apparatus may fail due to restriction in the printing information storage area allocated in the memory resource of the printing apparatus. Thus, the information processing apparatus can know, in advance of the completion of transfer of the printing information, that the storage area allocated in the memory resource will overflow with the printing information.

According to the thirty-third and thirty-eighth aspects, there is provided a data processing method for use in printing apparatus communicable with an information processing apparatus through a predetermined communication medium, wherein the image data received from the information processing apparatus is compressed in accordance with a predetermined compression protocol, and the thus compressed image data is stored in the second storage means. The information processing apparatus is informed of the status of use of the second storage means. In accordance with the state of use of the second storage means, the compressed image data is expanded in accordance with a predetermined protocol, and the thus expanded image data is printed. Thus, the image data which has already been stored in the printing apparatus is stored in compressed state, so that the whole image can be printed at high quality as possible, even when the size of the image data transferred stepwise from the information processing apparatus to the printing apparatus exceeds the image storage area allocated in the memory resource of the printing apparatus.

According to the thirty-fourth and thirty-ninth aspects, the interpolation means judges the state of development of the compressed image in the second storage means and conducts a predetermined interpolation processing on the image data expanded by the expansion means, thereby restoring the image data. Therefore, in the case where the size of the image data transferred stepwise from the information processing apparatus to the printing apparatus exceeds the size of the image storage area allocated in the memory resource, the printing apparatus restores the original image data based on the amount of the data which already has been received, and performs the printing based on the thus restored image data. It is therefore possible to print the whole image data with high degree of quality as possible, based on the image data which already has been received, even when the total size of the image data to be transferred exceeds the size of the image area allocated in the memory resource.

Thus, when the processing of the printing information transferred from the host computer fails due to restriction in the printing information storage area allocated in the memory resource of the printer, the printing information is developed into image data by the host computer and thus developed image data is transferred to the printer, whereby the printing can be performed as much as possible. Furthermore, the image data is transferred in a stepped manner in accordance with the size of the image data to be transferred from the host computer and, when the size of the image data exceeds the size of the image storage area allocated in the printer memory resource, the printer restores the original image data based on the image data which already has been transferred to the printer. It is therefore possible to print the whole image at high degree of quality as possible, even when the size of the image data exceeds the size of the image storage area allocated in the memory resource.

The above and other objects, features and advantages of the present invention will become clear from the following description of the invention and statements of claims with reference to the accompanying drawings.

BRIEF DESCRIPTION OF THE DRAWINGS

FIG. 3 is an illustration of an example of the data structure of the printing information shown in FIG. 2;

FIG. 4 is an illustration of the data structure of an intermediate code corresponding to the printing information shown in FIG. 3;

FIG. 10 is an illustration of a memory map of a recording medium storing various computer-readable data processing programs for use in a printing system in accordance with the present invention;

FIG. 16 is an illustration of the detail of the printing data shown in FIG. 14;

FIG. 17 is an illustration of image data which is printable by the printing system shown in FIG. 12;

FIG. 18 is an illustration of a document data format sent from the host computer to the printer in the system shown in FIG. 12;

FIG. 19 is a schematic illustration of restoration of an original dot data from a plurality of groups of dot data obtained by dividing the image data shown in FIG. 17;

FIG. 26 is an illustration of a memory map in storage medium which stores various computer-readable data processing program s used in the printing system of the present invention.

DESCRIPTION OF THE PREFERRED EMBODIMENTS

First Embodiment

Figure 1:
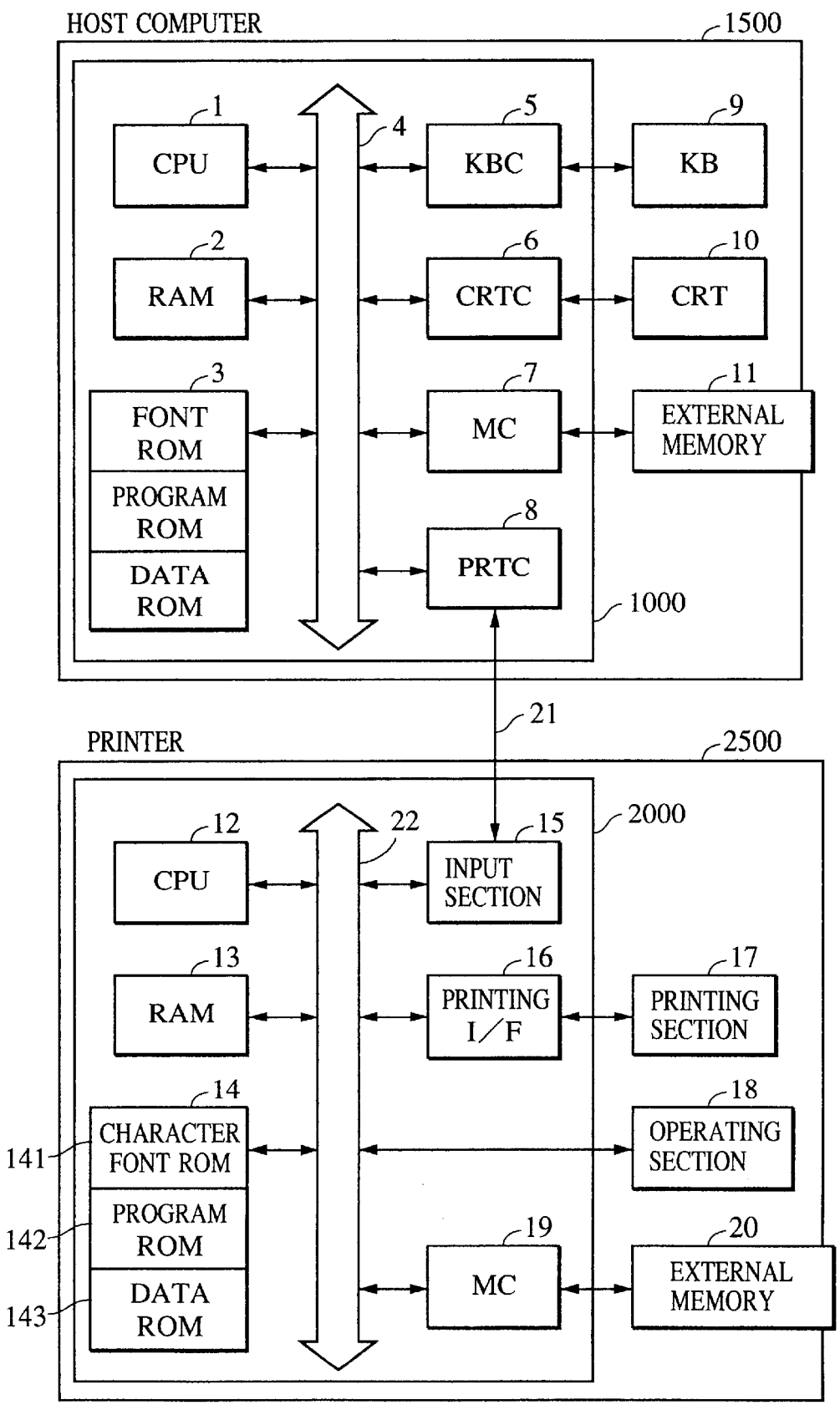
FIG. 1 is a block diagram showing the construction of a printing system capable of providing a printing apparatus which is an embodiment of the present invention.

FIG. 1 is a block diagram showing the construction of a printing system capable of providing a printing apparatus which is an embodiment of the present invention. The illustrated system represents a system in which a host computer 1500 such as a personal computer and a page printer 2500 such as a laser beam printer are connected for communication with each other.

Referring to FIG. 1, the host computer 1500 has a data processing unit 1000 which has a CPU 1, RAM 2, ROM 3, keyboard controller (KBC) 5, CRT controller (CRTC) 6, a memory controller (MC) 7, a printer controller (PRTC) 8, a system BUS 4, and so forth. The CPU 1 performs data processing by executing various programs (system program, application program) loaded on the RAM 2 from the ROM 3 or the external memory 11, while a printer driver loaded on the RAM 2 from the external memory conducts various processings such as those for communication and transfer of printing information between the host computer 1500 and the printer 2500.

Numeral 9 denotes a keyboard for entry of various kinds of information. Numeral 10 denotes a display apparatus (CRT) which displays various kinds of picture information such as pictures of applications, printer drivers and so forth. The external memory 11 and the RAM 12 are so constructed that the user can optionally expand their memory capacities.

The printer 2500 shown in FIG. 1 has a controller 2000 which analyzes the document data transferred from the host computer and converts the same into dot patterns. Numeral 17 denotes a printing section which prints the dot pattern data sent from the controller 2000.

Figure 11A:
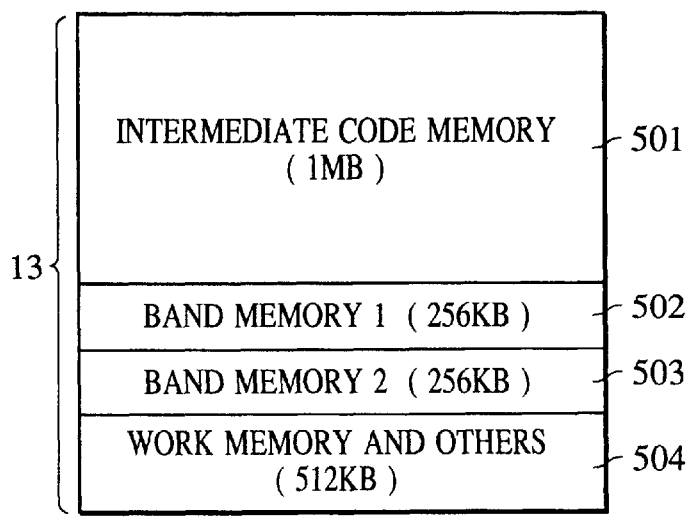
FIGS. 11A and 11B are illustrations of states of memory resource allocation in a printing apparatus.

The controller 2000 has a CPU 12 and a RAM 13. As shown in FIG. 11A, the RAM 13 is divided into an intermediate code memory 501, a first band memory 502, a second band memory 503 and other memory 504.

Numeral 14 designates a ROM which is constituted by a character font ROM 141, a program ROM 142 which stores the program of the CPU 12, a data ROM 143, and a system BUS 22.

Figure 2A:
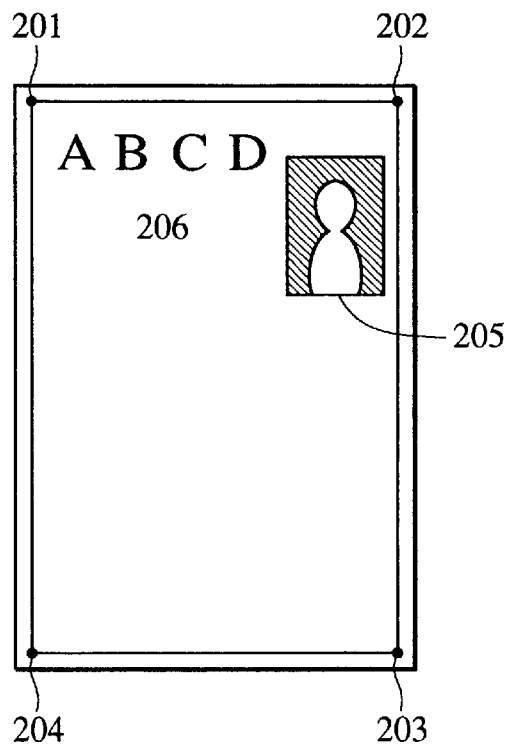
FIGS. 2A and 2B are illustrations of the manner of band-division of printing information which is transferred from a host computer to a printer in the system shown in FIG. 1.

In the operation of the host computer 1500 of the printing system having the described construction, the CPU 1 forms a document data on the RAM 12 and sends to the printer 2500 printing information as shown in FIG. 2A inclusive of document data and image data,via a PRTC (printer controller) 8 and through a bidirectional data communication line 21.

Figure 2B:
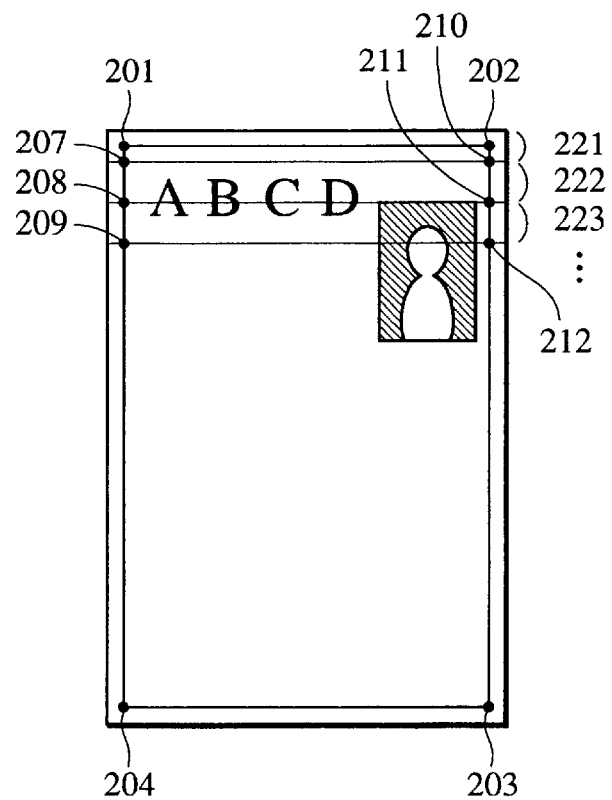

FIGS. 2A and 2B schematically show the manner in which the printing information transferred from the host computer 1500 to the printer 2500 is divided into bands. FIG. 2A corresponds to the printing information which is transferred from the host computer 1500 to the printer 2500, while FIG. 2B shows the band.

Referring to FIGS. 2A and 2B, numerals 201 to 204 denote object point data for scribing straight lines. Thus, straight lines as illustrated are scribed as the object point data 201 to 204 are input. Numeral 205 denotes an image data, 206 denotes character data which corresponds to entry of, for example, characters A, B, C and D. Numerals 221 to 223 designate band areas which are defined by scribing.

FIG. 3 illustrates an example of the data structure of the printing information shown in FIG. 2A. This data structure corresponds to the printing information inclusive of print control codes, transferred from the host computer 1500 to the printer 2500.

Material data is contained between a header code 301 and a footer code 316. Numerals 302 to 305 denote straight line scribing commands. More specifically, the straight line scribing command 302 is a command for scribing the straight line interconnecting the object point data 201 and the object point data 202. The straight line scribing command 303 is a command for scribing straight line between the object point data 202 and the object point data 203. The straight line scribing command 304 is a command for scribing a straight line between the object point data 203 and the object point data 204. The straight line scribing command 305 is a command for scribing a straight line between the object point data 204 and the object point data 201.

Numeral 306 designates a character start address designating command which serves as a command for designating printing address of the character data 206. Numeral 307 denotes a command for designates character font type for designating a font type available on the printer 2500, such as Mincho, courier, and so forth. Numeral 308 designates a character font size designating command for designating the font size, e.g., 12 point, to be used on the printer 2500.

Numerals 309 to 312 denote character codes which correspond to character data 206 shown in FIG. 2A. Numeral 313 designates an image start address designating command which serves as an address for designating the address at which the printing of the image data 205 shown in FIG. 2A is to be started. Numeral 314 denotes a command for designating the X-direction width of the image. This command designates the width of the image data 205 shown in FIG. 2A as measured in the X direction. Numeral 315 designates an image data which corresponds to the image data 205 shown in FIG. 2A. The image data 205 may be a binary data or other multi-value image data.

The printing information, which is referred to also as :document data" and which is sent form the host computer 1500 through the data communication line 21, is received by the input section 15 of the printer 2500. The received data is successively converted by the CPU 12 into intermediate codes on band basis, and the bands of the intermediate codes are stored in an intermediate code memory 501. A description will now be given of the concept of the "band".

If the RAM 12 of the printer 2500 is of the type which has, as is the case of conventional art, a bit map memory of a size corresponding to one page (4 MB memory size in 600 dpi printer for A-4 size), the document data shown in FIG. 3 can be successively be developed on the bit map memory 505 The printer 2500 to which the present invention pertains has a pair of band memories 502, 503, each having 512 lines (256 KB at 600 dpi), preserved in the RAM 13, in order to reduce the required capacity or size of the RAM 13. This pair of band memories 502, 503 is used as so-called double-buffer: namely, these two band memories are alternately switched such that while one of them is sending dot data to the printing section 17, the dot data of the next band is developed in the other band memory.

This method, however, cannot deal with a scribing command which spans a plurality of bands such as, for example, the straight line scribing command 303 shown in FIG. 3.

It is therefore necessary to conduct a work for developing, on band basis, the printing information shown in FIG. 3 into intermediate codes, and develop the intermediate codes into the band memories, as shown in FIG. 4.

FIG. 4 shows the data structure of the intermediate codes corresponding to the printing information, and corresponds to a portion of the printing information.

Referring to FIG. 4, numerals 401, 406 and 417 denote band start codes which define respective bands 221, 222 and 223 in cooperation with the associated band end codes 405, 416 and 430, and various scribing commands and other commands are incorporated in each of the bands 221, 22 and 223.

Numerals 402 to 404, 407, 408, 418 and 419 denote straight line scribing commands. More specifically, the straight line scribing command 402 is a command which serves to scribe a straight line interconnecting the object point data 201 and the object point data 202 shown in FIG. 2B. The straight line scribing command 403 is a command which serves to scribe a straight line interconnecting the object point data 202 and the object point data 210. The straight line scribing command 404 is a command which serves to scribe a straight line interconnecting the object point data 207 and the object point data 201.

The straight line scribing command 407 is a command which serves to scribe a straight line interconnecting the object point data 210 and the object point data 211. The straight line scribing command 408 is a command which serves to scribe a straight line interconnecting the object point data 208 and the object point data 207. The straight line scribing command 418 is a command which serves to scribe a straight line interconnecting the object point data 211 and the object point data 212. The straight line scribing command 419 is a command which serves to scribe a straight line interconnecting the object point data 209 and the object point data 208.

Numeral 409 designates a character start address designating command which serves as a command for designating the printing address in the band 221 of the character data 206 shown in FIG. 2A. Numeral 410 denotes a character font type designating command for designating a font type available on the printer 2500, such as Mincho, courier, and so forth. Numeral 411 denotes a character font size designating command for designating a font size available on the printer 2500, such as 12 point and so forth. Numerals 412 to 415 denote band scribing commands serving as commands for scribing the character codes 309 to 312 within the band 222.

Numeral 420 designates a character start address designating command which serves as a command for designating the printing address in the band 223 of the character data 206 shown in FIG. 2A. Numeral 421 denotes a character font type designating command for designating a font type available on the printer 2500, such as Mincho, courier, and so forth. Numeral 422 denotes a character font size designating command for designating a font size available on the printer 2500, such as 12 point and so forth. Numerals 423 to 426 denote band scribing commands serving as commands for scribing the character codes 309 to 312 within the band 223.

Numeral 427 designates an image start address designating command which serves as a command for designating the start address for scribing the image data 205 shown in FIG. 2A within the band 223. Numeral 428 denotes a width designating command for designating the image width in the X direction, serving as a command for designating the width of the image data 205 as measured in the X direction. Numeral 429 designates image data corresponding to the portion of the image data to be scribed in the band 223.

The straight line scribing command 303 over the bands 221 to 223 shown in FIG. 2B is substituted by straight line scribing commands 403, 407, 418 and so forth of the respective commands. Similarly, character information and image information can be divided into portions belonging to the respective bands. Thus, the document information converted into intermediate cores has a size greater than that of the document information (printing information shown in FIG. 3) transferred from the host computer 1500. The increment of the size depends on factors such as the degree of complexity of the document data.

It is to be noted, however, that the capacity or area size of the RAM 12 in the printer 2500 is definite. In addition, it is meaningless to increase the area size beyond that of the bit map memory of the size corresponding to one page. In this embodiment, therefore, the maximum area size which can be preserved on the RAM 12 is set to 1 MB. This area size is large enough to accommodate full one-page image data provided that the image data is compressed to ¼ as will be described later, but required much smaller RAM capacity than the one-page bit map memory. The size of ordinary document data composed mostly of characters is on the order of several tens of KB. The area size of 1 MB, therefore, is large enough to enable most document data to be printed as it is, without requiring specific processing such as compression.

In the printing system of this embodiment having the described construction, the page printer receives document data from a commanding device such as a host computer and performs the printing on page basis after converting the document data into dot image, by using a RAM having a capacity smaller than the size of the dot image data of one full page to be printed. More specifically, the page-basis document data is divided into a plurality of bands and conversion of the document data into dot image is conducted on band basis, i.e., for each of the bands. As a preparatory step, an operation is performed to convert the received printing information into intermediate codes on band basis. The intermediate codes of each band are then converted into dot image corresponding to the band, so as to be subjected to printing.

The band intermediate codes, inclusive of portions of the code data and image data which have been allocated to each band, are stored in an area of a predetermined area size (about 1 MB in the illustrated embodiment) in the RAM 13. The above-mentioned area size is administrated by a memory resource of a size smaller than the size of dot image data of one full page of the sheet to be used on the page printer which is 4 MB, for example, when A-4 size sheets are used.

The RAM 13 also has a plurality of band memories, e.g., a first band memory 501 and a second band memory 502, having an area size large enough to store image data of one band, in addition to the above-mentioned area of the predetermined capacity for storing the intermediate codes. One of the band memory is used for temporarily storing dot data converted from the intermediate codes, while the other serves as a buffer memory for sending the stored dot data to the printing section 17.

The CPU 12 executes control programs such as those stored in the program ROM 142 of the ROM 14, or control programs loaded on the RAM 13 from an external memory 20 or a storage medium which is not shown, so as to conduct operations including various kinds of judgment, memory access controls, and various kinds of communications with the host computer. More specifically, the CPU judges whether full intermediate codes corresponding to one full page can be stored in the intermediate code memory 501 of the RAM 13, i.e., whether or not the size of the intermediate code data of one-page printing information received from the host computer 1500 exceeds the capacity of the intermediate code memory 501. When the capacity of the intermediate code memory 501 is exceeded by the size of the intermediate code data of the one-page printing information received from the host computer 1500, the CPU 12 performs conversion of the intermediate code data into dot data starting from the initial band of the page, and stores the bands of dot data in the bane memory areas except for one band memory area, whereby a vacant space is formed in the intermediate code storage area. The intermediate codes of the next document data of the same page are then stored in the vacant area.

When the CPU 12 has judged that the vacant space formed as a result of the conversion of the intermediate code data into dot data is not large enough to enable storage of the whole intermediate code data of one full page in the intermediate code memory 501, the CPU 12 performs conversion of the intermediate code data stored in the intermediate code memory into dot data, starting from the band area which contains the greatest size of intermediate code data devoid of image data. The dot data thus obtained is stored in remaining band memory which is the above-mentioned one band memory area in which the dot data has not been stored. Then a reversible compression processing is performed on the dot data, so as to reduce the data size.

When the CPU has judged that the size of the reversibly compressed dot data is still greater than a predetermined second data size, which is ¼ the size of intermediate code memory (1 MB), i.e., 64 KB, in the illustrated case, the CPU 12 operates to expand the compressed dot data to restore the original dot data, and conducts irreversible compression processing on the restored dot data so as to reduce the data size below the above-mentioned predetermined second data size. The irreversibly compressed data is then stored in the intermediate code memory 501 at an address at which the band corresponding to these intermediate code data has been stored.

Reversible compression is a compression processing which permits restoration to original data by expansion. Various reversible compression methods are usable for compressing the data, e.g., a method known as run-length method. Detailed description of such methods is omitted. On the other hand, irreversible expansion is such a compression processing that thinned data is formed when the compressed data is expanded. More practically, irreversible compression is conducted by thinning every other dot out of the original data both in X and Y directions, so as to forcibly reduce the data size into ¼. The expansion is conducted by enlarging the compressed data by multiplication factor of 2 both in X and Y directions, so as to recover the original size of the dot pattern. In this case, however, the quality of the image obtained through expansion is worse than that of the original image. It will be understood that the present invention does not exclude the use of other reversible and irreversible methods than those described above.

As a result of the foregoing processings, one-page dot data can be stored in the intermediate code memory 501, even though the dot data may be coarse.

The communication between the host computer 1500 and the printer 2500 may be executed such that, when one-page printing information is to be transferred from the host computer 1500 to the printer 2500, the host computer sends first the printing information except for any image data to the printer 2500, so as to start the development of the printing information into the intermediate code memory 501. Then, an inquiry command requesting information about the size of the vacant area left in the intermediate code memory 501 after the execution is transmitted from the host computer 1500 to the printer 2500. In response to this inquiry command, the CPU 12 of the printer 2500 investigates the size of the vacant area left in the RAM 13, and informs the host computer 1500 of the size of the vacant area determined through the investigation. The CPU 1 then compares the size of the vacant storage area with the size of the image data which has not yet been transferred. If the CPU 1 has judged that the size of the image data is smaller than the size of the vacant area, the CPU permits the transfer of the image data to the printer 2500, whereas, when the CPU 1 has judged that the size of the image data exceeds the size of the vacant area, the CPU 1 performs reversible or irreversible compression of the image data so as to reduce the total size of the image data to a value below the size of the vacant area. The image data of the reduced size is then transferred to the printer 2500 for printing.

According to the described technique, it is possible to quickly conduct printing information including the image data formed at high speed by the host computer 1500, by making an effective use of the hardware resource of the host computer 1500, while anticipating occurrence of so-called data overflow, i.e., failure of conversion of one-page printing information into intermediate codes in the printer 2500 due to restriction in the size of the memory resource of the printer 2500, without burdening the printer 2500 with the heavy work of data processing.

A description will now be given as to the relationships between the described embodiment and the features of the first to seventh embodiments, as well as the operations of these aspects of the invention, with reference to FIG. 1.

The first aspect of the present invention pertains to a printing apparatus (printer 2500) communicable with an information processing apparatus (host computer 1500) through a predetermined communication medium (interface, infrared wireless interface, network, or the like), comprising: first conversion means for converting page-basis printing information received from the information processing apparatus into predetermined intermediate code information, the conversion being executed on a predetermined band basis (the first conversion means corresponds to CPU 12 which performs the conversion by executing the control program stored in the ROM 142 or the control program read onto the RAM 13 from the external memory 20 or an external storage medium); first storage means for storing, in a first storage area (intermediate code memory 501) of a memory resource (RAM 13), the intermediate code information obtained through conversion performed by the first conversion means (the first storage means corresponds to the CPU 12 which conducts storage processing by executing the control program stored in the ROM 142 or the control program read onto the RAM 13 from the external memory 20 or the external storage medium); second conversion means for converting the intermediate code information into image data on a predetermined band basis (the second storage means corresponds to the CPU 12 which conducts the conversion processing by executing the control program stored in the ROM 142 or the control program read onto the RAM 13 from the external memory 20 or the external storage medium); second storage means for storing, in a second storage area (first and second band memories 502, 503 of RAM 13) of the memory resource, a plurality of bands of the image data obtained through conversion performed by the second conversion means (the second storage means corresponds to the CPU 12 which conducts the storage processing by executing the control program stored in the ROM 142 or the control program read onto the RAM 13 from the external memory 20 or the external storage medium); first judging means for judging whether or not the intermediate code information corresponding to one page has been stored in the first storage area (the first judging means corresponds to the CPU 12 which conducts the judging processing by executing the control program stored in the ROM 142 or the control program read onto the RAM 13 from the external memory 20 or an external storage medium); and first memory control means operative based on the result of judgment conducted by the first judging means so as to cause the second conversion means to convert the intermediate code information stored in the first storage area on the predetermined band basis into image and to develop the image in the second storage area, thereby forming a vacant area in the first storage area (the first memory control means corresponds to the CPU 12 which conducts the control processing by executing the control program stored in the ROM 142 or the control program read onto the RAM 13 from the external memory 20 or an external storage medium). Thus, the CPU 12 judges whether or not the one-page intermediate code information has been stored in the intermediate code memory 501, and, in accordance with the result of the judgment, performs image-development of the intermediate code information of predetermined number of bands stored in the intermediate code memory 501, followed by the storage of the image-developed data into the first band memory 502, thereby preserving a vacant area in the intermediate code memory 501. Therefore, even when the printing information received from the information processing apparatus is too large to be stored in the first storage area allocated in the memory resource, the whole one-page printing information from the information processing apparatus can be received and stored in the form of intermediate code information by making an effective use of the second storage area.

In accordance with the second aspect of the present invention, the printing apparatus of the first aspect further comprises: second memory control means operative after the preservation of the vacant area by the first memory control means and operative based on the result of the judgment performed by the first judging means, so as to cause the second conversion means to convert into image the intermediate code information of a band which does not contain image data from among the bands of intermediate code information stored in the first storage area, and to develop the image into the second storage area (the second memory control means corresponds to the CPU 12 which conducts the control processing by executing the control program stored in the ROM 142 or the control program read onto the RAM 13 from the external memory 20 or an external storage medium); compression means for compressing the output information image-developed by the second memory control means into a predetermined volume, thereby generating compressed output information (The compression means corresponds to the CPU 12 which conducts the control processing by executing the control program stored in the ROM 142 or the control program read onto the RAM 13 from the external memory 20 or an external storage medium); and third memory control means for causing the first storage area to store the compressed output information generated by the compression means (The third memory control means corresponds to the CPU 12 which conducts the control processing by executing the control program stored in the ROM 142 or the control program read onto the RAM 13 from the external memory 20 or an external storage medium). According to the second aspect of the invention, after the preservation of the vacant area by the CPU 12, the intermediate code information of a band which does not contain image data from among the bands of intermediate code information stored in the intermediate code memory 501 is image developed into the first band memory 502. Then, the CPU 12 compresses the image-developed output information into a predetermined volume, thereby generating compressed output information, and causes the intermediate code memory 501 to store the compressed output information. In operation, the intermediate code information of the bands stored in the intermediate code memory 501 is image-developed through the first band memory 502 and again stored in the intermediate code memory 501. If full one-page intermediate code information cannot be stored in the intermediate code memory 501 despite such a technique, the CPU operates to compress the image-developed output information and stores the compressed image-developed output information in the intermediate code memory 501, so that full one-page printing information can safely be stored in the form of combination of predetermined intermediate codes and image data.

The third aspect of the present invention pertains to an information processing apparatus (host computer 1500) communicable with a printing apparatus (printer 2500) through a predetermined communication medium (interface, infrared wireless interface, network or the like), comprising: transfer means for transferring to the printing apparatus (printer 2500) the page printing information except for image data in the page (the transfer means corresponds to the printer controller 8 which transfers the printing information held on the RAM 2); inquiry means for inquiring, after the data transfer performed by the transfer means, about the size of vacancy in an intermediate code information storage area preserved in a memory resource of the printing apparatus (The inquiry means corresponds to the CPU 1 which conducts the inquiry by executing the control program stored in the ROM 3 or the control program loaded onto the RAM 2 from the external memory or the external storage medium); and transfer control means for comparing the size of the image data with the size of the vacancy informed by the printing apparatus in response to the inquiry made by the inquiry means, and for controlling the size of the image data to be transferred, based on the result of the comparison (The transfer control means corresponds to the CPU 1 which conducts the transfer control by executing the control program stored in the ROM 3 or the control program loaded onto the RAM 2 from the external memory or the external storage medium). After the transfer to the printer 2500 of page printing information except for image data in the page performed by the transfer means, the CPU 1 inquires about the size of vacancy in an intermediate code information storage area preserved in the RAM 13 of the printer 2500. Then, the CPU 1 compares the size of the image data with the size of the vacancy informed by the printer 2500 in response to the inquiry, and controls the size of the image data to be transferred, based on the result of the comparison. It is therefore possible to control the size of the image data to be transferred, in accordance with the size of the vacancy in the memory resource of the printer 2500, in advance of the transfer.

In accordance with the fourth aspect of the present invention, the transfer control means, when judging that the size of the image data exceeds the size of vacancy, compresses the image data so as to reduce, by reversible or irreversible compression, the size of the image data to be transferred.

According to a fifth aspect of the present invention, there is provided a printing apparatus (printer 2500) communicable with an information processing apparatus (host computer 1500) through a predetermined communication medium (interface, infrared wireless interface, network or the like), comprising: first conversion means for converting page-basis printing information received from the information processing apparatus into predetermined intermediate code information, the conversion being executed on a predetermined band basis (The first conversion means corresponds to the CPU 12 which conducts the conversion processing by executing the control program stored in the program ROM 142 or the control program read onto the RAM 13 from the external memory 20 or an external storage medium); first storage means for storing, in a first storage area of a memory resource, the intermediate code information obtained through conversion performed by the first conversion means (The first storage means corresponds to the CPU 12 which conducts the storage processing by executing the control program stored in the program ROM 142 or the control program read onto the RAM 13 from the external memory 20 or an external storage medium); second conversion means for converting the intermediate code information into image data on a predetermined band basis (The second conversion means corresponds to the CPU 12 which conducts the conversion processing by executing the control program stored in the program ROM 142 or the control program read onto the RAM 13 from the external memory 20 or an external storage medium); second storage means for storing, in a second storage area of the memory resource, a plurality of bands of the image data obtained through conversion performed by the second conversion means (The second storage means corresponds to the CPU 12 which conducts the storage processing by executing the control program stored in the program ROM 142 or the control program read onto the RAM 13 from the external memory 20 or an external storage medium); and informing means for informing the information processing apparatus of the size of vacancy formed in the first storage area after conversion performed by the first conversion means, in response to an inquiry made by the information processing apparatus about the vacancy size (The informing means corresponds to the CPU 12 which conducts the informing processing by executing the control program stored in the program ROM 142 or the control program read onto the RAM 13 from the external memory 20 or an external storage medium).

The CPU 12 informs the host computer 1500 of the size of vacancy formed in the intermediate code memory 501 in the RAM 13 after the conversion into the intermediate codes, in response to an inquiry made by the host computer 1500 about the vacancy size. The host computer 1500, therefore, can know the size of the vacancy in the intermediate code memory 501 which stores the intermediate code information corresponding to the printing information other than image data.

According to the sixth aspect of the present invention, there is provided a printing system comprising an information processing apparatus (host computer 1500) and a printing apparatus (printer 2500) communicable with each other through a predetermined communication medium (interface, infrared wireless interface, network or the like), wherein the printing apparatus (printer 2500) comprises: first conversion means for converting page-basis printing information received from the information processing apparatus into predetermined intermediate code information, the conversion being executed a on predetermined band basis (The first conversion means corresponds to the CPU 12 which conducts the conversion processing by executing the control program stored in the program ROM 142 or the control program read onto the RAM 13 from the external memory 20 or an external storage medium); first storage means for storing, in a first storage area of a memory resource, the intermediate code information obtained through conversion performed by the first conversion means (The first storage means corresponds to the CPU 12 which conducts the storage processing by executing the control program stored in the program ROM 142 or the control program read onto the RAM 13 from the external memory 20 or an external storage medium); second conversion means for converting the intermediate code information into image data on predetermined band basis (The second conversion means corresponds to the CPU 12 which conducts the conversion processing by executing the control program stored in the program ROM 142 or the control program read onto the RAM 13 from the external memory 20 or an external storage medium); second storage means for storing, in a second storage area of the memory resource, a plurality of bands of the image data obtained through conversion performed by the second conversion means (The second storage means corresponds to the CPU 12 which conducts the storage processing by executing the control program stored in the program ROM 142 or the control program read onto the RAM 13 from the external memory 20 or an external storage medium); and informing means for informing the information processing apparatus of the size of vacancy formed in the first storage area after conversion performed by the first conversion means, in response to an inquiry made by the information processing apparatus about the vacancy size (The informing means corresponds to the CPU 12 which conducts the informing processing by executing the control program stored in the program ROM 142 or the control program read onto the RAM 13 from the external memory 20 or an external storage medium); and wherein the information processing apparatus (host computer 1500) comprises: transfer means for transferring to the printing apparatus (printer 2500) the page printing information except for image data in the page (The transfer means corresponds to the printer controller 8 which transfers the printing information held on the RAM 2); inquiry means for inquiring, after the data transfer performed by the transfer means, about the size of vacancy in an intermediate code information storage area preserved in the memory resource of the printing apparatus (The inquiry means corresponds to the CPU 1 which conducts the inquiry processing by executing the control program stored in the program ROM 3 or the control program read onto the RAM 2 from the external memory or the external storage medium); and transfer control means for comparing the size of the image data with the size of the vacancy informed by the printing apparatus in response to the inquiry made by the inquiry means, and for controlling the size of the image data to be transferred, based on the result of the comparison (The transfer control means corresponds to the CPU 1 which conducts the informing processing by executing the control program stored in the program ROM 3 or the control program read onto the RAM 2 from the external memory or an external storage medium). The CPU 12 informs the host computer 1500 of the size of vacancy formed in the intermediate code memory 501 of the RAM 13 after the conversion into intermediate codes, in response to an inquiry made by the host computer 1500 about the vacancy size, so that the CPU 1 can know the size of the vacancy in the intermediate code memory 501 which stores the intermediate code information corresponding to the printing information other than image data. Meanwhile, the CPU 1, when it is judged that the size of the vacancy is exceeded by the size of the image data, operates to adjust the size of the image data to be transferred. It is therefore possible to store the image data without fail, even when the size of the vacant area formed in the memory resource of the printing apparatus is limited.

In accordance with the seventh aspect of the present invention, the CPU 1, when judging that the size of the image data exceeds the size of vacancy, compresses the image data reversibly or irreversibly so as to reduce the size of the image data to be transferred, so that the image data transferred can be safely stored even when the size of the vacant area in the memory resource of the printer 2500 is limited.

A description will now be given of a series of steps of process in which the text data shown in FIG. 3 is converted into the intermediate codes shown in FIG. 4 and then printed, with specific reference to the flow chart of FIG. 5.

Figure 5:
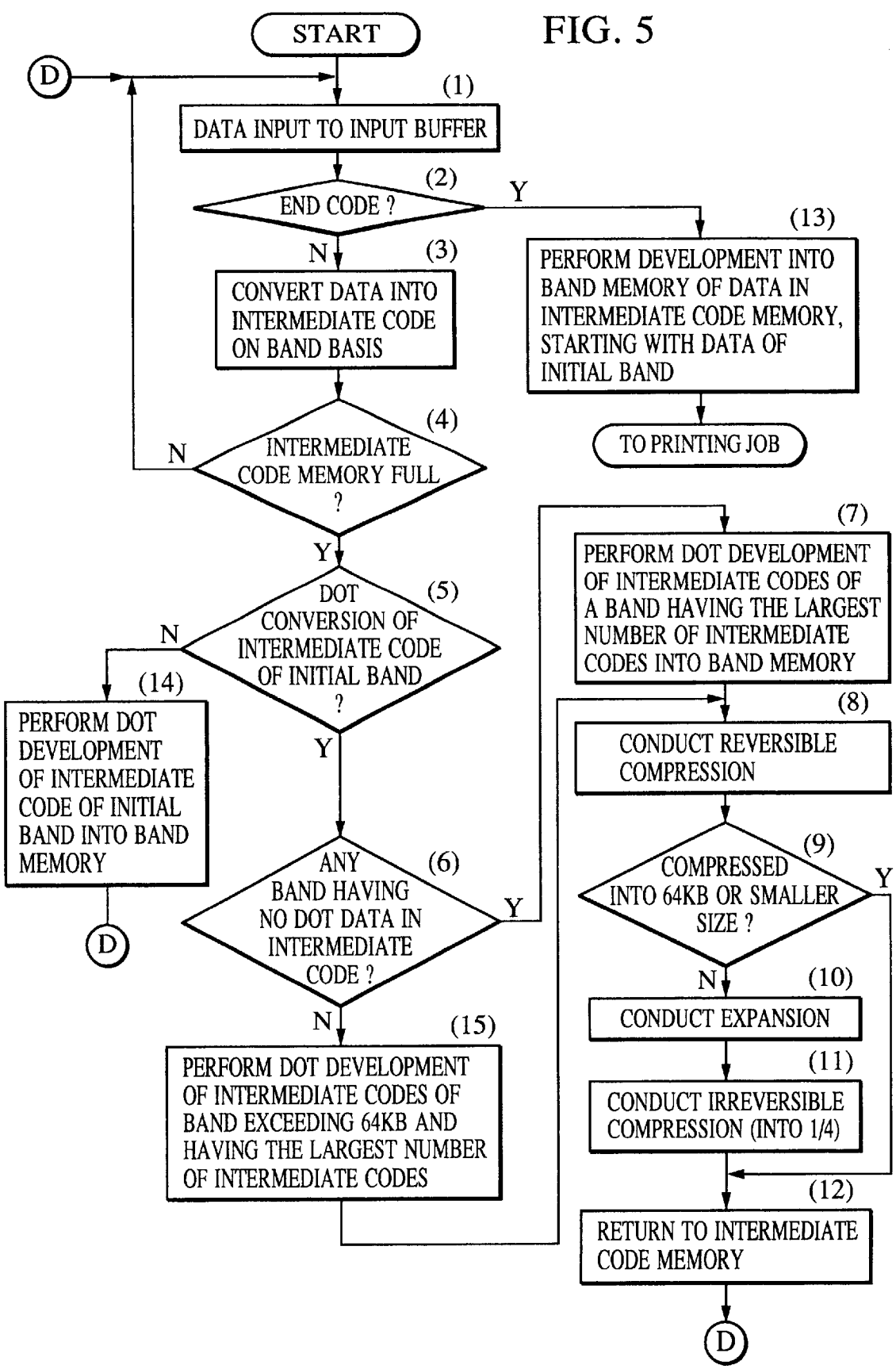
FIG. 5 is a flow chart illustrative of an embodiment of the data processing method for use in a printing apparatus in accordance with the present invention.

FIG. 5 is a flow chart illustrative of an embodiment of the data processing method for use in a printing apparatus in accordance with the present invention. The process has steps (1) to (15) which correspond to control programs read from the program ROM 142 and which are executed by the CPU 12 of the controller 2000.

In Step (1), document data is inputted through the host computer 1500 into an input buffer which is preserved on the ROM 13. In Step (2), a judgment is conducted as to whether or not the document data is an end code which indicates the end of the document data. If the document data is the end code, the process skips to Step (13) which executes the printing processing.

The printing processing in this embodiment is executed as follows. When the printing information of the initial or first band has been developed in the form of dot data and stored in the band memory, a printing command is given to the printing section 17, and the dot data is delivered from the band memory in synchronization with horizontal and vertical synchronizing signals to the printing section 17, thereby printing the data on a sheet of paper. If the dot data has not yet been developed in the band memory, the intermediate codes are read from the portion of the intermediate code memory corresponding to the initial band, and are converted into dot data and developed in the band memory. Then, the developed dot data is subjected to printing in the same manner as that described above.

If the document data is judged as not being an end code in Step (2), the process proceeds to Step (3) in which the document data is analyzed and converted into bands of intermediate codes as shown in FIG. 4. Then, Step (4) is executed in which a judgment is conducted whether or not any vacancy is left in the intermediate code memory 501 preserved in the RAM 13 shown in FIG. 1. When a vacancy exists in the intermediate code memory 501, the process returns to Step (1) to permit entry of the next data into the input buffer.

Conversely, when Step (4) has judged that there is no vacancy, the process proceeds to Step (5) which determines whether or not the intermediate codes corresponding to the initial band has been converted into dot data. If the intermediate codes have not yet been converted into dot data, the process skips to Step (14) in which these intermediate codes are converted into dot data and developed in the first band memory 502. As a result of the dot-development, the area in which the intermediate codes corresponding to the initial band have been provides a vacancy. The process then returns to Step (1) to permit storage of the intermediate codes of the next document data in this vacant area, followed by execution of the Steps described above.

Thus, Step (4) is executed again. If Step (4) has again judged that there is a shortage in the storage area in the intermediate code memory 501, an answer YES is given to the inquiry made in Step (5), because in this case the intermediate codes of the initial band have already been developed into dots in Step (14), so that the process proceeds to Step (6) which determines whether or not any band which does not contain dot data (image data). When there is a band which does not contain image data, an operation is performed in Step (7) to search for a band having greatest size of intermediate code data among the bands. The intermediate codes of the band thus searched are converted into dot pattern and developed into the band memory 502.

The reason why the band having no image data is preferentially selected is as follows. In general, text data and graphics data are capable of being compressed at high compression ratio even when the compression is reversible, whereas image data cannot be compressed at high compression ratio even when the compression is reversible. Thus, in order that the image data is compressed at high compression ratio, the compression must be conducted irreversibly. Such irreversible compression, however, impairs the quality of data when the compressed data is expanded to the original size.

The process then skips to Step (8) in which the data developed in the band memory 502 is reversibly compressed. Various known reversible compressing method such as run-length method can be used. The process then skips to Step (9) which judges whether or not the size of the compressed data is 64 KB or smaller.

The data size of 64 KB is ¼ the storage area size (256 KB) of each of the first and second band memories. Thus, the judgment performed in Step (9) is to confirm whether or not the data size has been reduced to ¼ the storage capacity of each band memory as a result of the compression. This judgment is conducted for the following reasons.

As stated before, the size of the dot pattern for one page is 4 MB when the printer performs printing at 600 dpt. Meanwhile, the capacity or area size of the intermediate code memory 501 is 1 MB. Therefore, is the dot pattern of each band is compressed to ¼, it is possible to store image data of one full page in the intermediate code memory 501. Therefore, the data size of 64 KB, which is ¼ the size of the band memory is used as a criterion. In general, character patterns and graphics patterns are very often compressible without impairing quality, because such patterns in most cases consist of continuous black or white portions. In contrast, image data such as dither pattern or those produced by error diffusion technique can hardly be compressed reversibly.

If the judgment in Step (9) has judged that the data size has been reduced to ¼ or smaller as a result of the compression, the process proceeds to Step (12) in which the compressed data is returned to the intermediate code memory 501 which now has a vacancy.

However, if the data size has not been reduced to ¼ or smaller, an answer NO is given to the inquiry made in Step (9), and the process proceeds to Step (10) which conducts expansion of the compressed data, followed by Step (11) which executes irreversible compression. The irreversible compression is conducted by thinning every other dots from the dot data both in X and Y directions, so as to forcibly reduce the data size to ¼. The original size of the dot data can be recovered by expanding the compressed data with multiplication factor of 2 both in the X and Y directions. In this case, however, the image quality is obviously worsened.

When the compressed dot pattern is returned to the intermediate code memory in Step (12), a flag is given to the compressed data indicating that the data has been compressed, as well as a flag indicative of the type of compression, i.e., reversible or irreversible. The process then returns to Step (1) for the entry of the next portion of the document data.

Figure 6:
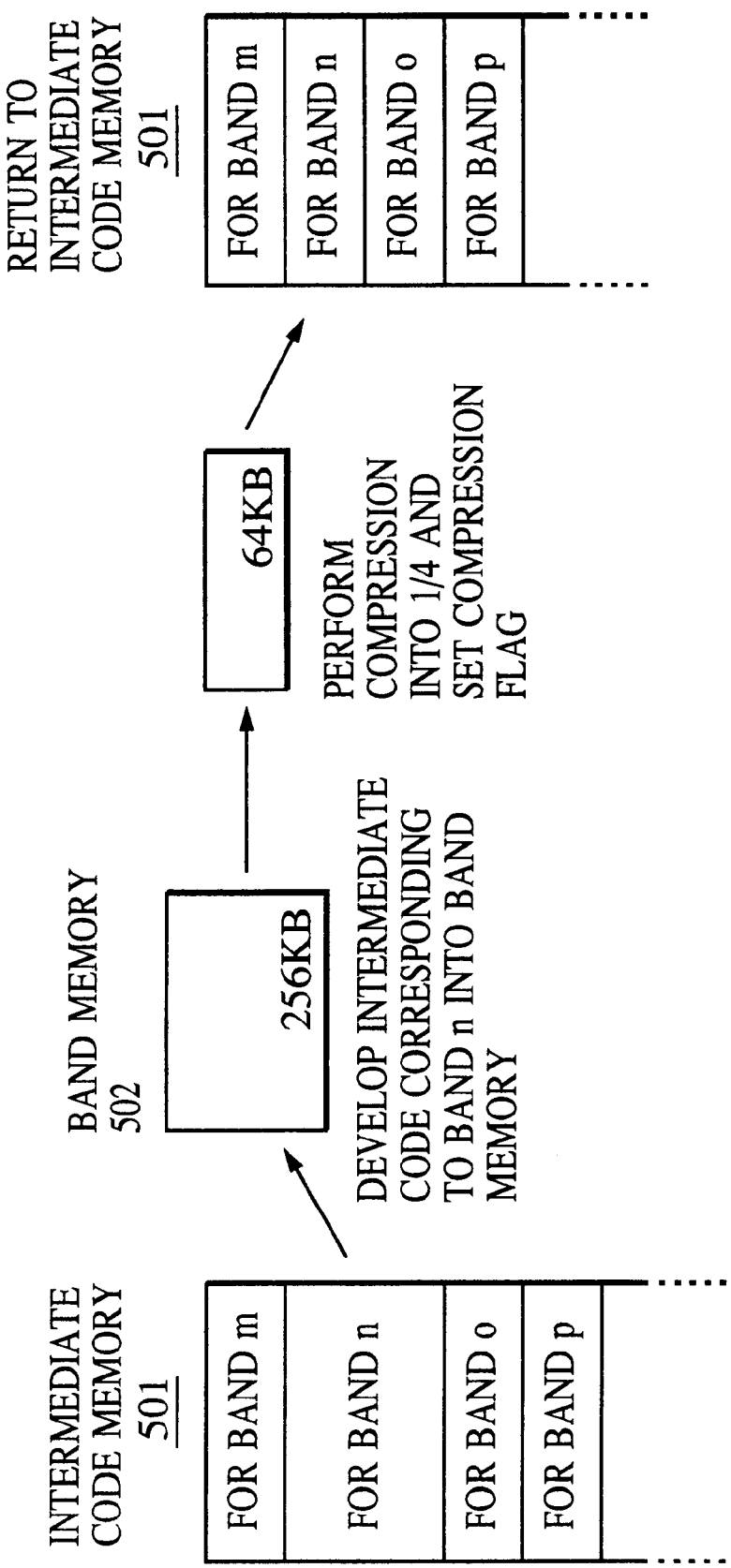
FIG. 6 is a schematic illustration of a compression processing of the intermediate code data shown in FIG. 4.
Figure 11B:
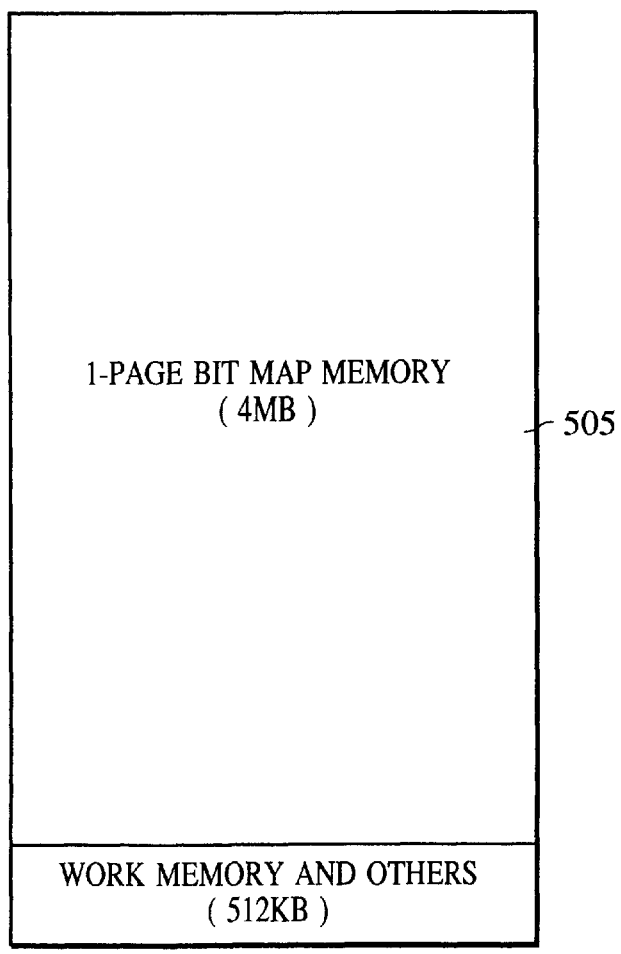

A description will now be given as to the detail of the compression of the intermediate codes, with specific reference to FIG. 6 which shows the process of compression of intermediate codes shown in FIG. 4. In FIG. 6, the same reference numerals are used to denote the same elements as those appearing in FIG. 11.

Referring to FIG. 6, the data size of the portion of the intermediate code memory 501 corresponding to a band "n" is the greatest. The intermediate codes in this portion, therefore, are compressed and developed in the second band memory 503. The developed dot data is then compressed and, with the aforesaid flags attached thereto, returned to the intermediate code memory 501.

Referring again to Step (6), when it has been determined that there is no band devoid of dot data in the intermediate code, a band is selected which has intermediate codes in excess of 64 KB and which has the greatest size of intermediate codes among the bands. Then, Step (15) is executed in which the intermediate codes of the band thus selected are dot-developed into the second band memory 503. Then, Steps (8) onwards are executed.

This is because, when the data size per band is 64 KB or smaller, the intermediate code memory 501 having the capacity of 1 MB can store the dot data of one full page, because the one-page data can be divided into 16 bands.

Then, Steps are executed in the same manner as that described before in regard to the case where the intermediate codes do not contain image data.

When the one-page data has been developed in the intermediate code memory 501, an answer YES is given to the inquiry made in Step (2), so that the process proceeds to Step (13) in which the CPU 12 converts the intermediate codes of the initial band in the intermediate code memory 501 into dot pattern, and develops and stores the dot pattern in the first band memory 501. After the completion of the development, the CPU gives a printing command to the printing section 17, while sending the dot pattern in the first band memory to the printing section 17, through the printing interface I/F 16.

In the meantime, while the dot pattern is being sent to the printing section 17 from the first band memory 502, the CPU 12 reads the data of the next band in the intermediate code memory 501. If the read data has been compressed, the CPU 12 causes the data to be expanded into a dot pattern, and develops this dot pattern in the second band memory 503.

When the delivery of the dot pattern from the first band memory 502 to the printing section 17 is finished, the CPU 12 switches the band memory: namely, starts delivery of the dot pattern to the printing section 17 from the second band memory 503 in which the dot pattern of the next band has been stored. In the meantime, the dot pattern of the subsequent band is developed in the first band memory 502. Printing of one page is finished by repetition of this series of steps.

A description will now be given of the relationships between the described embodiment and the features of the eighth, ninth, twelfth and thirteenth aspects of the invention, as well as the operation of these aspects of the invention.

The eighth aspect of the present invention pertains to a data processing method for use in a printing apparatus communicable with an information processing apparatus through a predetermined communication medium (interface, infrared wireless interface, network or the like), the method comprising: a first converting step (Step (3) of the flow shown in FIG. 5) for converting page-basis printing information received from the information processing apparatus into predetermined intermediate code information, the conversion being executed on a predetermined band basis; a first storing step (Step (3) of the flow shown in FIG. 5) for storing, in a first storage area preserved in a memory resource, the intermediate code information obtained through the conversion; a second converting step (Step (13) of the flow shown in FIG. 5) for converting the intermediate code information stored in the first storage area into image data on a predetermined band basis; a second storing step (Step (13) of the flow shown in FIG. 5) for storing, in a second storage area preserved in the memory resource, a plurality of bands of the image data obtained through the conversion performed in the second converting step; a first judging step (Step (4) of the flow shown in FIG. 5) for judging whether or not the intermediate code information corresponding to one page has been stored in the first storage area; and a third storing step (Step (14) of the flow shown in FIG. 5) conducted based on the result of judgment conducted by the first judging means, so as to cause the intermediate code information stored on the predetermined band basis in the first storage area to be developed into image in the second storage area, thereby preserving vacant area in the first storage area, and to store subsequent intermediate code data into the vacant area. Thus, even when the size of the one-page printing information received from the information processing apparatus is so large that the printing information cannot be stored in the first storage area, the printing information can safely be received and stored in the printing apparatus, by the effective use of the second storage area.

In accordance with the ninth aspect of the present invention, the data processing method of the eighth aspect further comprises: a second judging step (Step (4) of the flow shown in FIG. 5) conducted after storage of the subsequent intermediate code information in the vacant area, so as to judge whether or not the intermediate code information corresponding to one page has been stored in the first storage area; a fourth storing step (Step (7) of the flow shown in FIG. 5) conducted based on the result of the judgment performed in the second judging step, so as to develop into image the intermediate code information of a band which does not contain image data from among the bands of intermediate code information stored in the first storage area, and to store the developed image in the second storage area; a compressing step (Steps (8) to (11) of the flow shown in FIG. 5)for compressing the image-developed output information into a predetermined volume, thereby generating compressed output information; and a fifth storing step (Step (12) of the flow shown in FIG. 5) for storing the compressed output information in the first storage area. In operation, the intermediate code information of the bands stored in the first storage area is image-developed through the second storage area and again stored in the first storage area. If full one-page intermediate code information cannot be stored in the first storage area despite such a technique, the compression means operates to compress the image-developed output information, so that full one-page printing information can safely be stored in the form of combination of predetermined intermediate codes and image data.

The twelfth aspect of the present invention pertains to a storage medium storing a computer-readable program which comprises: a first converting step (Step (3) of the flow shown in FIG. 5) for converting page-basis printing information received from an information processing apparatus into predetermined intermediate code information, the conversion being executed on a predetermined band basis; a first storing step (Step (3) of the flow shown in FIG. 5) for storing, in a first storage area preserved in a memory resource, the intermediate code information obtained through the conversion; a second converting step for converting the intermediate code information stored in the first storage area into image data on a predetermined band basis; a second storing step (Step (13) of the flow shown in FIG. 5) for storing, in a second storage area preserved in the memory resource, a plurality of bands of the image data obtained through the conversion performed in the second converting step; a first judging step (Step (4) of the flow shown in FIG. 5) for judging whether or not the intermediate code information corresponding to one page has been stored in the first storage area; and a third storing step (Step (3) of the flow shown in FIG. 5) conducted based on the result of judgment conducted by the first judging means, so as to cause the intermediate code information stored on the predetermined band basis in the first storage area to be developed into image in the second storage area, thereby preserving vacant area in the first storage area, and to store subsequent intermediate code data into the vacant area. Thus, the invention also includes a form in which program codes corresponding to the steps of the flow shown in FIG. 5 are stored in a later-mentioned external storage medium or the internal memory resource, and are read and executed by the CPU 12.

The thirteenth aspect of the present invention pertains to a storage medium storing a computer-readable program, wherein the computer-readable program further comprises: a second judging step (Step (4) of the flow shown in FIG. 5) conducted after storage of the subsequent intermediate code information in the vacant area, so as to judge whether or not the intermediate code information corresponding to one page has been stored in the first storage area; a fourth storing step (Step (7) of the flow shown in FIG. 5) conducted based on the result of the judgment performed in the second judging step, so as to develop into image the intermediate code information of a band which does not contain image data from among the bands of intermediate code information stored in the first storage area, and to store the developed image in the second storage area; a compressing step (Steps (8) to (11) of the flow shown in FIG. 5) for compressing the image-developed output information into a predetermined volume, thereby generating compressed output information; and a fifth storing step (Step (12) of the flow shown in FIG. 5) for storing the compressed output information in the first storage area. Thus, the invention also includes another form in which program codes corresponding to the steps of the flow shown in FIG. 5 are stored in a later-mentioned external storage medium or the internal memory resource, and are read and executed by the CPU 12.

As will be seen from the foregoing description, according to the first embodiment of the present invention, it is possible to obtain a printer of an extremely high cost performance, which can perform printing irrespective of the type of the inputted data and which requires a memory capacity of about 2 MB (see FIG. 11A) much smaller than that (about 4.5 MB, see FIG. 11B) required in the case where a one-page bit map memory is used.

Second Embodiment

A description will now be given of a second embodiment of the present invention.

Figure 7:
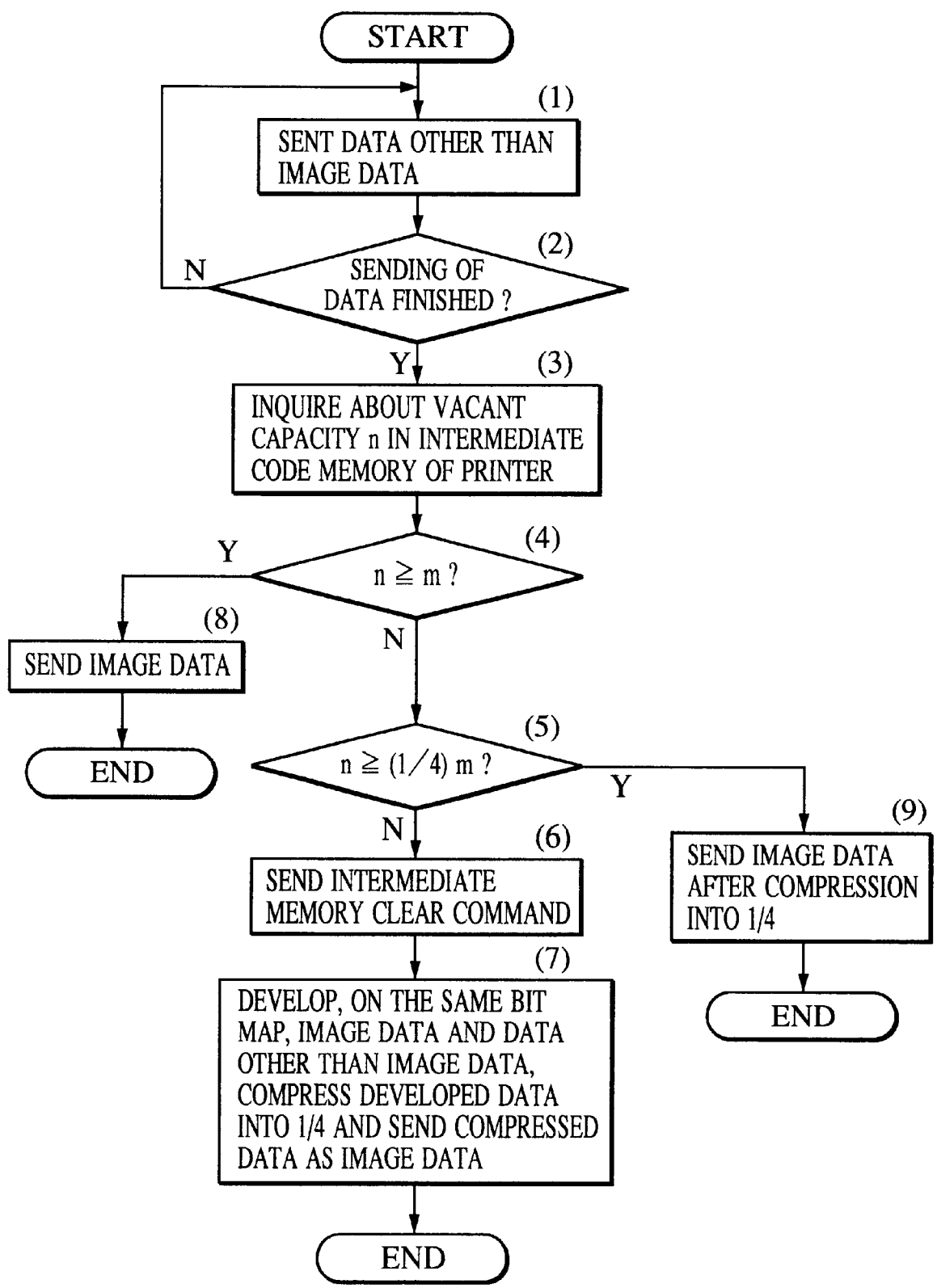
FIGS. 7 to 9 are flow charts illustrative of an embodiment of the data processing method for use in a printing system embodying the present invention.

FIG. 7 is a flow chart illustrative of an embodiment of the data processing method for use in a printing apparatus in accordance with the present invention. This process corresponds to the data processing performed by the host computer 1500 shown in FIG. 1. This process has steps (1) to (9).

Figure 8:
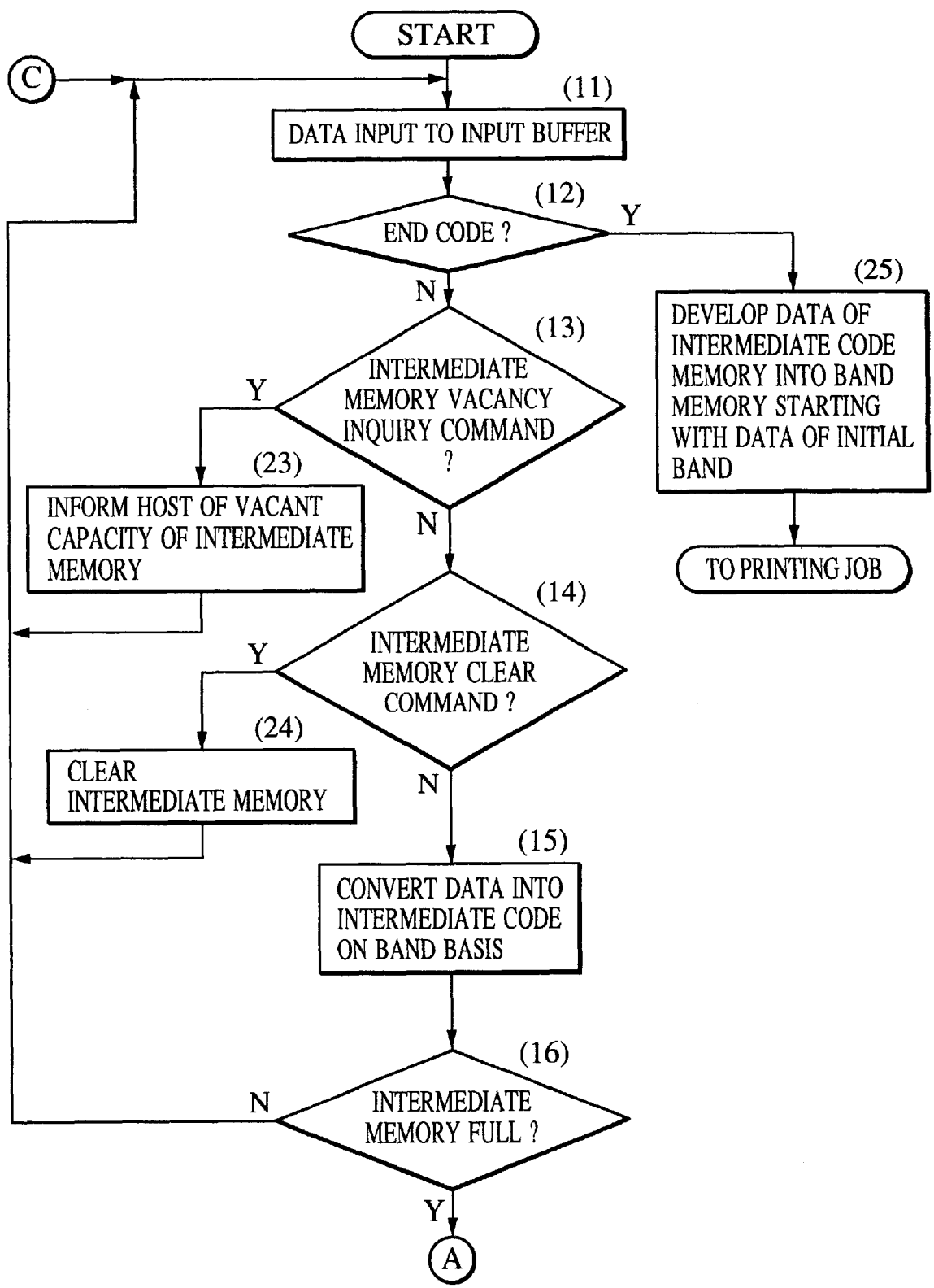
Figure 9:
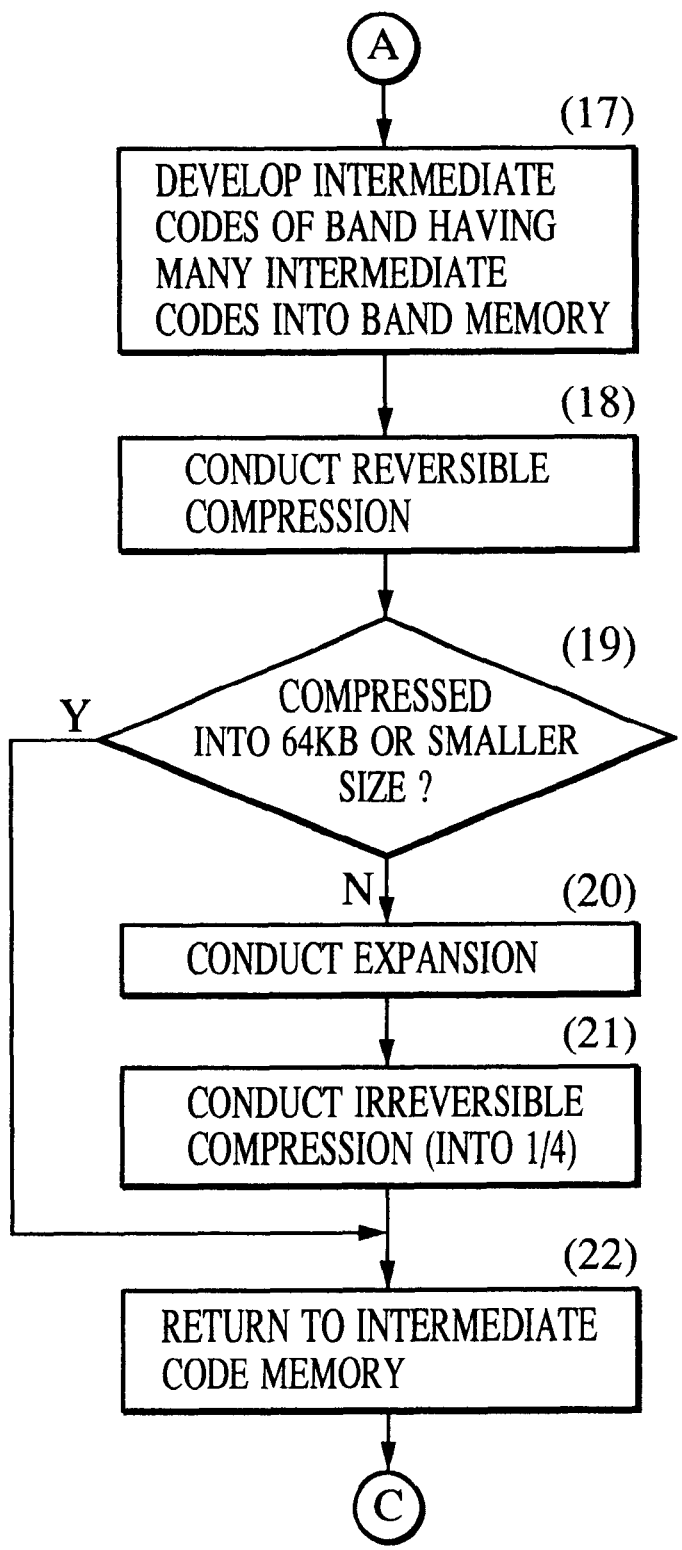

FIGS. 8 and 9 also are flow charts illustrative of further steps of the data processing method for use in the printing apparatus in accordance with the present invention. These flows correspond to data processings performed by the printer 2500 shown in FIG. 1, and have steps (11) to (25).

Referring to these Figures, in Step (1), the CPU 1 of the host computer sends to the printer 2500 the data other than image data, among the document data to be transferred. In Step (2), upon receipt of the data, the CPU 12 of the printer 2500 shifts the data into an input buffer. In Step (12), a judgment is conducted as to whether or not the document data is an end code which indicates the end of the document data. If the document data is the end code, i.e., if the input of the whole one-page data has been completed, the process skips to Step (25) which executes the same printing processing as that described before.

The printing processing in this embodiment is executed as follows. When the printing information of the initial or first band has been developed in the form of dot data and stored in the band memory, a printing command is given to the printing section 17, and the dot data is delivered from the band memory in synchronization with horizontal and vertical synchronizing signals to the printing section 17, thereby printing the data on a sheet of paper. If the dot data has not yet been developed in the band memory, the intermediate codes are read from the portion of the intermediate code memory corresponding to the initial band, and are converted into dot data and developed in the band memory. Then, the developed dot data is subjected to printing in the same manner as that described above.

If the document data is judged as not being an end code in Step (12), the process proceeds to Step (13) which examines whether or not the received data is an inquiry command inquiring about the size of the vacancy in the intermediate code memory 501. If the received data is the inquiry command, Step (23) is performed in which the host computer 1500 is informed of the size of the vacant space in the intermediate code memory 501 through the data communication line 21. The process then returns to Step (11).

Conversely, if Step (13) has judged that the received data is not an inquiry command, the process proceeds to Step (14) which determines whether or not the received data is a clear command for clearing the intermediate code memory 501. If it is judged that the data is a clear command, the process skips to Step (24) in which the CPU 12 clears the intermediate code memory 501 preserved on the RAM 13. The process then returns to Step (11).

If the judgment in Step (14) has proved that the data is a document data, steps are executed in the same way as that in the first embodiment: namely, the data is converted into intermediate codes on band basis in Step (15), and a judgment is made in Step (16) as to whether a vacant space is available in the intermediate code memory 501. If it is judged that there is no vacant area, development into band memory is conducted in Step (17) starting from the band having the greatest size of the intermediate code, and the data developed in the band memory 502 is reversibly compressed in Step (18). Various known reversible compressing method such as run-length method can be used. The process then skips to Step (9) which judges whether or not the size of the compressed data is 64 KB or smaller.

The data size of 64 KB is ¼ the storage area size (256 KB) of each of the first and second band memories. Thus, the judgment performed in Step (9) is to confirm whether or not the data size has been reduced to ¼ the storage capacity of each band memory as a result of the compression. This judgment is conducted for the following reasons.

As stated before, the size of the dot pattern for one page is 4 MB when the printer performs printing at 600 dpt.

Meanwhile, the capacity or area size of the intermediate code memory 501 is 1 MB. Therefore, is the dot pattern of each band is compressed to ¼, it is possible to store image data of one full page in the intermediate code memory 501. Therefore, the data size of 64 KB, which is ¼ the size of the band memory is used as a criterion. In general, character patterns and graphics patterns are very often compressible without impairing quality, because such patterns in most cases consist of continuous black or white portions. In contrast, image data such as dither pattern or those produced by error diffusion technique can hardly be compressed reversibly.

If the judgment in Step (19) has judged that the data size has been reduced to ¼ or smaller as a result of the compression, the process proceeds to Step (22) in which the compressed data is returned to the intermediate code memory 501 which now has a vacancy.

However, if the data size has not been reduced to ¼ or smaller, an answer NO is given to the inquiry made in Step (19), and the process proceeds to Step (20) which conducts expansion of the compressed data, followed by Step (21) which executes irreversible compression. The irreversible compression is conducted by thinning every other dots from the dot data both in X and Y directions, so as to forcibly reduce the data size to ¼. The original size of the dot data can be recovered by expanding the compressed data with multiplication factor of 2 both in the X and Y directions. In this case, however, the image quality is obviously worsened.

When the compressed dot pattern is returned to the intermediate code memory in Step (22), a flag is given to the compressed data indicating that the data has been compressed, as well as a flag indicative of the type of compression, i.e., reversible or irreversible. The process then returns to Step (11) for the entry of the next portion of the document data.

After completion of the transfer of the data other than the image data in Step (2), the process advances to Step (3) in which the host computer 1500 inquires the printer 2500 about the size of the vacant area left in the intermediate code memory. Then, in Step (4), a judgment is conducted as to whether or not the size "n" of the vacant area exceeds the size "m" of the image data which is not to be transferred. If the area size "n" is greater than the image data size "m", the image data is transferred to the printer 2500 without any specific processing, thus completing the process.

However, if the size "n" is judged as being smaller than the size of the image data "m" which is now to be transferred, the process proceeds to Step (5) which examines whether or not the area size "n" is greater than ¼ of the image data size "m". If the answer is YES, Step (9) is executed in which a compression processing is performed in the host computer 1500, so as to reversibly or irreversibly compress the image data into, for example, ¼ the original size, and the compressed image data is sent to the printer 2500 with a compression flag set thereon, thus completing the process. If the image data which has not been compressed is transferred to the printer 2500, the printer 2500 will necessarily be burdened with the series of operations including development of intermediate codes in the intermediate code memory 501 into dot pattern, compression and returning to the intermediate code memory. Consequently, a considerably long processing time is required for the preparatory processing performed by the printer. In this embodiment, such burdening of the printer 2500 can be avoided because the image data is compressed by the host computer 1500 before transferred to the printer 2500: namely, the burden is undertaken by the host computer 1500.

Conversely, if the result of the judgment in Step (5) is such that the area size "n" is smaller than "(¼)m", the above-mentioned series of operations, including development of intermediate codes in the intermediate code memory 501 into dot pattern, compression and returning to the intermediate code memory, have to be conducted by the printer 2500, even if the image data is compressed before the transfer from the host computer 1500. Consequently, a long processing time will necessarily be required. In such a case, therefore, the process proceeds to Step (6) in which an intermediate code memory clear command is sent to the printer 2500 so as to clear the content of this memory. Then, the one-page data inclusive of both the image data and other data is developed into a one-page bit map memory, and the developed one-page data is compressed reversibly or irreversibly into ¼ size. The compressed data is then transferred as image data, together with the compression flag, to the printer 2500, whereby the process is completed.

Thus, according to the second embodiment, the total processing time of the printing can be shortened, because the host computer operates to undertake part of the processing, anticipating overflow of the intermediate code memory of the printer 2500.

A description will now be given as to the relationships between the features of the tenth, eleventh, fourteenth and fifteenth aspects of the invention and the features of the described embodiment, as well as the operations of these aspects, with reference to FIGS. 7 and 8.

The tenth aspect of the present invention pertains to a data processing method for use in a printing system comprising an information processing apparatus and a printing apparatus communicable with each other through a predetermined communication medium (interface, infrared wireless interface, network or the like), the method comprising: a first transferring step (Step (1) of the flow shown in FIG. 7) for transferring first printing information formed by removing image data from one-page printing information to be transferred; a first converting step (Step (15) of the flow shown in FIG. 8) for converting, on a predetermined band basis, the first printing information received from the information processing apparatus into a predetermined intermediate code information; a first storing step (Step (15) of the flow shown in FIG. 8) for storing the intermediate code information obtained through the conversion in a first storage area preserved in a memory resource; and an informing step (Step (23) of the flow shown in FIG. 8) for informing, after the storage of the intermediate code information in the first storage area, the information processing apparatus of the size of vacancy in the first storage area, in response to an inquiry given by the information processing apparatus. Thus, the information processing apparatus can know the size of the vacant area in the first storage area which stores the intermediate code information of the printing information except for the image data.

In accordance with the eleventh aspect of the present invention, the data processing method further comprises: judging step (Steps (3) to (5) of the flow shown in FIG. 7) for comparing the size of the image data to be transmitted with the size of vacancy informed by the printing apparatus; reducing step (Steps (7) and (9) of the flow shown in FIG. 7) for reducing the size of the image data to be transferred based on the result of the judgment; and a second transferring step (Steps (7) to (9) of the flow shown in FIG. 7) for transferring the reduced image data to the printing apparatus. It is therefore possible to store the image data even in the limited area in the memory resource of the printing apparatus.

According to the fourteenth aspect of the present invention, there is provided a storage medium storing a computer-readable program, the computer-readable program comprising: a first transferring step (Step (1) of the flow shown in FIG. 7) for transferring first printing information formed by removing image data from one-page printing information to be transferred; a first converting step (Step (15) of the flow shown in FIG. 8) for converting, on a predetermined band basis, the first printing information received from the information processing apparatus into a predetermined intermediate code information; a first storing step (Step (15) of the flow shown in FIG. 8) for storing the intermediate code information obtained through the conversion in a first storage area preserved in a memory resource; and an informing step (Step (23) of the flow shown in FIG. 8) for informing, after the storage of the intermediate code information in the first storage area, the information processing apparatus of the size of vacancy in the first storage area, in response to an inquiry given by the information processing apparatus. Thus, the program codes corresponding to the flows shown in FIGS. 7 and 8 are stored in a later-mentioned external storage medium or in the internal memory resource, and are read and executed by the CPU 12. Such a way of implementation also is within the scope of the present invention.

The fifteenth aspect of the present invention pertains to a storage medium storing a computer-readable program, wherein the computer-readable program further comprises: judging step (Steps (3) to (5) of the flow shown in FIG. 7) for comparing the size of the image data to be transmitted with the size of vacancy informed by the printing apparatus; a reducing step (Steps (7) and (9) of the flow shown in FIG. 7) for reducing the size of the image data to be transferred based on the result of the judgment; and a second transferring step (Steps (7) to (9) of the flow shown in FIG. 7) for transferring the reduced image data to the printing apparatus. Thus, the program codes corresponding to the flows shown in FIG. 7 are stored in a later-mentioned external storage medium or in the internal memory resource, and are read and executed by the CPU 12. Such a way of implementation also is within the scope of the present invention.

Third Embodiment

In the first embodiment, in the event of an overflow of the intermediate code memory, the development of the intermediate codes into the band memory is conducted on the band which has the greatest size of intermediate code data, as described in connection with Step (7) of the flow shown in FIG. 5. In general, graphics data and character data can be compressed at high compression ratio. The first embodiment, therefore, may be carried out such that the development into the band memory is conducted preferentially on the intermediate codes of a band which has the greatest size of intermediate code data and which is devoid of image data.

Fourth Embodiment

In the first and second embodiments, the image data is reversibly compressed on band basis. This technique has a risk that noticeable discontinuities may appear at the boundaries between adjacent bands. In case of the image data, therefore, the control may be effected such that the reversible compression is effected at once on all the bands containing the image data, and the thus compressed image data is transferred on band basis.

Fifth Embodiment

In the embodiments described hereinbefore, when the intermediate code memory 501 has become full, the operation including the development into dot image and compression of the developed dot data is executed in such an order that the operation is commenced first on the band having greatest size of the intermediate code data. This is not exclusive and the method may be conducted such that, during the preparation of intermediate codes of the successive bands, the intermediate codes are changed into compressed dot data whenever the size of the intermediate code data of a band has exceeded a predetermined size.

A description will now be given of the structure of the computer-readable data processing program for use in the printing system of the present invention, with specific reference to a memory map shown in FIG. 10.

FIG. 10 shows a memory map formed in a storage medium which stores the computer-readable data processing program for use in the printing system of the present invention.

Although not specifically shown in this Figure, the storage medium may store also information for administrating programs in the medium, such as the version information, writer information, and so forth, as well as information which depends on the OS of the program reader, e.g., a computer, such as icons for identifying and displaying programs.

Data subordinate to the programs also are administrated by the directory. The storage medium also may store programs for installing various programs on the computer, decompressing program for decompressing any compressed program to be installed, and so forth.

The functions shown in FIGS. 5, 9, 7 and 8 used in the described embodiments may be executed by the host computer in accordance with programs which are installed externally. The present invention is applicable also to a case where a group of information including programs are supplied to the output apparatus from a storage medium such as a CD-ROM, flash memory, FD or the like, or from an external storage medium through a network.

The storage medium storing the software program codes implementing the functions of the described embodiments is supplied to the system, so that the computer (or CPU or MPU) of the system or apparatus reads and executes these program codes, whereby the objects of the present invention are achieved.

In such a case, the program codes read from the storage medium implement the novel functions of the present invention, so that the storage medium storing such program codes constitutes one form of the present invention.

The storage medium for supplying the program codes may be, for example, a floppy disk, a hard disk, an optical disk, a magneto-optical disk, a CD-ROM, CD-R, magnetic tape, non-volatile memory card, ROM, EEPROM, or the like.

The storage medium in accordance with the invention enables the computer to read and execute the program codes stored therein, so as to implement the functions of the described embodiments. The storage medium, however, also may be such that an OS (operating system) working on the computer conducts part or whole of the processings, in accordance with the instructions given by the program codes stored in the medium, thereby implementing the functions of the described embodiments.

Obviously, the arrangement may be such that the program codes read from the storage medium are written in a function expansion board loaded on the computer or a memory in a function expansion unit connected to the computer, so that a CPU of the function expansion board or unit conducts part or whole of the processings, in accordance with the instructions given by the written program codes, thereby implementing the functions of the described embodiments.

The invention may be applied to a system composed of a plurality of devices or apparatuses, or to a stand-alone apparatus. It will be clear that the invention can also be accomplished by supplying such a system or apparatus with the programs described hereinbefore. In such a case, the storage medium storing the software programs for accomplishing the invention is loaded in and read by the system or the apparatus, so that the system or the apparatus can enjoy the advantages of the present invention.

Furthermore, the invention may be carried out such that a program represented by a software for accomplishing the present invention is down-loaded from a data base on the network by the operation of a communication program, so that a system or apparatus on which the program has been down-loaded can enjoy the advantages of the present invention.

Sixth Embodiment

A description will now be given of the printing system of this embodiment, with reference to FIGS. 12 and 13. In these Figures, the same reference numerals are used to denote the same components as those employed in the first embodiment described before.

Figure 12:
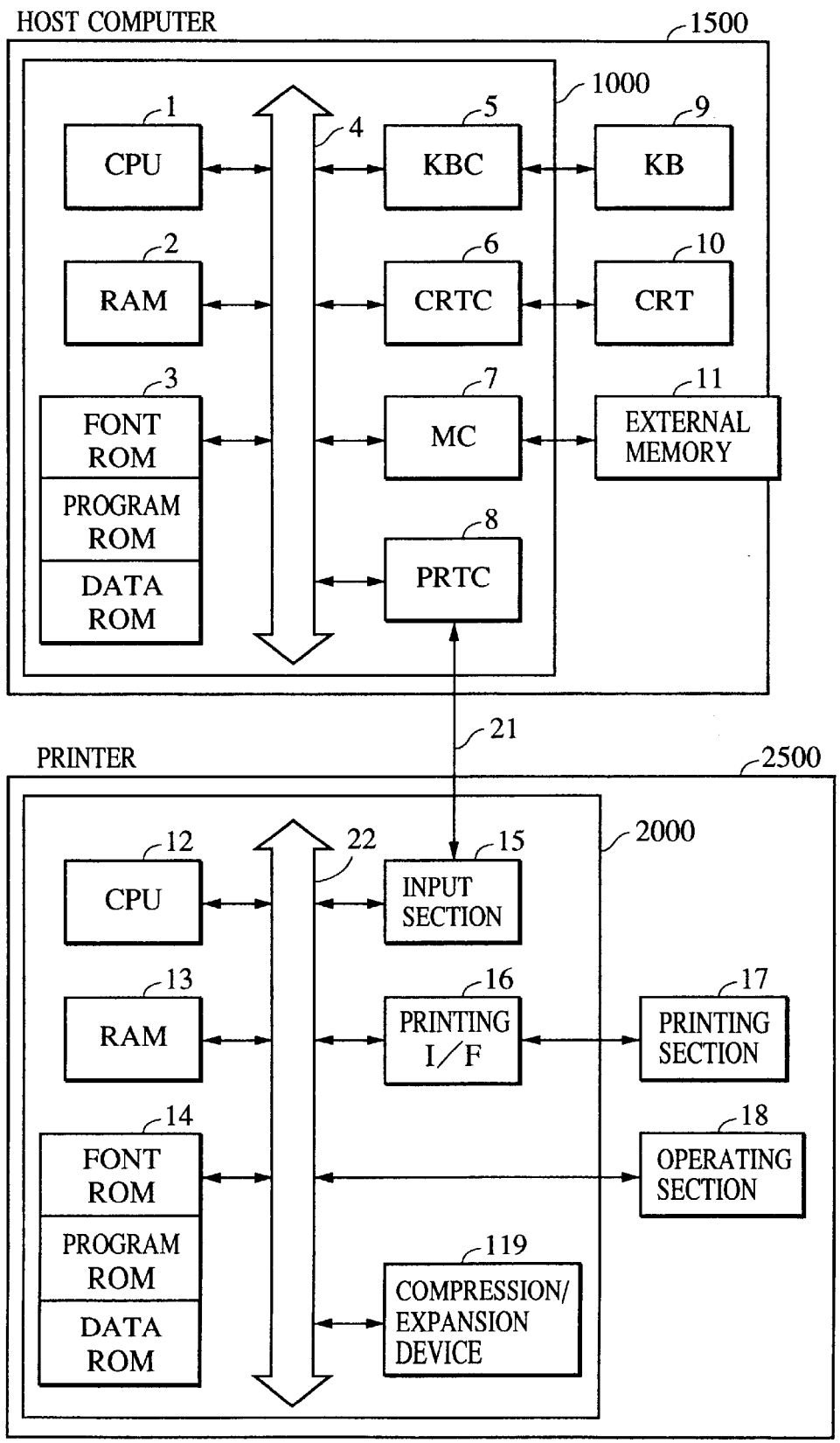
FIG. 12 is a block diagram showing the construction of a printing system which is a sixth embodiment of the present invention.

FIG. 12 is a block diagram showing the structure of the printing system of the sixth embodiment of the present invention. The printing system is basically composed of a host computer 1500 and a printer 2500.

The host computer 1500 has a control section 1000 which includes a CPU 1 capable of executing, in accordance with document processing programs stored in a program ROM of the ROM 3, various processings of document which contain patterns, images, characters and tables, inclusive of table calculations. The CPU 1 performs overall control of various devices connected to a system BUS 4, in accordance with programs which are stored in the program ROM of the ROM 3, external memory 11 or other external storage medium and which implement the processes shown in the flow charts of FIGS. 20, 21 and so on. Numeral 2 designates a RAM which provides a main memory and work areas for the CPU 1.

The ROM 3 also has a font ROM which stores font data used in the document processing, and a data ROM which stores various data such as directory information, printer driver table, and so forth. Numeral 5 designates a keyboard controller (KBC) which controls entry of information from a keyboard (KB) 9 and a pointing device which is not shown. Numeral 6 designates a CRT controller (CRTC) which controls the display on a CRT display (CRT) 10. A memory controller (MC) 7 controls access to the external memory 11 such as a hard disk, floppy disk, or the like.

Numeral 8 designates a printer controller (PRTC) which performs communication processing for communication with the printer 2500 through a bidirectional interface 21. The CPU 1 is capable of executing development of outline fonts (rasterization) onto a display information ROM provided on, for example, the RAM 2, so as to enable WYSIWIG on the CRT 10. The CPU 1 also can open various registered windows in accordance with commands given by, for example, mouse cursor, thereby executing various data processings.

The printer 2500 has a printer controller 2000 which corresponds to the printing apparatus of this embodiment. Numeral 12 designates a printer CPU which performs overall control of devices connected to a system BUS 20, in accordance with processing programs which are stored in the program ROM of ROM 14 or other storage medium and which implements processes shown in flow charts of FIGS. 22 to 25 which will be mentioned later. The printer CPU 16 also serves to output image signals as output information to the printing section (printer engine) 17 which is connected thereto through a printing interface (I/F) 16. The printer interface 16 is a controller which converts document data entered from the host computer 1500 through the input section 15 into dot images of a form which is printable by the printing section 17.

Numeral 13 denotes a RAM which provides a main memory and work areas for the CPU 12. The arrangement is such that the capacity of this RAM can be increased by means of an option RAM which is connected to an expansion port not shown. The RAM 13 has an output information development area, environmental data storage area, NVRAM, and so on. Numeral 14 designates a ROM which includes a font ROM storing font data and other data which are used in generating the above-mentioned output information, and a data ROM which, when the printer is devoid of an external memory such as a hard disk, stores information which are used on the host computer 1000.

Numeral 15 designates an input section. The CPU 12 is communicable with the host computer 1500 through the interface 21, so that the host computer 1500 can be informed of the information available in the printer 2500. Numeral 18 designates an operating section (operation panel) having switches for various operations, as well as LED indicators and so forth. An external memory which is not shown is connectable so as to store font data, emulation program, form data and so on. Numeral 19 denotes a compressor/ expander which performs reversible compression and expansion of dot image data on the RAM 13.

The arrangement may be such that a plurality of the aforesaid memories are connected. It is also possible to provide an NVRAM which is not shown,for the purpose of storage of printer mode setting information given through the operation panel 18. In this embodiment, the functions shown in FIGS. 15 to 19 may be executed by the CPU 1 of the host computer 1500 or the CPU 12 of the printer 2500, in accordance with externally installed programs.

In such a case, the invention may be carried out such that the system including the host computer and the printer is loaded with a group of information including programs, derived from a storage medium which is not shown, e.g., CD-ROM, flash memory, FD or the like, or from an external storage medium via a network, so that such group of information is supplied to the host computer or the printer.

Figure 13:
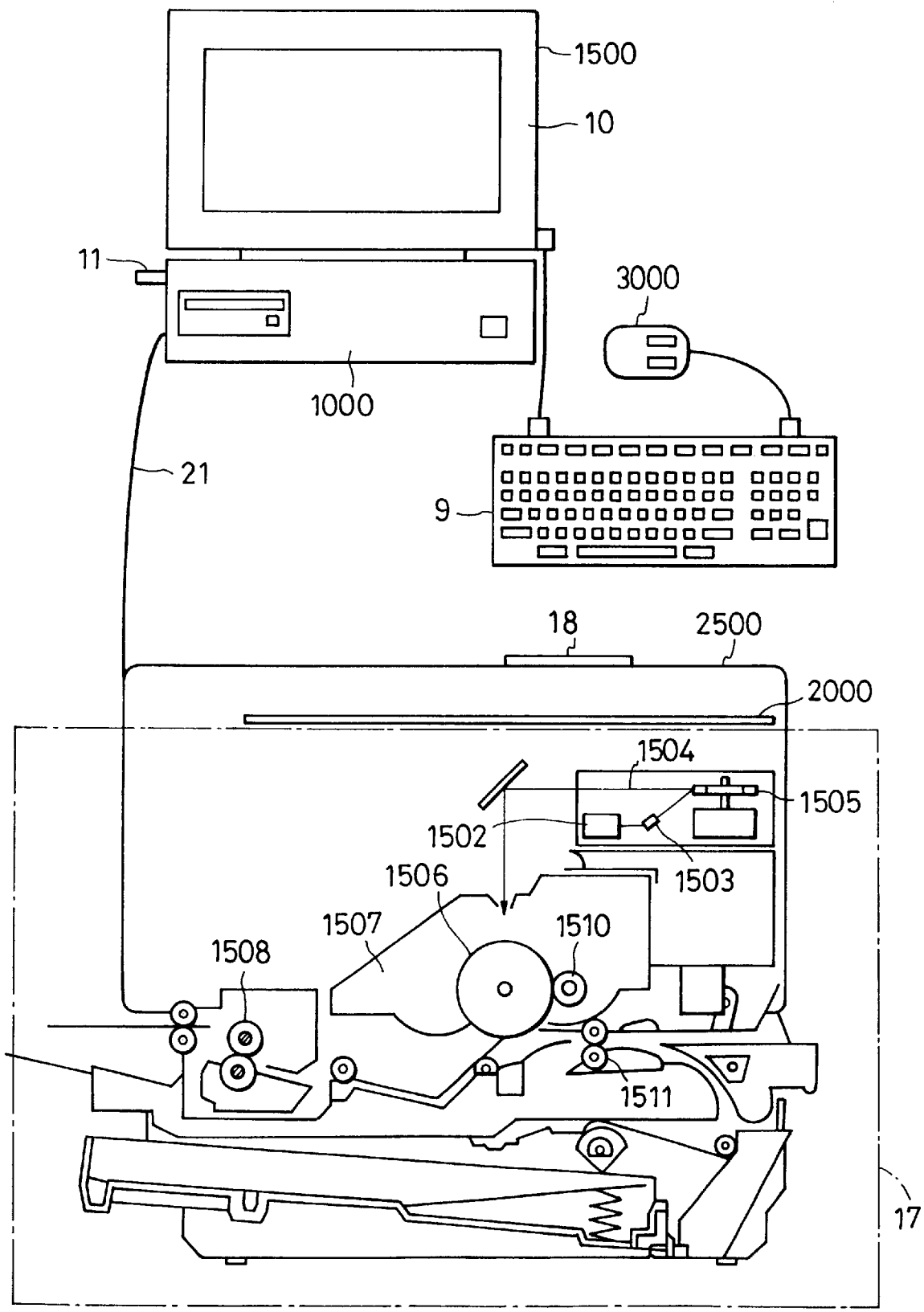
FIG. 13 is a schematic illustration of the printing system shown in FIG. 12.

FIG. 13 schematically shows the construction of the printing system shown in FIG. 12. Hence, the same reference numerals are used to denote the same portions or components as those shown in FIG. 12.

The host computer 1500 has a pointing device 3000 which is connected to a keyboard 9 so as to perform pointing on the display of the CRT 10 by means of a mouse cursor or the like. The printer 2500, e.g., a laser beam printer (LBP), has a laser driver 1502 which is a circuit for driving a semiconductor laser 1503, so as to turn on and off the emission of laser light 1504 from the semiconductor laser 1503 in accordance with video signal from the printer controller 2000.

Numeral 1505 denotes a rotary polygon mirror which deflects the laser light 1504 to the left and right, thereby effecting scanning exposure of the surface of an electrostatic drum 1506. As a result, an electrostatic latent image of, for example, character pattern is formed on the electrostatic drum 1506. A developing device 1510 is disposed on the periphery of the electrostatic drum 1506 so as to develop the electrostatic latent image formed on the electrostatic drum 1506 by the laser light 1504 into visible image by means of a toner. The developed image is then transferred to a recording paper which has been fed into the printer by means of a feeder roller 1511.

Numeral 1508 designates a transfer roller which fixes the toner image transferred to the recording paper by application of heat. A cartridge 1507 contains the electrostatic drum 1506 and the developing device 1510. The LBP 2500 has at least one card slot which permits connection of an option card and a control card of a different language system (emulation card) which provide fonts in addition to internally stored fonts.

Figure 14:
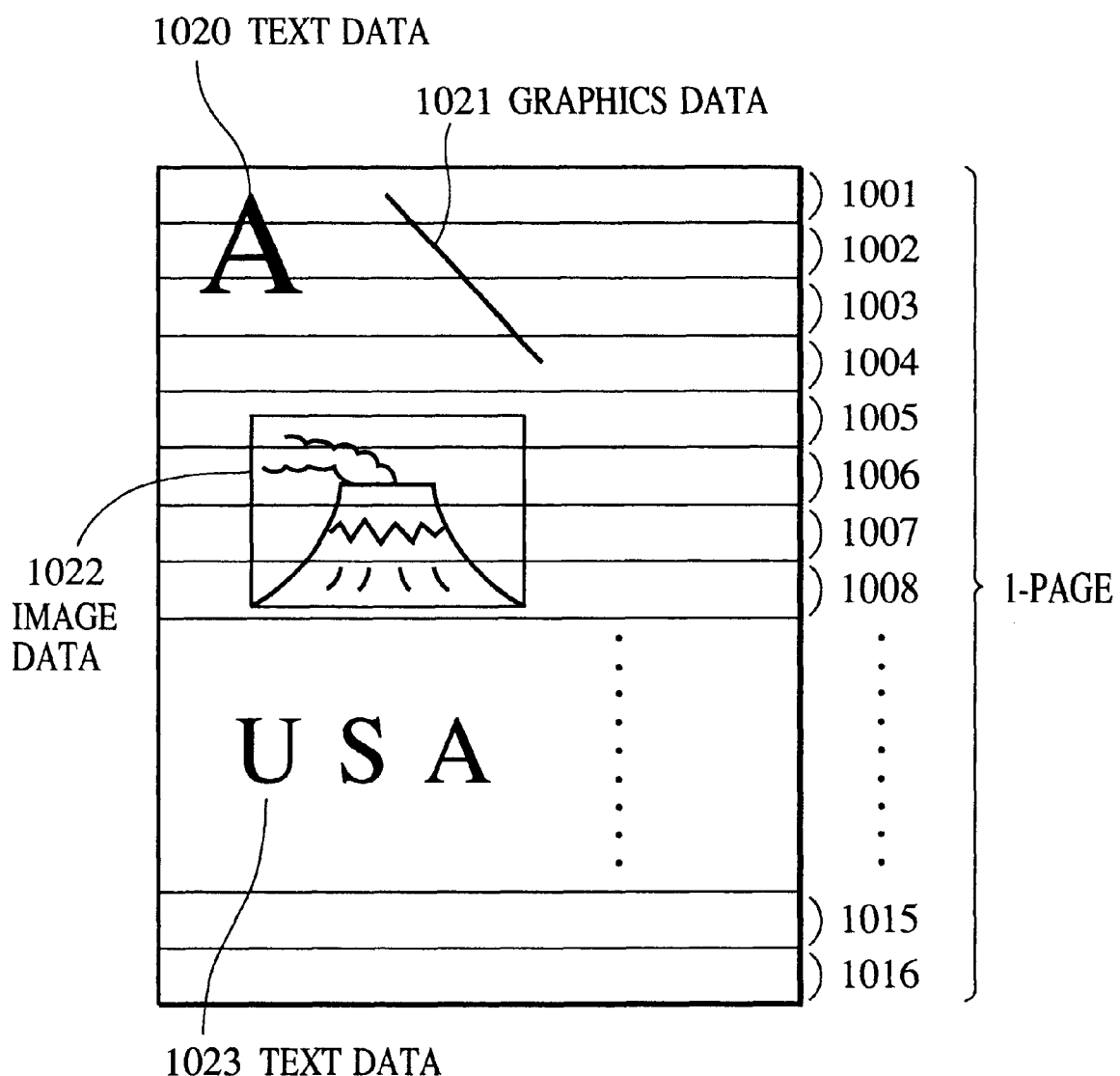
FIG. 14 is a schematic illustration of a one-page printing data which is stored in a RAM or an external memory of a host computer shown in FIG. 12 and which contains text data, graphics data and image data.

FIG. 14 schematically show the structure of one-page print data including text data, graphics data and image data, stored in the RAM 2 of the host computer 1500 or in the external memory 11 which are shown in FIG. 12.

Referring to this Figure, numerals 1001 to 1008, 1015 and 1016 denote bands which will be described later, Lines which form borders between adjacent bands do not appear as lines in the document. Numeral 1020 denotes text data which in this case is a character "A". The character "A" is extending over bands 1001 to 1003. Numeral 1203 indicates text data which is a row of characters "USA". Numeral 1021 indicates graphics data, e.g., hatching lines, extending over the bands 1001 to 1004. Numeral 1022 designates image data which in this case is a picture of a mountain, extending over the bands 1005 to 1008.

Figure 15:
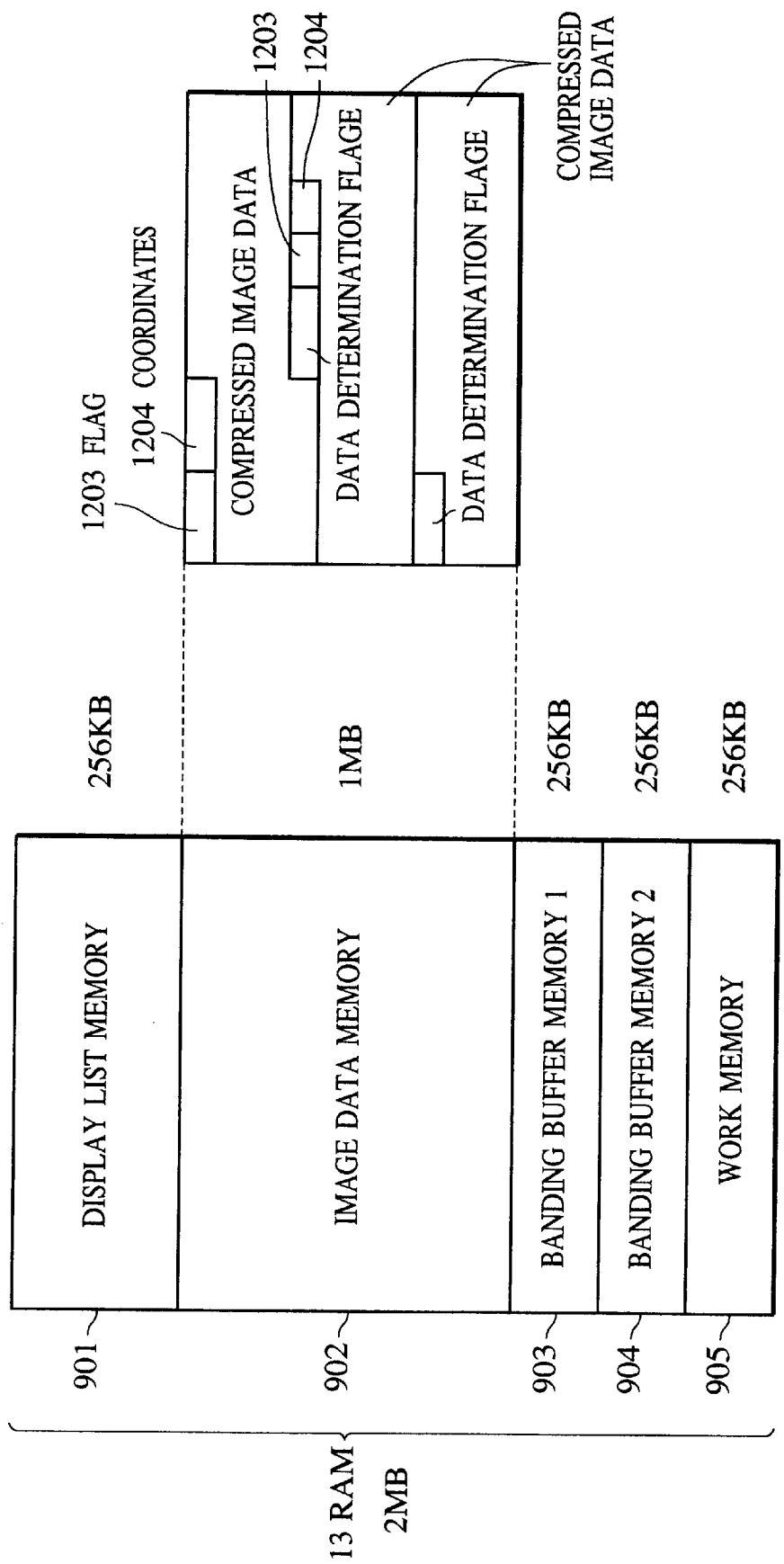
FIG. 15 is an illustration of a memory map in a RAM of a printer shown in FIG. 12.

FIG. 15 is a schematic illustration of a memory map in the RAM 13 of the printer 2500 shown in FIG. 12.

Referring to this Figure, numeral 901 designates a display list memory which is an area for storing a later-mentioned display list. A memory size of, for example, 256 KB is allocated to this area. Numeral 902 designates an image data memory which is an area for storing image data. A memory size of, for example, 1 MB is allocated to this area. Numerals 903 and 904 designate banding buffer memories which are areas for storing developed dot data. A memory size of, for example, 256 KB is allocated to each of these areas.

Referring to the image data memory 902, numeral 1203 designates a flag which will be detailed later and which indicates the contents of the image data. Numeral 1204 designates coordinates of the image data. Thus, the flag 1203, coordinates information 1204, image data compressed by the compression/expansion device 19 and the trailing data definition flag attached to the end of the image data are stored in the mentioned order in the image data memory 902.

In the illustrated embodiment, the printing resolution of the printer of the printing section 17 is assumed to be, for example, 600×600 dpi. When printing is performed on an A-4 size sheet at this resolution, the total size of the full image data for one page of this sheet size is about 4 MB. In contrast, the RAM 13 has a small capacity of 2 MB, as described before.

Thus, in this embodiment, the memory has an area size or the capacity (2 MB) which is smaller than that (about 4 MB) required for storing one-page data. Therefore, this embodiment employs a pair of banding buffers, i.e., banding buffer memories 903 and 904, each having a size which is ¹⁄₁₆ the size of the one-page data. The expansion into dot data to be sent to the printing section 17 is conducted in the size which corresponds to the capacity of each of the banding buffer memories 903, 904. Thus, a double-buffer structure is formed in which two banding buffer memories are used alternately such that, while dot data developed in one of the banding buffer memories is being read and sent to the printing section 17, data of the next band is developed in the other of the banding buffer memories. This operation is repeated to conduct processings for printing one-page data.

In order that this method can be carried out, it is necessary that the data of different bands are independent from one another. However, a document data usually contains text data 1020 and graphics data 1021 which extend over a plurality of bands.

A description will now be given of a display list which is formed by converting the print data shown in FIG. 14 on band basis.

FIGS. 16A and 16B show details of the print data shown in FIG. 14. More specifically, FIG. 16A shows the input data inputted from the host computer 1500, while FIG. 16B shows the display list which is formed as a result of conversion of the input data of FIG. 16A into a plurality of band data.

Referring to FIG. 16A, numeral 5001 denotes a command for designating the pointer coordinates (X, Y), while 5002 denotes a command for designating the character code of the text data "A" 1020 (shown in FIG. 14). Numeral 5003 denotes a command for designating attributes (font size and type) of the character of the text data "A" 1020.

Numeral 5004 designates a command for scribing a straight line and corresponds to the scribing command of the graphics data 1021 (shown in FIG. 14). Numeral 5005 denotes a command for designating attributes (thickness, type) of the straight line, i.e., the attributes (thickness, type) of the graphics data 1021. Numeral 5006 is a command for designating coordinates of the start point of the straight line in the band, i.e., the coordinates of the point at which the graphics data 1021 starts. Numeral 5007 is a command for designating coordinates of the end point of the straight line,i.e., the coordinates of the point at which the graphics data 1021 terminates.

Referring now to FIG. 16B, numerals 5008 to 5017 show the display list for the band 1001, while numerals 5018 to 5027 show the display list for the band 1002. Numeral 5008 is a command for starting the band data, corresponding to the start command for starting the band 1001. Numeral 5009 denotes a command for designating the pointer coordinates (position of scribing of the text data "A" 1020) in the band. Numeral 5010 is a command for designating character code of the text data "A" 1020. Numeral 5011 is a command for designating attributes (size, type) of the character, i.e., the attributes (size, type) of the character of the text data "A" 1020. Numeral 5012 is a command for designating coordinates of the start point of the character in the band, i.e., the point at which the text data "A" 1020 starts in the band 1001.

Numeral 5013 designates a command for scribing a straight line and corresponds to the scribing command of the graphics data 1021 (shown in FIG. 14) in the band 1001. Numeral 5014 denotes a command for designating attributes (thickness, type) of the straight line, i.e., the attributes (thickness, type) of the graphics data 1021. Numeral 5015 is a command for designating coordinates of the start point of the straight line in the band, i.e., the coordinates of the point at which the graphics data 1021 starts in the band 1001. Numeral 5016 is a command for designating coordinates of the end point of the straight line in the band, i.e., the coordinates of the point at which the graphics data 1021 terminates in the band 1001. Numeral 5017 denotes a command which indicates the end of the data in the band 1001.

Numeral 5018 is a command for starting the band data, corresponding to the start command for starting the data of the band 1002. Numeral 5019 denotes a command for designating the pointer coordinates (position of scribing of the text data "A" 1020) in the band. Numeral 5020 is a command for designating character code of the text data "A" 1020. Numeral 5021 is a command for designating attributes (size, type) of the character, i.e., the attributes (size, type) of the character of the text data "A" 1020. Numeral 5022 is a command for designating coordinates of the start point of the character in the band, i.e., the point at which the subsequent portion of the text data "A" 1020 starts in the band 1002.

Numeral 5023 designates a command for scribing a straight line and corresponds to the scribing command of the graphics data 1021 in the band 1002. Numeral 5024 denotes a command for designating attributes (thickness, type) of the straight line, i.e., the attributes (thickness, type) of the graphics data 1021. Numeral 5025 is a command for designating coordinates of the start point of the straight line in the band, i.e., the coordinates of the point at which the graphics data 1021 starts in the band 1002. Numeral 5026 is a command for designating coordinates of the end point of the straight line in the band, i.e., the coordinates of the point at which the graphics data 1021 terminates in the band 1002. Numeral 5027 denotes a command which indicates the end of the data in the band 1002.

FIG. 17 shows image data printable by the printing system shown in FIG. 12. This image data corresponds to the image data 1022 shown in FIG. 14.

Referring to this Figure, $a_l$ (1being from 1 to 16), $b_m$ (m being from 1 to 16) and $c_n$ (n being from 1 to 32) denote dots of the image data.

FIG. 18 shows document data format sent from the host computer 1500 to the printer 2500 shown in FIG. 12.

Referring to this Figure, numeral 1201 denotes a header which indicates that data which follows this code is a document data. Numeral 1202 denotes a flag which indicates the type of the data, specifically, whether the data is text/graphics data or image data. For instance, when the flag 1201 is "1", the data is text/graphics data, whereas, when the flag 1202 is "0", the data is image data. Numeral 1203 denotes a flag which is shown in FIG. 15 and which indicates the contents of the image data. Thus, the flag 1203 is effective only when the f;ag 1202 is "0", i.e., only when the data is image data.

Practically, the status "00" of the flag 1203 indicates all image data, inclusive of the dot data $a_l$ (l being from 1 to 16), $b_m$ (m being from 1 to 16) and $c_n$ (n being from 1 to 32) of the image data shown in FIG. 17. More specifically, the status "01" of the flag 1203 designates the first ¼ of the data, i.e., only the dot data $a_l$ (l being from 1 to 16) of the image data shown in FIG. 17. The status "10" of the flag 1203 designates the next ¼ of the data, i.e., only the dot data $b_m$ (m being from 1 to 16) of the image data shown in FIG. 17. The status "11" of the flag 1203 designates the remainder ½ of the data, i.e., only the dot data $C_n$ (n being from 1 to 32) of the image data shown in FIG. 17. Numeral 1204 designates coordinates of the image data shown in FIG. 15, and is effective only when the flag 1202 indicates that the data is image data, i.e., only when the status of the flag 1202 is "0". Numeral 1205 denotes a data storage area, while 1206 denotes a data end flag indicative of an end of the data.

FIGS. 19A and 19B schematically show dot data restored from the dot data formed by dividing the image data shown in FIG. 17. More specifically, FIG. 19A shows the dot data restored by synthesis from the dot data $a_l$ (1 being from 1 to 16) of the initial ¼ of the image data and the next ¼ dot data $b_m$ (m being from 1 to 16). FIG. 19B shows dot data restored from the dot data $a_l$ (1 being from 1 to 16) of the initial ¼ of the image data alone, by expanding the dot data with a multiplication factor of 2 both in X and Y directions.

A description will now be given of the relationships between the features of the sixteenth to twenty-ninth aspects of the present invention and the features of this embodiment, as ell as operations of these aspects of the invention.

The sixteenth aspect of the present invention pertains to an information processing apparatus capable of performing, through a predetermined communication medium, band communication with a printing apparatus having a memory resource divided to provide band areas each of which being capable of developing an image therein, the information processing apparatus comprising: developing means (This corresponds to CPU 1 which performs developing processing in accordance with program stored in the program ROM of the ROM 3, external memory 11 or other storage medium which is not shown) for acquiring memory resource use status information ("memory-full" status) indicative of the state of use of the memory resource (RAM 13) delivered by the printing apparatus(printer 2500) and for developing printing information which has been transferred to the printing apparatus into image data of a form which can be outputted by the printing apparatus (printer 2500); and transfer control means (This corresponds to CPU 1 which performs, through the printer controller (PRTC) 8, the transfer control processing in accordance with program stored in the program ROM of the ROM 3, external memory 11 or other storage medium which is not shown) for transferring the image data developed by the developing means (CPU 1) to the printing apparatus (printer 2500).

Thus, the CPU 1 acquires the "memory-full" status of the RAM 13 from the printer 2500 through the printer controller 8, and converts the printing information which has been transferred to the printer 2500 into image data of a form which is printable by the CPU 12 of the printer 2500. The image data thus formed is resent to the printer 2500 by the CPU 1 through the printer controller 8. When it is expected that the processing of the printing information to be transferred from the host computer 1500 may fail due to restriction in the size of the storage area allocated in the memory resource of the printer 2500, the printing information is beforehand developed into image data by the host computer 1500, and the thus-developed data is transferred to the printer 2500. The printer 2500, therefore, can directly print the printing information, even when the size of the printing information is so large that the information cannot be processed otherwise due to restriction in the memory resource allocation in the printer 2500.

In accordance with the seventeenth aspect of the present invention, the information processing apparatus (printer 2500) further comprises: data processing means (This corresponds to CPU 1 which performs data processing in accordance with program stored in the program ROM of the ROM 3, external memory 11 or other storage medium which is not shown) for acquiring information concerning image data development area size allocated in the memory resource (RAM 13) of the printing apparatus (printer 2500), comparing based on the acquired information the image data development area size with the total size of the image data to be transferred, and for adjusting the size of the image data to be transferred to the printing apparatus based on the result of the comparison, thereby generating transfer data to be transferred to the printing apparatus. The transfer control means (CPU 1) transfers the transfer data formed by the data processing means. Thus, the CPU 1 acquires the information concerning the size of the area allocated in the RAM 13 of the printer 2500 for development of the image data, and compared this area size with the total size of the image data to be transferred. The CPU 1 then forms the transfer data by adjusting the size of the image data to be transferred, based on the result of the comparison, and transfers the thus-formed transfer data. Therefore, when the size of the image data to be transferred from the host computer 1500 exceeds the size of the image area allocated in the memory resource (RAM 13) of the printer 2500, the transfer is performed after adjustment of the image data size. Consequently, the printer 2500 receives image data of a size which can be stored in the image area allocated in the memory resource.

In accordance with the eighteenth aspect of the present invention, the transfer control means (CPU 1) transfers the image data in a dividing manner in a plurality of transfer cycles. When the size of the image data to be transferred from the host computer 1500 exceeds the size of the image area allocated in the memory resource of the printer 2500, the image data is transferred to the printing apparatus in a divided manner in a plurality of cycles, while the size of the image data is adjusted, whereby the printer 2500 can receive and store the image data which has been sized to be accommodated in the image area allocated in the memory resource and which can restore the original image.

In accordance with the nineteenth aspect of the present invention, the transfer control means (CPU 1) suspends the transfer of image data to the printing apparatus, depending on the memory resource use status (memory-full status) acquired from the printing apparatus during the dividing transfer of the image data. Namely, during the divided transfer of the image data, the CPU 1 receives the "memory-full" status of the RAM 13 from the printer 2500. Upon receipt of this status information, the CPU 1 suspends the transfer of the image data to the printer 2500. Thus, when the size of the image data to be transferred from the host computer 2500 exceeds the size of the image area allocated in the memory resource of the printer 2500, the transfer of the image data to the printer 2500 is ceased, thus preventing transfer to the printer 2500 of the image data of the size exceeding the size of the image area allocated in the memory resource.

In accordance with the twentieth aspect of the present invention, the data processing means (CPU 1) extracts non-overlapping pixel data in a stepping manner (the dot data $a_l$ (1 being from 1 to 16), $b_m$ (m being from 1 to 16) and $c_n$ (n being from 1 to 32)) from the image data and generates the transfer data based on the extracted pixel data. Thus, image data which can produce the whole image is transferred to the printer 2500 in a stepped manner, without any overlap, thus avoiding overflow of the image area allocated in the memory resource of the printer 2500 with the image data transferred from the host computer 1500. It is therefore possible to supply the printer 2500 with image data which can produce whole image as possible, without causing overflow of the image area allocated for the memory resource.

The twenty-first aspect of the present invention pertains to a printing apparatus communicable with an information processing apparatus through a predetermined communication medium, comprising: first storage means (display list memory on the RAM 13) for dividing printing information received from the information processing apparatus (2500) into a plurality of bands (1001 to 1008, 1015 and 1016) of data (display lists 5008 to 5027) and for storing the bands of data; and first informing means (This corresponds to CPU 12 which conducts informing processing by executing program stored in the program ROM of the ROM 14 or other storage medium which is not shown) for informing the information processing apparatus (host computer 1500) of the status (memory-full status) of use of the first storage means (display list memory 901 on the RAM 13). In operation, the printing information received from the host computer 1500 is divided into display lists 5008 to 5027 of the respective bands (1001 to 1008, 1015, 1016), and these display lists are stored in the display list memory 901 on the RAM 13. The CPU 12 informs the host computer 1500 of the "memory-full" status of the display list memory 901. Thus, when the condition is such that the processing of the printing information transferred from the host computer 1500 is expected to fail due to restriction in the printing information storage area allocated in the memory resource of the printer 2500, the host computer 1500 is informed of such a condition. Thus, the host computer 1500 can know, before completing the transfer of the printing information, the risk of overflow of the printing information storage area in the memory resource.

The twenty-second aspect of the present invention pertains to a printing apparatus communicable with an information processing apparatus through a predetermined communication medium, comprising: compression means (compression/expansion device 19) for compressing, in accordance with a predetermined compression protocol, image data received from the information processing apparatus (host computer 1500); second storage means (image data memory on the RAM 13) for storing the compressed image data formed by the compression means (compression/expansion device 19); expansion means (compression/expansion device 19) for expanding, in accordance with a predetermined expansion protocol, the compressed image data stored in the second storage means; and printing means (printing section 17) for printing the image data which has been expanded by the expansion means. In operation, the compression/expansion device 19 compresses the image data received from the host computer 1500 in accordance with a predetermined compression protocol, and the compressed image data thus obtained is stored in the image data memory 902 on the RAM 13. The compressed image data stored in the image data memory 902 on the RAM 13 is expanded by the compression/expansion device. 19 in accordance with a predetermined protocol, and the expanded image data is subjected to printing performed by the printing section 17. Thus, the image data transferred from the host computer 1500 is compressed and stored in the image area allocated in the memory resource, whereby the whole image is printed at high image quality as possible.

In accordance with the third aspect of the present invention, the printing apparatus further comprises second informing means (This corresponds to the CPU 12 which conducts informing processing by executing a program stored in the program ROM of the ROM 14 or other storage medium.) for informing the information processing apparatus of the status ("image data memory full" status) of use of the second storage means (image data memory 902 on the RAM 13). In operation, the CPU 12 informs the host computer 1500 of the "image data memory full" status of the image data memory 902 on the RAM 13, thus clearly showing to the host computer 1500 that the size of the image data transferred from the host computer 1500 has exceeded the size of the image area allocated in the memory resource.

In accordance with the twenty-fourth aspect of the present invention, the printing apparatus further comprises: interpolation means (This corresponds to the CPU 12 which conducts interpolation processing by executing a program stored in the program ROM of the ROM 14 or other storage medium not shown.) for judging the state of development of the compressed image in the second storage means (image data memory 902 on the RAM 13) and for conducting a predetermined interpolation processing on the image data expanded by the expansion means (compression/expansion device 19), thereby restoring the image data. In operation, the CPU 12, upon judging the state of development of the data on the image data memory 902 on the RAM 13, conducts a predetermined interpolation processing on the image data which has been expanded by the compression/expansion device 19, thereby restoring the image data. When the size of the image data transferred from the host computer 1500 exceeds the size of the image area allocated in the memory resource of the printer 2500, the printer performs the restoration of the original image data depending on the size of the image data which has already been transferred to the printer 2500, and conducts printing of the restored image data. Thus, even when the size of the image data exceeds the size of the image area allocated in the memory resource of the printer, it is possible to print the whole image at a high degree of quality as possible, based on the image data which has already been received by the printer 2500.

According to the twenty-fifth aspect, when the use status information ("memory-full" status) concerning the state of use of the memory resource (RAM 13), i.e., the first storage means (display list memory on the RAM 13), is received from the printing apparatus (printer 2500) during transfer of the printing information, the transfer control means (This corresponds to the CPU 1 which conducts transfer control processing through the printer controller 8.) transfers the image data developed by the developing means (CPU 1) to the printing apparatus. The directly printable image data is compressed by the compression means (compression/expansion device 19) and stored in the memory resource (RAM 13), i.e., the second storage means (image data memory on the RAM 13). The compressed data is then expanded by the expanded means (compression/expansion device 19) and printed by the printing means (printing section 17). Thus, the state of use of the memory resource of the printing apparatus (printer 2500) is monitored and, when there is a risk that the printing information to be sent to the printing apparatus may cause an overflow of the storage area allocated in the memory resource, the printing information is directly received from the host computer 1500 in the form of printable image data, and is compressed/expanded so as to be printed without fail, while avoiding overflow of the memory.

According to the twenty-sixth aspect, the host computer 1500 acquires information concerning image data development area size allocated in the RAM 13 of the printer 2500, and CPU 1 compares based on the acquired information the image data development area size with the total size of the image data to be transferred, and adjusts the size of the image data to be transferred to the printer 2500 based on the result of the comparison, thereby generating transfer data to be transferred by the CPU 1. In the event that the size of the image data to be transferred from the host computer 1500 exceeds the size of the image area allocated in the memory resource of the printer 2500, the size of the image data to be transferred is adjusted to a size which can be accommodated by the image storage area allocated in the memory resource. The image data of the thus adjusted size is transferred to and printed by the printer 2500.

According to the twenty-seventh aspect, the transfer control means (CPU 1) transfers the image data in a dividing manner in a plurality of transfer cycles. Therefore, when the size of the image data from the host computer 1500 exceeds the size of the image area allocated in the memory resource of the 2500, the image data to be transferred to the printer 2500 is adjusted by being divided so a to be transferred in a plurality of cycles. Therefore, the printer 2500 can receive image data which can restore the whole original image data, without causing overflow of the image storage area allocated for the memory resource.

According to the twenty-eighth aspect, the CPU 1 of the host computer 1500 suspends the transfer of image data to the printer 2500, based on the "memory-full" status of the image data memory 902 on the RAM 13 acquired from the printer 2500 during the dividing transfer of the image data. Therefore, the printer 2500 gives a clear indication of any risk that the size of the image storage area allocated in memory resource is going to be exceeded by the size of the image data transferred from the host computer 1500, and, upon receipt of such indication, the host computer 1500 can suspend the transfer of the image data to the printer 2500. It is therefore possible to avoid transfer of image data to the printer 2500 in excess of the size of the image area allocated in the memory resource.

According to the twenty-ninth aspect, the data processing means (CPU 1 of the host computer 1500) extracts non-overlapping pixel data in a stepping manner (dot data $a_l$ (1 being 1 to 16), $b_m$ (m being 1 to 16) and $C_n$ (n being 1 to 32)) from the image data and generates the transfer data based on the extracted pixel data, and the transfer data thus generated is transferred to the printer 2500. The printer 2500 then compresses the received image data and stores the compressed image data in the image data memory 902 on the RAM 13. Then, the CPU 12 judges the state of development of the compressed image data in the image data memory 902 of the RAM 13 and conducts a predetermined interpolation processing on the image data expanded by the compression/expansion device 19, thereby restoring the image data. It is therefore possible to supply, stepwise and in a non-overlapping manner, the printer 2500 with the image data which can produce the whole image, without causing the image storage area allocated in the memory resource of the printer 2500 to overflow with the image data supplied by the host computer 1500. The printer 2500 thus restores the original image data by interpolation based on the image data which already has been received. It is therefore possible to transfer to the printer 2500 image data which can approximate the whole image as much as possible, without causing overflow; of the image storage area allocated in the memory resource, whereby printing can be performed at high degree of quality as possible.

A description will now be given of the data processing method for use in the printing system of the present invention, with reference to flow charts shown in FIGS. 20 to 25.

Figure 20:
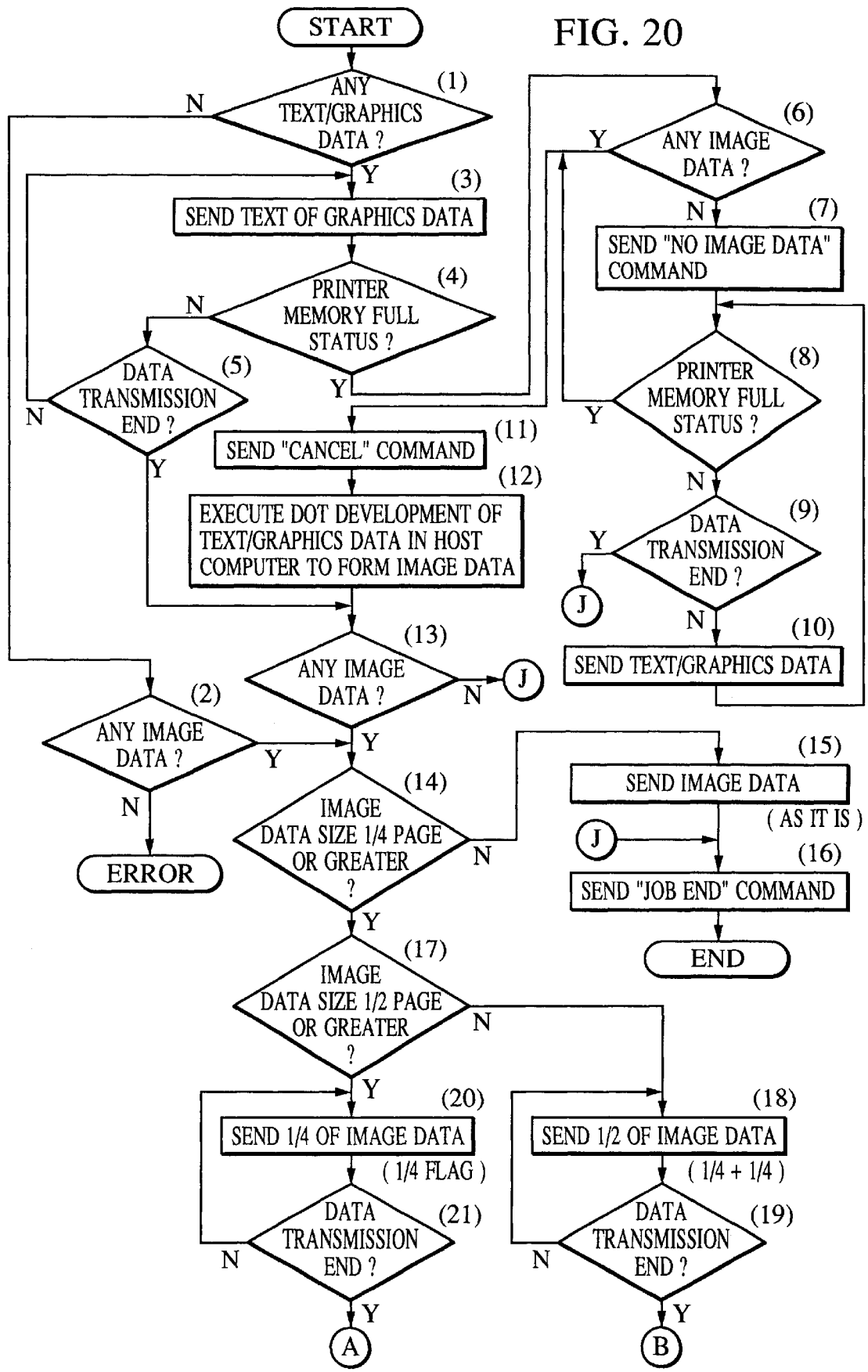
FIG. 20 is a flow chart illustrative of a data processing method in a printing system in accordance with the present invention.
Figure 21:
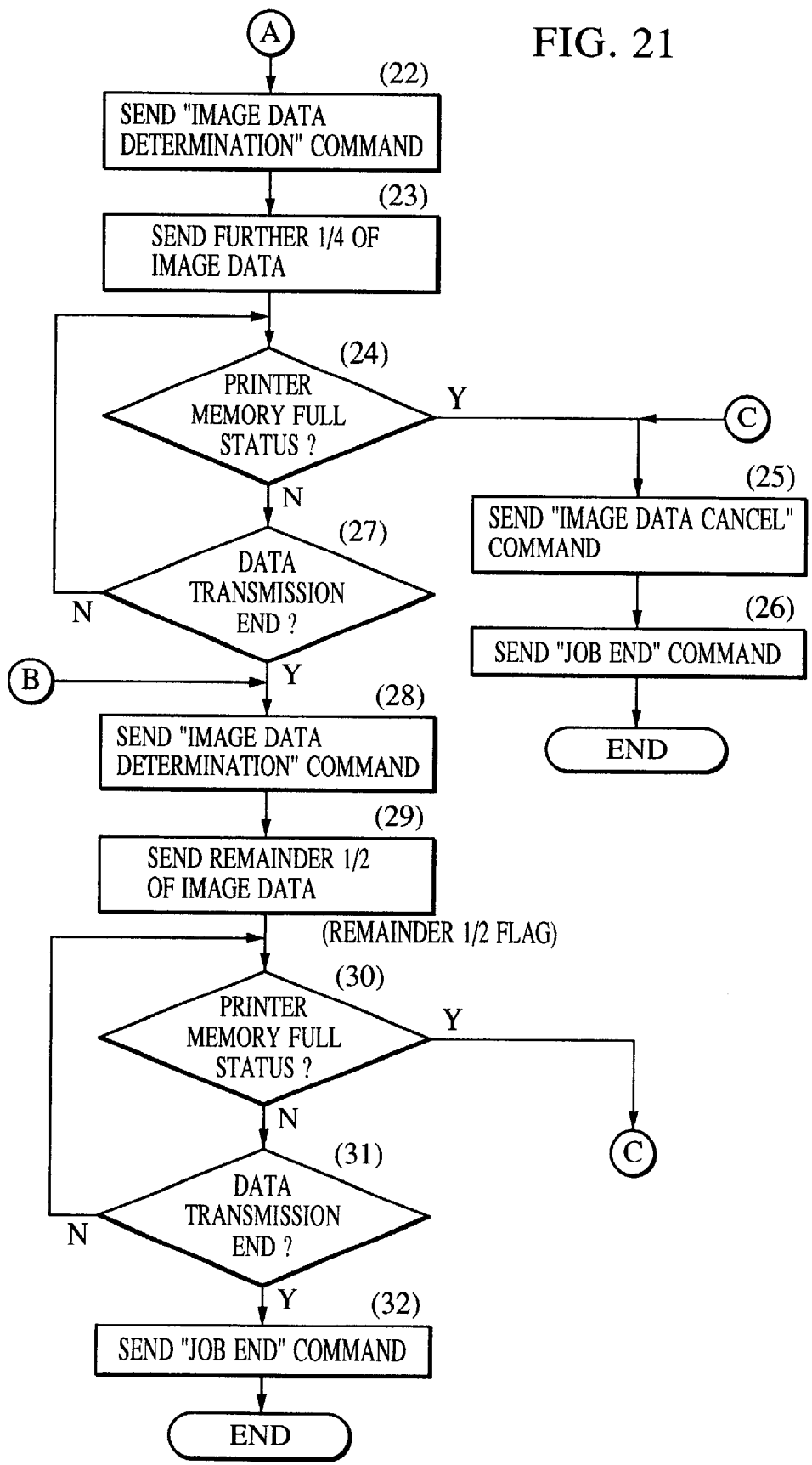
FIG. 21 is a flow chart illustrative of a data processing method in a printing system in accordance with the present invention.

FIGS. 20 to 21 are flow charts illustrative of the data processing method performed in the host computer 1500 of the printing system of the invention. The processing method has Steps (1) to (32).

First of all, a document processing data is formed on the RAM 2 of the host computer 1500, and a printing command is given by the keyboard (KB) 9 or a pointing device (not shown). In Step (1), CPU 1 examines the contents of the document data on the RAM 2 to check for presence of text/graphics data. This check is performed because different types of processing are applied in the printer 2500 to the text/graphics data and the imAge data. If it is judged that there is no text/graphics data, the process proceeds to Step (2) which judged whether or not any image data exists. When it is judged that there is no image data, the process is ceased as being an error. If the judgement in Step (2) has proved that image data exists, the process skips to Step (14) which commences image data transfer processing.

In contrast, when it is judged in Step (1) that the data contains text/graphics data, the process proceeds to Step (3) which transmits the text/graphics data to the printer 2500 through the interface 21. Then, Step (4) checks for receipt of "printer memory-full" status from the printer 2500. If no such status has been received, the process proceeds to Step (5) which checks for completion of data transmission. If the data transmission has not been completed, the transmission processing of Step (3) is repeated, whereas, if the transmission of data has been completed before the display list memory 901 of the printer 2500 becomes full, Steps (13) onwards are executed.

Conversely, if a "printer memory full" status is received from the printer 2500 in Step (4), i.e., when the display list memory 901 of the printer 2500 has become full before the completion of the data transmission, the process advances to Step (6) which examines whether or not any image data exists. When absence of image data is confirmed in Step (6), the process proceeds to Step (7) which ends "image data absence" command to the printer 2500. In such a case, the image data memory 902 in the printer 2500 can be used for the purpose of storing the display list.

The process then proceeds to Step (8) which checks for receipt of "printer memory full" status from the printer 2500. If no such status has been received, the process advances to Step (9) which checks for completion of data transmission. Conversely, if the data transmission has not been completed yet, the process proceeds to Step (10) which transmits text/graphics data to the printer 2500. The process then returns to Step (8) to repeat the operation for checking for the "printer memory full" status. Conversely, if completion of data transmission is confirmed in Step (9), i.e., if the data transmission has been finished before the image data memory 902 of the printer 2500 becomes full, the process skips to Step (16) which delivers a "job end" command to the printer 2500 so as to cause the printer 2500 to perform the printing operation, thus completing the processing.

On the other hand, when receipt of "printer memory full" status from the printer 2500 is confirmed in Step 2500, i.e., when the image data memory 902 of the printer 2500 has become full before the completion of the data transmission, while presence of image data is confirmed in Step (6), the process proceeds to Step (11) which transmits to the printer 2500 a "cancel" command for canceling the text/graphics data which has been sent to the printer 2500. The process then proceeds to Step (12) in which the text/graphics data is dot-developed into the RAM 2 of the host computer 1500, so as to transform the whole text/graphics data into image data. If the original data contains image data, such image data is consolidated with the image data formed by transformation. The process then advances to Step (13).

Step (13) examines whether or not image data exists on the RAM 12. Absence of image data indicates that the transmission of document data has been completed. The process then proceeds to Step (16) which sends a "job end" command to the printer 2500, thereby causing the printer 2500 to perform the printing, thus ceasing the processing.

Conversely, if presence of image data is confirmed in Step (13), image data transmission processing is commenced.

The host computer 1500 examines the size of the image data to be transferred. More specifically, in Step (14), the hist computer examines whether the image data size exceeds ¼ of the one-page data. If the size of the image data is less than ¼ the size of one-page data, the image data can be transferred to the printer without any processing, because the image data memory 902 of the printer, having a storage area size which is ¼ the size of one-page data, can accept such image data. Therefore, when it is judged in Step (14) that the size of the image data is not greater than ¼ the size of one-page data, whole the image data ($a_l$ (1 being from 1 to 16), $b_m$ (m being from 1 to 16) and $c_n$ (n being from 1 to 32) shown in FIG. 17) is sent to the printer 2500. After completion of the transmission of image data, an "image data determined" command is transmitted to the printer 2500. Then, in Step (16) a "job end" command is delivered to the printer 2500 so as to cause the printer 2500 to perform the printing operation, thus completing the processing.

Conversely, of the image data size is judged to be not smaller than ¼ the one page data size in Step (14), the process proceeds to Step (17) which examines whether or not the image data size is ½ or greater of the one-page data size. If the answer is NO, i.e., if the image data size is confirmed to be not smaller than ¼ but less than ½ the size of one-page data, the process proceeds to Step (18) in which data of sizes which are ½ of the image data, i.e., sizes below ¼ the size of one-page data, are sent to the printer 2500. In this case, the dot data $a_l$ (1 being from 1 to 16) and $b_m$ (m being from 1 to 16) are sent to the printer 2500. Then, the sending processing in Step (18) is repeated until completion of data transmission is confirmed in Step (19). When the completion of data transmission is confirmed in Step (19), the process proceeds to Steps (28) onward.

Conversely, if the image data size has been confirmed as being not smaller than ½ the one-page data, the process proceeds to Step (20) which sends the data ($a_l$ (l being from 1 to 16) of FIG. 17) of the size which is ¼ the size of the image data is sent to the printer 2500. The sending operation of Step (20) is repeated until the completion of sending is confirmed in Step (21). After confirming the completion of the data transmission in Step (21), the process proceeds to Step (22) which transmits "image data determination" command to the printer 2500.

Then, in Step (23), data ($b_m$ (m being from 1 to 16) of FIG. 17) of the size which is ¼ the size of the image data is sent to the printer 2500, followed by execution of Step (24) which checks for receipt of "printer memory full" status from the printer 2500. When no "printer memory full" status is confirmed, the operation of checking for receipt of "printer memory full" status of Step (24) is repeated, until completion of data transmission is confirmed in Step (27). When the completion of data transmission is confirmed in Step (27), i.e., when the transmission of data has been finished before the image data memory 902 of the printer 2500 becomes full, the process proceeds to Steps (28) onwards.

Conversely, when "printer memory full" status is received in Step (24), i.e., when the image data memory 902 of the printer 2500 has become full before the completion of the data transmission, the process proceeds to step (25) which ends to the printer 2500 an "image data cancel" command for canceling the text/graphics data which has been transferred to the printer 2500. The process then advances to Step (26) which sends a "job end" command to the printer 2500, thus completing the processing.

In Step (28), an "image data determination" command is sent to the printer 2500 And, in Step (29), the remainder ½ of the image data, i.e., dot data $C_n$ (n being from 1 to 32) of FIG. 17, is sent to the printer 2500. Then, Step (30) is executed to check for receipt of "printer memory full" status from the printer 2500. If "printer memory full" status has not been received, the checking operation for the receipt of the "printer memory full" status is repeated until completion of the data transmission is confirmed in Step (31). When the completion of data transmission is confirmed in Step (31), i.e., if the data transmission is completed before the image data memory 902 of the printer 2500 becomes full, Step (32) is executed to send a "job end" command to the printer 2500, so as to cause the printer 2500 to perform the printing operation, thus completing the processing.

However, if the "printer memory full" status is received in Step (30), i.e., when the image data memory 902 of the printer 2500 has become full before the completion of the data transmission, the canceling processing is executed through Steps (25) onwards.

A description will now be given of the relationships between the features of the thirtieth, thirty-first, thirty-fifth and thirty-sixth aspects of the present invention, as well as operations of these aspects, with reference to FIGS. 20 and 21.

The thirtieth aspect of the present invention pertains to a data processing method for use in an information processing apparatus capable of performing, through a predetermined communication medium, band communication with a printing apparatus having a memory resource divided to provide band areas each of which being capable of developing an image therein, the method comprising: a developing step (Step (12) of the flow shown in FIG. 20) for acquiring memory resource use status information delivered by the printing apparatus and for developing printing information which has been transferred to the printing apparatus into image data of a form which can be outputted by the printing apparatus; and a first transferring step (Steps (15), (18), (20) of the flow shown in FIG. 20 and Steps (22), (23), (29) of the flow shown in FIG. 21) for transferring the image data developed by the developing means to the printing apparatus. In the event that processing of printing information transferred from the host computer 1500 is expected to fail due to restriction in the printing information storage area allocated in the RAM 13 of the printer 2000, the printing information is beforehand developed into image data by the CPU of the host computer 1500, and the thus-developed image data is sent to the printer 2500. It is therefore possible to print the printing information which otherwise will fail to be processed due to restriction in the memory resource allocation.

In accordance with the thirty-first aspect of the present invention, the data processing method further comprises: a data processing step (Steps (17) onward of the flow shown in FIG. 20) for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby generating transfer data to be transferred; and a second transferring step (Steps (15), (18), (20) of the flow shown in FIG. 20 and Steps (22), (23), (29) of the flow shown in FIG. 21) for transferring the transfer data in a dividing manner in a plurality of transfer cycles. In accordance with this aspect of the invention, the image data is transferred to the printer 2500 in a stepped manner in accordance with the size of the image data to be transferred from the host computer 1500. It is therefore possible to transfer as much image data as possible to the printer 2500, even when the size of the image data to be transferred exceeds the size of the image storage area allocated in the memory resource of the printer 2500.

The thirty-fifth aspect of the present invention pertains to a storage medium storing a computer-readable program, the computer-readable program comprising: a developing step (Step (12) of the flow shown in FIG. 20) for acquiring memory resource use status information delivered by the printing apparatus and for developing printing information which has been transferred to the printing apparatus into image data of a form which can be outputted by the printing apparatus; and a first transfer step (Steps (15), (18), (20) of the flow shown in FIG. 20 and Steps (22), (23), (29) of the flow shown in FIG. 21) for transferring the image data developed by the developing means to the printing apparatus. Thus, program codes corresponding to the processes shown in FIGS. 20 and 21 are stored in a later-mentioned storage medium or in the internal memory resource, and the CPU reads and executes the stored program codes. This way of implementation also falls within the scope of the present invention.

In accordance with the thirty-sixth aspect of the present invention, the computer-readable program further comprises: a data processing step (Steps (17) onward of the flow shown in FIG. 20) for acquiring information concerning image data development area size allocated in the memory resource of the printing apparatus, comparing based on the acquired information the image data development area size with the total size of the image data to be transferred, and for adjusting the size of the image data to be transferred to the printing apparatus based on the result of the comparison, thereby forming transfer data to be transferred; and a second transferring step (Steps (15), (18), (20) of the flow shown in FIG. 20 and Steps (22), (23), (29) of the flow shown in FIG. 21) for transferring the transfer data in a dividing manner in a plurality of transfer cycles. Thus, program codes corresponding to the processes shown in FIGS. 20 and 21 are stored in a later-mentioned storage medium or in the internal memory resource, and the CPU reads and executes the stored program codes. This way of implementation also falls within the scope of the present invention.

According to these aspects of the invention, in the event that processing of printing information transferred from the host computer 1500 is expected to fail due to restriction in the printing information storage area allocated in the RAM 13 of the printer 2000, the printing information is beforehand developed into image data by the CPU of the host computer 1500, and the thus-developed image data is sent to the printer 2500. It is therefore possible to print as much as possible the printing information which otherwise will fail to be processed due to restriction in the memory resource allocation. In addition, since the image data is transferred to the printer 2500 in a stepped manner in accordance with the size of the image data to be transferred from the host computer 1500, it is therefore possible to transfer as much image data as possible to the printer 2500, even when the size of the image data to be transferred exceeds the size of the image storage area allocated in the memory resource of the printer 2500.

FIGS. 22 to 25 are flow charts showing image processing method for use in the printing system of the present invention. The method has Steps (1) to (41) which are executed by the printer 2500.

In Step (1), the printer 2500 waits for data to be received from the host computer 1500. When the data is received from the host computer 1500, the process advances to Step (2) which judged whether or not the received data is an image data. If it is judged that the received data is an image data, Steps (26) onward are executed to conduct an image data storage processing.

Conversely, if Step (2) has judged that the received data is not an image data, i.e., when the received data is a text/graphics data, the process advances to Step (3) in which the CPU 12 analyzes the received data and converts the same into a display list as shown in FIG. 16B. The display list thus obtained is stored in the display list memory 901 of the RAM 13.

Then, in Step (4), a judgment is conducted as to whether or not the display list memory 901 is full. When the storage of the display list is completed before the display list memory 901 becomes full, the process advances to Step (5) in which a judgment is conducted whether a "job end" command has been received from the host computer 1500. When there is no receipt of such a "job end" command, the process returns to Step (1) to execute an operation for receiving image data.

Conversely, when Step (5) has judged that a "job end" command has been received from the host computer 1500, the process advances to Step (6) which performs printing of the data, thereby completing the processing.

Referring again to Step (4), if this Step has judged that the display list memory is full, Step (7) is executed in which the printer 2500 sends a "memory full" status to the host computer 1500 through the interface 21. Then, in Step (8), a judgment is conducted as to whether or not a "cancel" command has been received from the host computer 1500. When it is judged that the "cancel" command has been received, the process advances to Step (9) which erases the display list stored in the display list memory 901 in Step (3). Then, the "memory full" status is dismissed and the process returns to Step (1) to commence data receiving processing.

When Step (8) has judged that there is no receipt of the "cancel" command from the host computer 1500, the process advances to Step (10) which judges whether or not a "job end" command has been received from the host computer 1500. If such "job end" command has been received, the process returns to Step (6) which executes the printing processing, thus completing the processing.

However, if Step (10) has judged that there is no receipt of the "job end" command from the host computer 1500, the process advances to Step (11) which determines whether or not a "no image" command has been inputted from the host computer 1500. If such a "no image" command has been input, the process advances to Step (12) which examines whether or not a "reset" command has been inputted from the host computer 1500. If there is not input of such "reset" command, the process returns to Step (8) for checking again whether or not a "cancel" command has been inputted. However, if Step (12) has judged that a "reset" command has been received from the host computer 1500, the process advances to Step (13) which clears the RAM 13 and resets the system so as to return the process to Step (1) to commence receiving processing.

When the judgment in Step (11) has shown that a "no image" command has been received from the host computer 1500, the process advances to Step (14) which combines the areas of the display list memory 901 and the image data memory 902 so as to provide an expanded area for the display list memory, and dismisses the "memory full" status. The process then advances to Step (15) in which the remainder data, i.e., text/graphics data, is received from the host computer 1500, and then to Step (16) in which the CPU 12 analyzes the received data and converts the same into a display list as shown in FIG. 16B. The display list thus formed is stored in the display list memory 901 of the RAM 13.

The process then advances to Step (17) which determines whether or not the expanded display list memory 901 has become full. If the storage of the display list is completed before the expanded display list memory 901 becomes full, the process advances to Step (18) which determines whether or not a "job end" command has been received from the host computer 1500. When it is judged that there is no input of the "job end" command from the host computer 1500, the process returns to Step (1) to prepare for receiving of data.

However, if the judgement made in Step (18) shows that a "job end" command has been received from the host computer 1500, Step (19) is executed to perform printing of the data, thus completing the processing.

If the judgment in Step (17) shows that the expanded display memory 901 has become full, Step (20) is executed in which the printer 2500 sends a "memory full" status to the host computer 1500 through the interface 21. Then, in Step (21), a judgment is conducted as to whether or not a "cancel" command has been received from the host computer 1500. If it is judged that such a "cancel" command has been inputted, the process advances to Step (22) in which the display list stored in the expanded display list memory 901 in Steps (3) and (16) is erased. Then, after erasion of the "memory full" status, the process returns to Step (1) to prepare for receiving of data.

However, if the judgment in Step (21) shows that there is no input of "cancel" command from the host computer 1500, the process advances to Step (23) which examines whether or not a "job end" command has been received from the host computer 1500. If the "job end" command has been received, the process returns to Step (19) which executes the printing processing, thereby completing the process.

In contrast, when the judgment made in Step (23) shows that there is no input of "job end" command from the host computer 1500, the process advances to Step (24)which examines whether or not a "reset" command has been received from the host computer 1500. If such a "reset" command has not been inputted, the process returns to Step (21) which checks for the receipt of the "cancel" command. However, if the judgement made in Step (24) shows that no "reset" command has been inputted from the host computer 1500, the process advances to Step (25) which clears the RAM 13 and resets the system so that the process returns to the receiving processing step, i.e., Step (1).

A description will now be given of the case where the judgment conducted in Step (2) shows that the received data is an image data. In this case, the process skips to Step (26) which sends the received data to the compression/expansion device 19 so as to effect compression of the data. The image data, with which the "image determination command" has been received from the host computer 1500, is stored in the image data memory 902. The compression/expansion processing performed by the compression/expansion device 19 may be conducted reversibly, i.e., such that the original data is restored by expanding the compressed data. In this embodiment, such a reversible compression may be effected in accordance with any of known techniques such as run-length method, MH method, MR method, MMR method, JBIG method and so forth. Description of such methods is omitted.

Step (27) determines whether or not the image data memory 902 has become full. When the storage of the image has been completed before the image data memory 902 becomes full, Step (28) is executed to determine whether or not a "job end" command has been inputted from the host computer 1500. When the judgment shows that no such "job end" command has been received from the host computer 1500, the process returns to Step (1) to prepare for processing of received data.

However, if the judgment made in Step (28) shows that a "job end" command has been received from the host computer 1500, the process advances to Steps (29) onward.

If the judgment conducted in Step (27) shows that the image data memory 902 has become full, the process skips to Step (31) in which the printer 2500 sends a "memory full" status to the host computer 1500 through the interface 21. Then, Step (32) is executed in which a judgment is conducted as to whether or not an "image data cancel" command has been received from the host computer 1500. If the "image data cancel" command has been received, the process advances to Step (33) which erases the incomplete image data which has been stored in the image data memory 902. Then, the process advances to Step (34) which examines whether or not a "job end" command has been received. If the judgment made in Step (32) shows that no "image data cancel" command has been received, the process advances to Step (34) which checks for the receipt of the "job end" command.

If the judgment made in Step (34) shows that a "job end" command has been received from the host computer 1500, the process advances to Step (29) onward, whereas, if the judgement shows that no such "job end" command has been received, the process advances to Step (35) which determines whethe or not a "reset" command has been received from the host computer 1500. If no input of such "reset command" is confirmed, the process returns to Step (34) which again checks for the receipt of the "job end" command.

If the judgment executed in Step (35) shows that a "reset" command has been received from the host computer 1500, Step (36) is executed to clear the RAM 13 and to reset the system, whereby the process returns to Step (1) to prepare for processing of received data.

When receipt of "job end" command is confirmed in Step (28) or (34), Step (29) is executed to examine the state of the image data flag 1203 in the image data memory 902. In Step (30), a judgement is conducted check for presence of the flag indicative of existence of the remainder ½ data, i.e., the image flag 1203 of "11" shown in FIG. 18. When it is judged that there is the flag indicative of the existence of the remainder ½ data, the process advances to Step (37). Step (37) restores the original image data by synthesizing, in accordance with the disposition shown in FIG. 17, the initial ¼ data ($a_l$ (1 being 1 to 16) of FIG. 17), the next ¼ data ($b_m$ (m being 1 to 16) of FIG. 17) and the remainder ½ data ($c_n$ (n being 1 to 32) of FIG. 17), while expanding these data independently by the expansion/compression device 19. Needless to say, X and Y coordinates 1204 shown in FIGS. 18 and 15 of the image data are examined during the restoration of the original image, and the image data having the same coordinates are synthesized with each other.

Then, Step (38) is executed in which, if there are any display list and data stored in the display list memory 901, the image data synthesized in Step (37) is further consolidated with such display list and data, and then the printing is performed with the consolidated data. The processings of Steps (37) and (38) are executed for the respective bands such that the processing of each of the bands is performed independently of the other bands. When these processings are finished on all the bands, the whole processing is completed.

When the judgment made in Step (30) shows that there is no flag indicative of existence of the remainder ½ data, i.e., when there is no image data flag 1203 of the value "11" as shown in FIG. 18, the process advances to Step (39) in which a judgment is made as to whether or not a data flag is presence indicative of the next ¼ data, i.e., an image data flag 1203 having the value of "10" as shown in FIG. 18. If the judgement shows that such a data flag indicative of the existence of the next ¼ data is present, the process proceeds to Step (41). This Step (41)forms an image data by synthesizing, in accordance with the disposition shown in FIG. 19A, the initial ¼ data ($a_l$ (1 being 1 to 16) of FIG. 17) and the next ¼ data ($b_m$ (m being 1 to 16) of FIG. 17), while expanding these data independently by the expansion/compression device 19. It is thus possible to avoid printing failure of the image data, although the image quality is impaired because the amount of the data forming the image is only half that of the original image data. If there is any display list and data stored in the display list memory 902, Step (38) performs synthesis or consolidation of such display list and data with the image data which has been synthesized in Step (41), and printing is executed with this consolidated data. The processings of Steps (41) and (38) are executed for the respective bands such that the processing of each of the bands is performed independently of the other bands. When these processings are finished on all the bands, the whole processing is completed.

If the judgment conducted in Step (39) shows that there is no flag indicative of existence of the next ¼ data, i.e., when there is no image data flag 1203 having the value of "10" as shown in FIG. 18, the initial ¼ data (a$_l$ (1being 1 to 16) of FIG. 17) is expanded by the compression/expansion device 19 at a multiplication factor 2, both in the X and Y directions, thus forming an enlarged image data as shown in FIG. 19B. It is thus possible to avoid printing failure of the image data, although the quality of the synthesized image is further impaired because the amount of the data forming the image is only ¼ that of the original image data.

Then, if there is any data of display list stored in the display list memory 901, Step (38) consolidates the image data formed in Step (40) with the display list and data, and performs the printing based on the thus-consolidated data. The processings of Steps (40) and (38) are executed for the respective bands such that the processing of each of the bands is performed independently of the other bands. When these processings are finished on all the bands, the whole processing is completed.

A description will now be given of the relationships between the features of the thirty-second, thirty-fourth, thirty-seventh and thirty-ninth aspects of the present invention, as well as operations of these aspects, with reference to FIGS. 22 to 25.

Figure 22:
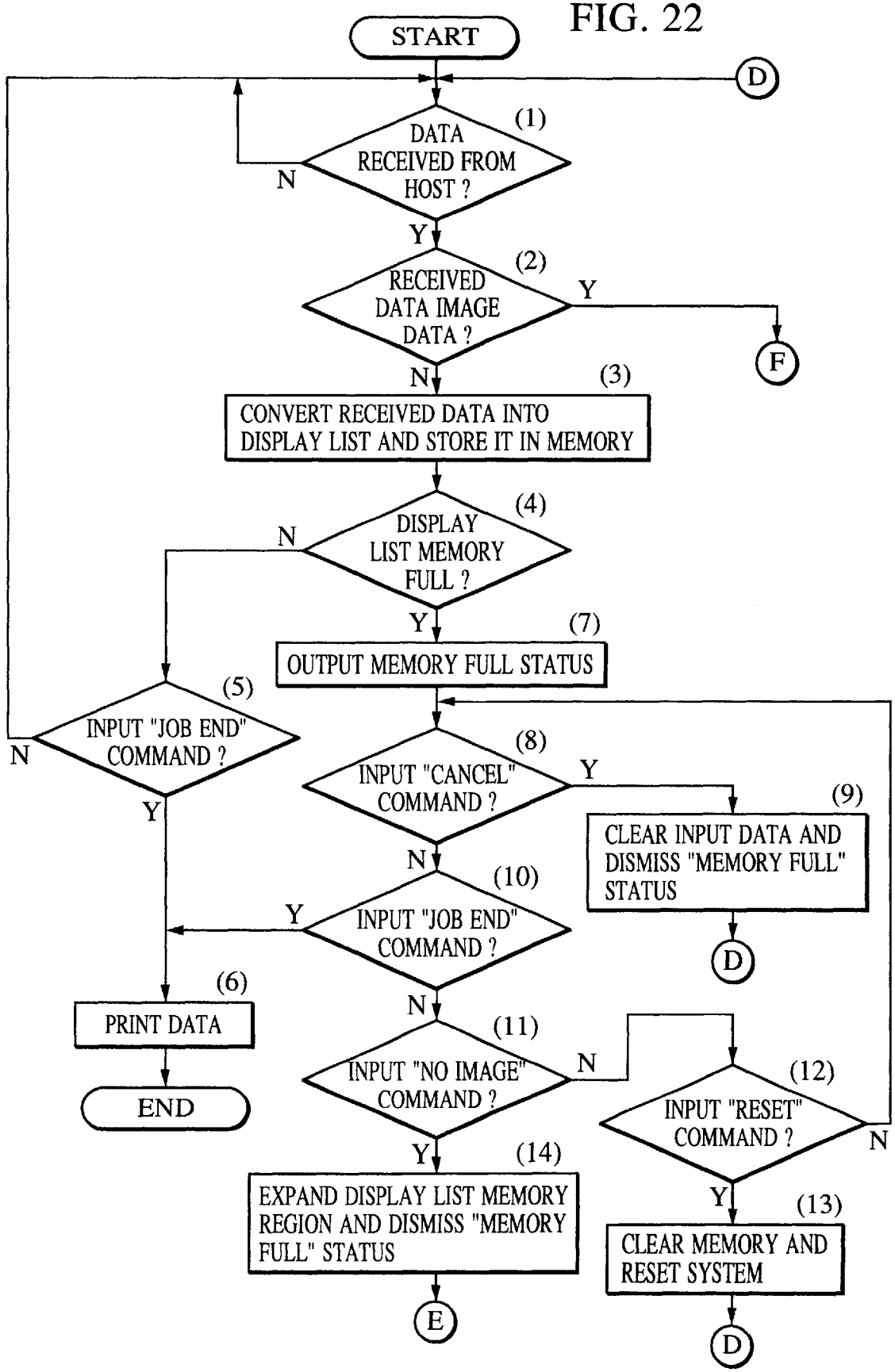
FIG. 22 is a flow chart illustrative of an image processing method in a printing system in accordance with the present invention.
Figure 23:
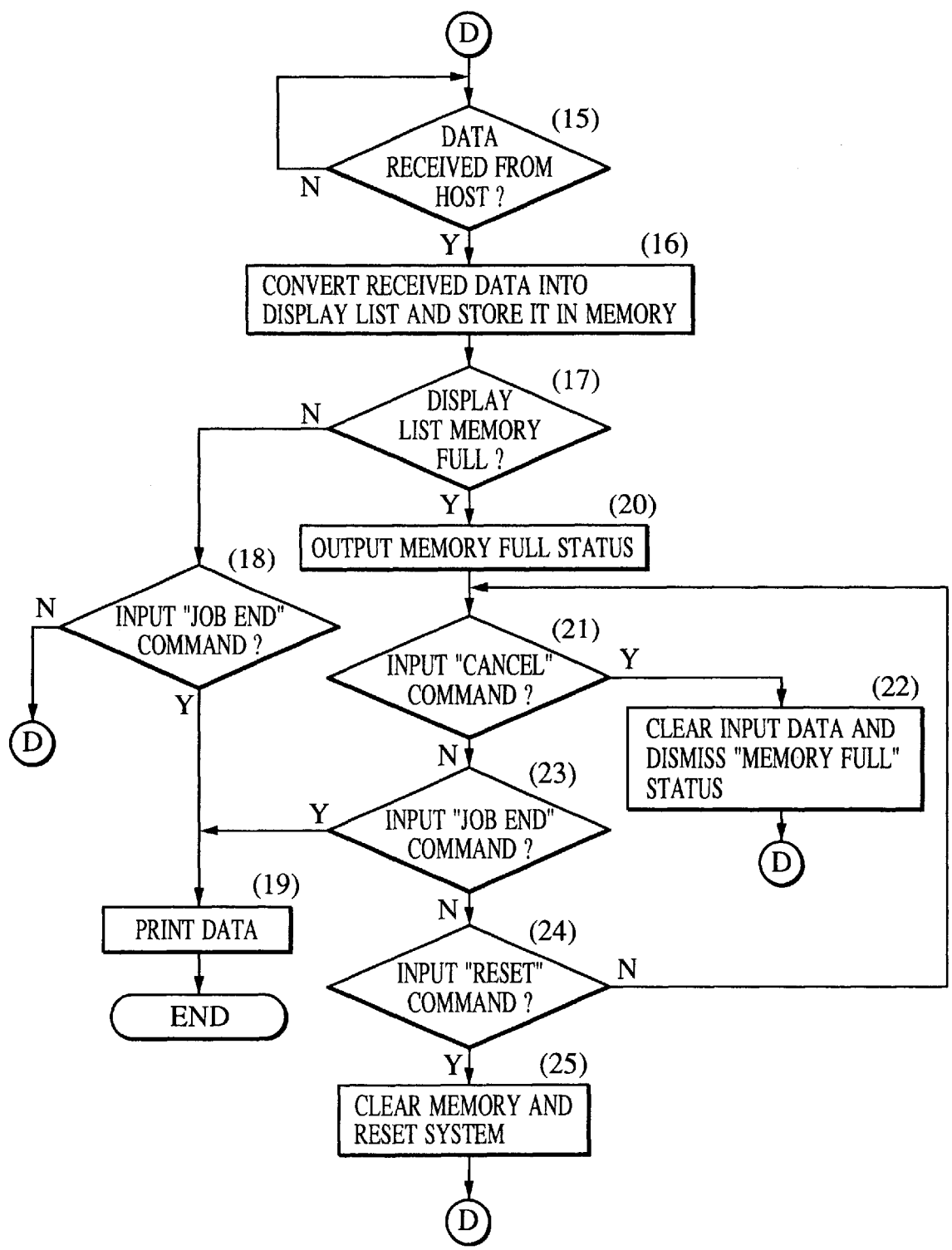
FIG. 23 is a flow chart illustrative of an image processing method in a printing system in accordance with the present invention.

The thirty-second aspect of the present invention pertains to a data processing method for use in printing apparatus communicable with an information processing apparatus through a predetermined communication medium, the method comprising: first storing step (Step (3) of the flow shown in FIG. 22) for dividing printing information received from the information processing apparatus into a plurality of bands of data and for storing the bands of data in first storage means; and first informing step (Steps (4) and (7) of the flow shown in FIG. 22) for informing the information processing apparatus of the status of use of the first storage means. When there is a risk that processing of the printing information from the host computer 1500 may fail due to restriction in the printing information storage area allocated in the RAM 13 of the printer 2500, the host computer 1500 is informed of such a risk and beforehand develops the printing information into image data. The printer 2500 receives the thus-developed image data, so that the printing information which otherwise cannot be printed due to restriction in the memory resource allocation can safely be printed.

Figure 24:
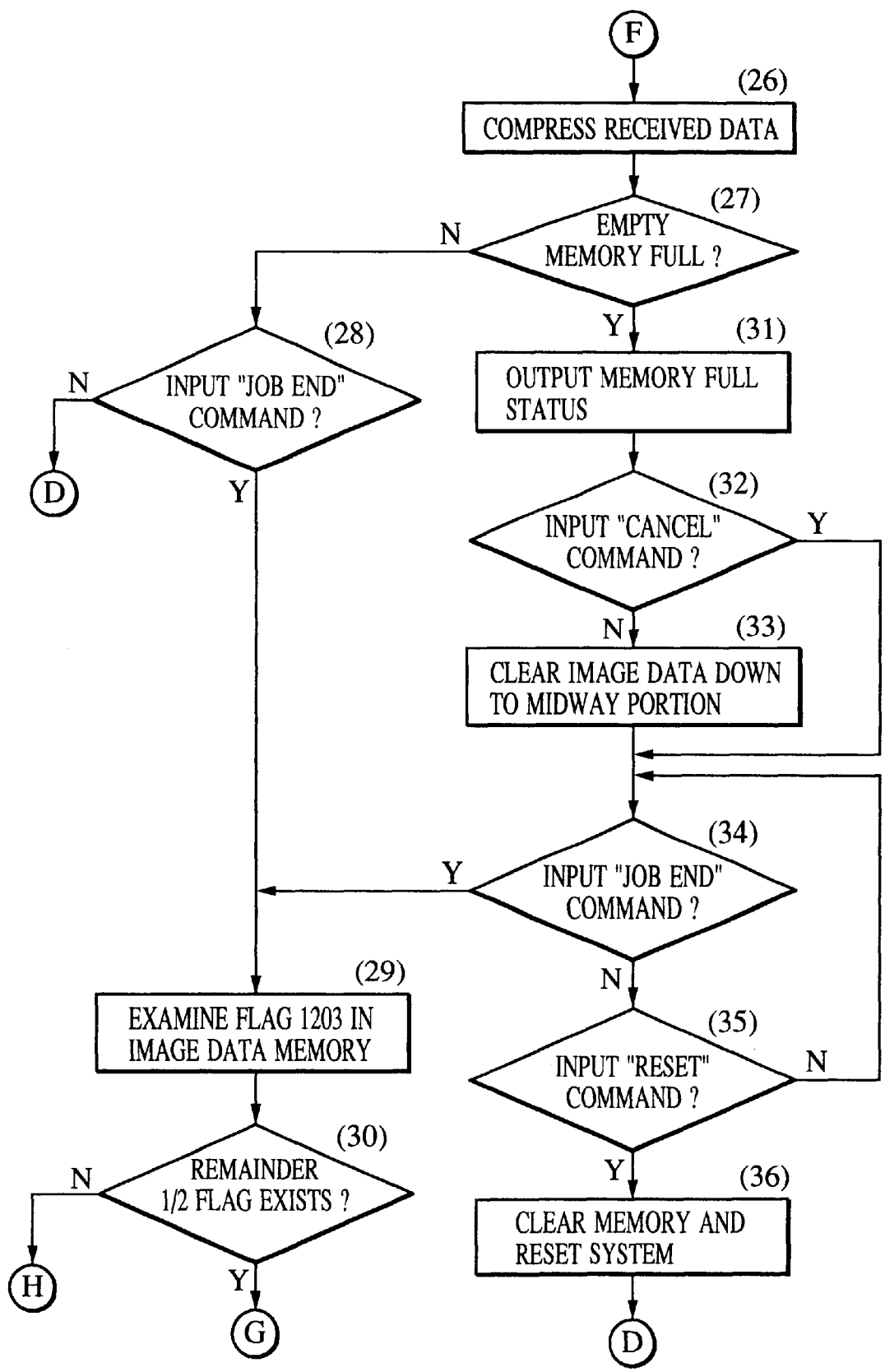
FIG. 24 is a flow chart illustrative of an image processing method in a printing system in accordance with the present invention.
Figure 25:
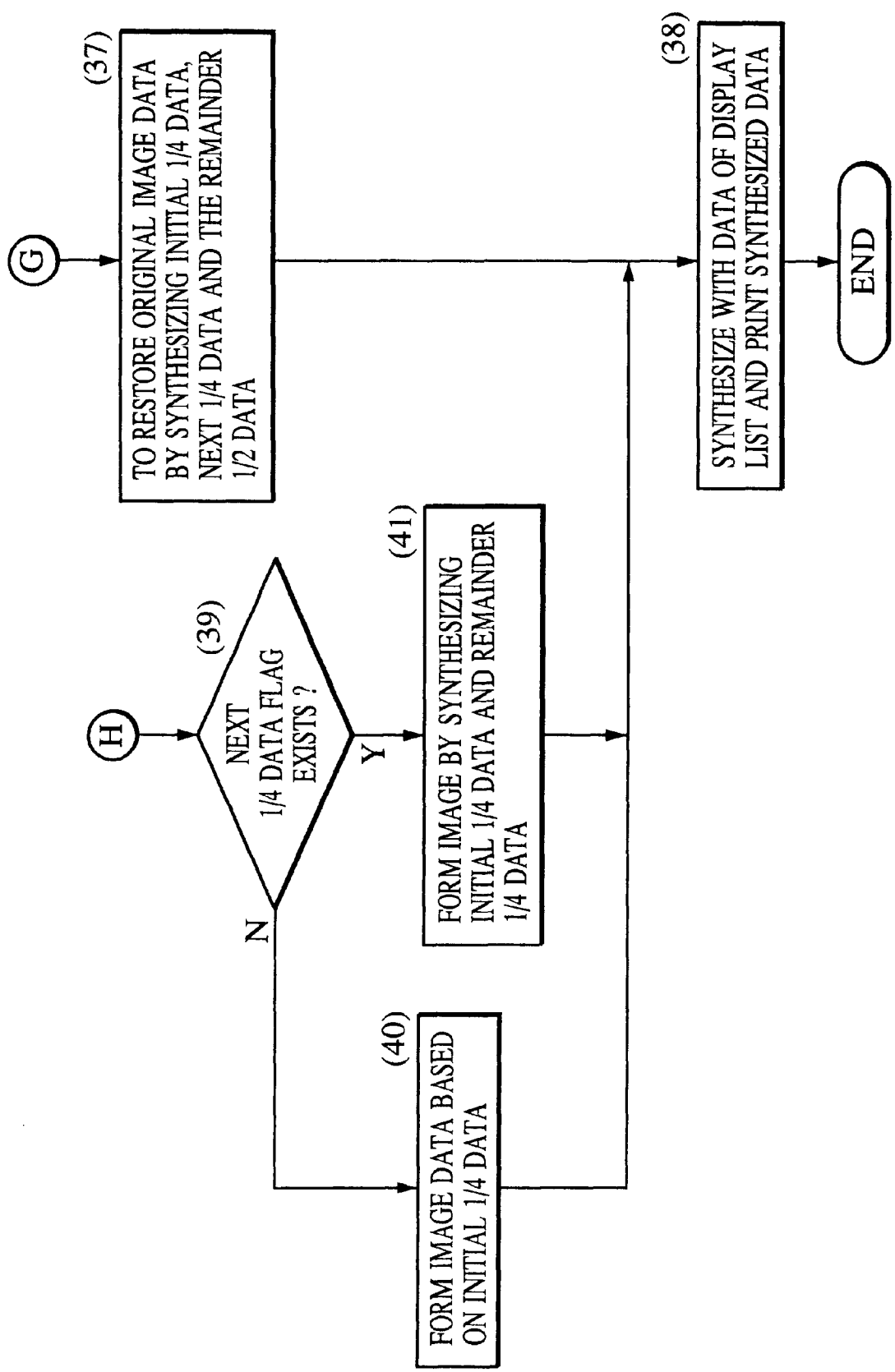
FIG. 25 is a flow chart illustrative of an image processing method in a printing system in accordance with the present invention.

The thirty-third aspect of the present invention pertains to a data processing method for use in printing apparatus communicable with an information processing apparatus through a predetermined communication medium, the method comprising: a compressing step (Step (26) of the flow shown in FIG. 24) for compressing, in accordance with a predetermined compression protocol, image data received from the information processing apparatus; a second storing step (Step (26) of the flow shown in FIG. 24) for storing the compressed image data formed in the compressing step in a second storage means; a second informing step (Steps (27) and (31) of the flow shown in FIG. 24) for informing the information processing apparatus of the status of use of the second storage means; an expanding step (Steps (37), (40), (41) of the flow shown in FIG. 25) for expanding, in accordance with a predetermined expansion protocol, the compressed image data stored in the second storage means; and a printing step (Step (38) of the flow shown in FIG. 25) for printing the image data which has been expanded by the expansion means. It is therefore possible to perform the printing of whole image at high degree of quality as possible, even when the size of the image data transferred in a stepped manner from the host computer 1500 to the printer 2500 exceeds the size of the image storage area allocated in the RAM 13 of the printer 2500, by virtue of the feature that the image data which has already been transferred to the printer 2500 is stored after compression.

In accordance with the thirty-fourth aspect of the present invention, the data processing method further comprises an interpolating step (Steps (37), (40), (41) of the flow shown in FIG. 25) for judging the state of development of the compressed image in the second storage means and for conducting a predetermined interpolation processing on the image data expanded by the expansion means, thereby restoring the image data. It is therefore possible to perform the printing of whole image at high degree of quality as possible, even when the size of the image data transferred in a stepped manner from the host computer 1500 to the printer 2500 exceeds the size of the image storage area allocated in the RAM 13 of the printer 2500, by virtue of the feature that the printing is performed by restoring the original image data in accordance with the size of the image data which has already been transferred to the printer 2500.

In accordance with the thirty-seventh aspect of the present invention, the computer-readable program further comprises: first storing step (Step (3) of the flow shown in FIG. 22) for dividing printing information received from the information processing apparatus into a plurality of bands of data and for storing the bands of data in first storage means; and first informing step (Steps (4) and (7) of the flow shown in FIG. 22) for informing the information processing apparatus of the status of use of the first storage means. Thus, program codes corresponding to the processes shown in FIGS. 22 to 25 are stored in a later-mentioned storage medium or in the internal memory resource, and the CPU 12 reads and executes the stored program codes. This way of implementation also falls within the scope of the present invention.

According to the thirty-eighth aspect of the present invention, there is provided a storage medium storing a computer-readable program, wherein the program comprises: a compressing step (Step (26) of the flow shown in FIG. 24) for compressing, in accordance with a predetermined compression protocol, image data received from the information processing apparatus; a second storing step (Steps (26) of the flow shown in FIG. 24) for storing the compressed image data formed in the compressing step in a second storage means; a second informing step (Steps (27) and (31) of the flow shown in FIG. 24) for informing the information processing apparatus of the status of use of the second storage means; an expanding step (Steps (37), (40) and (41) of the flow shown in FIG. 25) for expanding, in accordance with a predetermined expansion protocol, the compressed image data stored in the second storage means; and a printing step (Step (38) of the flow shown in FIG. 25) for printing the image data which has been expanded by the expansion means. Thus, program codes corresponding to the processes shown in FIGS. 22 to 25 are stored in a later-mentioned storage medium or in the internal memory resource, and the CPU 12 reads and executes the stored program codes. This way of implementation also falls within the scope of the present invention.

In accordance with the thirty-ninth aspect of the present invention, the computer-readable program further comprises an interpolating step (Steps (37), (40) and (41) of the flow shown in FIG. 25) for judging the state of development of the compressed image in the second storage means and for conducting a predetermined interpolation processing on the image data expanded by the expansion means, thereby restoring the image data. Thus, program codes corresponding to the processes shown in FIGS. 22 to 25 are stored in a later-mentioned storage medium or in the internal memory resource, and the CPU 12 reads and executes the stored program codes. This way of implementation also falls within the scope of the present invention.

According to these aspects of the invention, in the event that processing of printing information transferred from the host computer 1500 is expected to fail due to restriction in the printing information storage area allocated in the RAM 13 of the printer 2000, the host computer 1500, upon receipt of information of the possibility of such a failure, develops the printing information into image data and delivers the developed image data to the printer 2500. It is therefore possible to print as much as possible the printing information which otherwise will fail to be processed due to restriction in the memory resource allocation. In addition, it is possible to perform the printing of whole image at high degree of quality as possible, even when the size of the image data transferred in a stepped manner from the host computer 1500 to the printer 2500 exceeds the size of the image storage area allocated in the RAM 13 of the printer 2500, by virtue of the feature that the printing is performed by restoring the original image data in accordance with the size of the image data which has already been transferred to the printer 2500.

In the described embodiment, a pair of banding buffer memories 903, 904 are used in combination so as to serve as a double buffer which sends data to the printing section 17 to execute the printing. Therefore, in case where the data is text/graphics information, the information is read from the corresponding band listed in the aforementioned display list, and is converted into dot image and developed in the banding buffer memory 903 or 904. In the case where the 149 printing information is an image data, the position of the image data is computed based on the X and Y coordinates information 1204 (see FIGS. 18 and 15) of the image data, and the portions of the image data in the bands which contain the image data are restored in the manner described beforehand developed in the banding buffer memory 903 or 904, so as to be consolidated with the text/graphics data.

The restoration of the image data is conducted by using a work memory 905. The document data synthesized on the banding buffer memories 903, 904 in the form of dot data is sent to and printed by the printing section 17.

The use of the banding technique described hereinabove realizes a high throughput. When the document data is complicated, the printing information is beforehand developed into dot image by the host computer before sent to the printer, or the printing information in the form of image data is sent to the printer in a stepped manner in accordance with the size of the image data. The image data thus transferred is stored after compression. When the memory has become full in the midway of the data transfer, the original data is restored based on the image data which already has been received, in accordance with the size of the image data which has already been received.

Seventh Embodiment

In the sixth embodiment, preservation and forwarding of the image data are conducted by reversibly compressing the image data by mans of the compression/expansion device 19. Such reversible compression permits restoration of the original data by expansion. This, however, is only illustrative and the compression may be conducted irreversibly so as to forcibly reduce the image data size into ¼. Such irreversible compression provides thinned data when the compressed data is expanded into original size. When such irreversible compression is employed, the transfer of the image data from the host computer can be completed by a single cycle of transfer operation, although the quality of the image data is necessarily impaired.

Eighth Embodiment

In the sixth embodiment, the interpolation of image is performed in the manner described in connection with FIGS. 19A and 19B. This interpolation method, however, is only illustrative and the image interpolation may be conducted by a dot-interpolation technique based on the relationships between the image dots and surrounding dots. Thus, the interpolation may be conducted by using various known techniques which are not described.

A description will now be given of the structure of the computer-readable data processing program for use in the printing system of the present invention, with specific reference to a memory map shown in FIG. 27.

FIG. 27 shows a memory map formed in a storage medium which stores the computer-readable data processing program for use in the printing system of the present invention.

Although not specifically shown in this Figure, the storage medium may store also information for administrating programs in the medium, such as the version information, writer information, and so forth, as well as information which depends on the OS of the program reader, e.g., a computer, such as icons for identifying and displaying programs.

Data subordinate to the programs also are administrated by the directory. The storage medium also may store programs for installing various programs on the computer, decompressing program for decompressing any compressed program to be installed, and so forth.

The functions shown in FIGS. 20, 21 and FIGS. 22 to 25 used in the described embodiments may be executed by the described system in accordance with programs which are installed externally. The present invention is applicable also to a case where a group of information including programs are supplied to the output apparatus from a storage medium such as a CD-ROM, flash memory, FD or the like, or from an external storage medium through a network.

The storage medium storing the software program codes implementing the functions of the described embodiments is supplied to the system, so that the computer (or CPU or MPU) of the system or apparatus reads and executes these program codes, whereby the objects of the present invention are achieved.

In such a case, the program codes read from the storage medium implement the novel functions of the present invention,so that the storage medium storing such program codes constitutes one form of the present invention.

The storage medium for supplying the program codes may be, for example, a floppy disk, a hard disk, an optical disk, a magneto-optical disk, a CD-ROM, CD-R, magnetic tape, non-volatile memory card, ROM, EEPROM, or the like.

The storage medium in accordance with the invention enables the computer to read and execute the program codes stored therein, so as to implement the functions of the described embodiments. The storage medium, however, also may be such that an OS (operating system) working on the computer conducts part or whole of the processings, in accordance with the instructions given by the program codes stored in the medium, thereby implementing the functions of the described embodiments.

Obviously, the arrangement may be such that the program codes read from the storage medium are written in a function expansion board loaded on the computer or a memory in a function expansion unit connected to the computer, so that a CPU of the function expansion board or unit conducts part or whole of the processings, in accordance with the instructions given by the written program codes, thereby implementing the functions of the described embodiments.

The invention may be applied to a system composed of a plurality of devices or apparatuses, or to a stand-alone apparatus. It will be clear that the invention can also be accomplished by supplying such a system or apparatus with the programs described hereinbefore. In such a case, the storage medium storing the software programs for accomplishing the invention is loaded in and read by the system or the apparatus, so that the system or the apparatus can enjoy the advantages of the present invention.

Furthermore, the invention may be carried out such that a program represented by a software for accomplishing the present invention is down-loaded from a data base on the network by the operation of a communication program, so that a system or apparatus on which the program has been down-loaded can enjoy the advantages of the present invention.

Although the invention has been described through illustration of specific embodiments and forms, it will be understood that such embodiments and forms are only illustrative and various changes and modifications may be imparted thereto without departing from the scope of the invention which is limited solely by the appended claims.

What is claimed is:

1. An information processing apparatus for transmitting first information to a printing apparatus, the printing apparatus comprising a first converter, arranged to convert first information into second information in units of a predetermined band and storing it in a second information storage area, and a second converter, arranged to convert the second information into image data in units of the predetermined band, said information processing apparatus comprising:
    a first transmitter, arranged to transmit a part of one page of the first information to be transmitted to the printing apparatus;
    a judgment unit, arranged to judge whether the printing apparatus can execute a converting process on the remainder of the one page of the first information itself or not, after the first information is transmitted by said first transmitter;
    a determination unit, arranged to determine how the remainder of the one page of the first information is transmitted to said printing apparatus, on the basis of the result of said judgment unit; and
    a controller, arranged to control a first transmitter to transmit the remainder of the one page of the first information itself in a first mode, or to transmit the remainder of the one page of the first information, executed image processing, in a second mode in response to the determination of said determination unit.

2. An image processing apparatus according to claim 1, wherein said first information includes scribing commands and said second information includes intermediate codes.

3. An image processing apparatus according to claim 1, wherein said information processing apparatus is a computer which is connected to said printing apparatus.

4. An image processing apparatus according to claim 1, further comprising:
    a receiver, arranged to receive information relating to a condition of the second information storage area after the first information transmitted by said first transmitter is converted into the second information by the first converter of the printing apparatus; and
    a data compressor, arranged to compress the image data converted by said second converter based on the information received by said receiver.

5. An information processing method for transmitting first information to a printing apparatus, the printing apparatus comprising a first converter, arranged to convert first information into second information in units of a predetermined band and storing it in a second information storage area, and a second converter, arranged to convert the second information into image data in units of the predetermined band, said information processing method comprising the steps of:
    a first transmission step of transmitting a part of one page of the first information to be transmitted to the printing apparatus;
    a judgment step of judging whether the printing apparatus can execute a converting processing on the remainder of the one page of the first information itself or not, after the first information is transmitted by said first transmitter;
    a determination step of determining how the remainder of the one page of the first information is transmitted to said printing apparatus, on the basis of the result of said judgment step; and
    a control step of controlling a first transmitter to transmit the remainder of the one page of the first information itself in a first mode, or to transmit the remainder of the one page of the first information, executed image processing, in a second mode in response to the determination of said determination unit.

6. An image processing method according to claim 5, wherein said first information includes scribing commands and said second information includes intermediate codes.

7. An image processing method according to claim 5, wherein said information processing method is performed on a computer which is connected to a printer.

8. An image processing method according to claim 5, further comprising:
    a receiving step of receiving information relating to a condition of the second information storage area after the first information transmitted in said first transmission step is converted into the second information by the first conversion step of the printing apparatus; and
    a data compression step, of compressing the image data converted in said second conversion step based on the information received in said receiving step.

9. A memory medium storing executable code for executing an information processing method for transmitting first information to a printing apparatus, the printing apparatus comprising a first converter, arranged to convert first information into second information in units of a predetermined band and storing it in a second information storage area, and a second converter, arranged to convert the second information into image data in units of the predetermined band, said information processing method comprising the steps of:
    a first transmission step of transmitting a part of one page of the first information to be transmitted to the printing apparatus;
    a judgment step of judging whether the printing apparatus can execute a converting processing on the remainder of the one page of the first information itself or not, after the first information is transmitted by said first transmitter;

a determination step of determining how the remainder of the one page of the first information is transmitted to said printing apparatus, on the basis of the result of said judgment step; and a control step of controlling a first transmitter to transmit the remainder of the one page of the first information itself in a first mode, or to transmit the remainder of the one page of the first information, executed image processing, in a second mode in response to the determination of said determination unit.

10. A memory medium according to claim 9, wherein said first information includes scribing commands and said second information includes intermediate codes.

11. A memory medium according to claim 9, wherein said information processing method is performed on a computer which is connected to a printer.

12. A memory medium according to claim 9, further comprising:

a receiving step of receiving information relating to a condition of the second information storage area after the first information transmitted in said first transmission step is converted into the second information by the first conversion step of the printing apparatus; and a data compression step, of compressing the image data converted in said second conversion step based on the information received in said receiving step.

* * * * *

UNITED STATES PATENT AND TRADEMARK OFFICE
CERTIFICATE OF CORRECTION

PATENT NO. : 6,538,764 B2
DATED : March 25, 2003
INVENTOR(S) : Shigeru Ueda

It is certified that error appears in the above-identified patent and that said Letters Patent is hereby corrected as shown below:

Drawings,
Sheet 15, Figure 15, "FLAGE" (both occurrences) should read -- FLAG --.

Column 2,
Line 30, "of" should read -- in --; and
Line 32, "with" should read -- with the --.

Column 4,
Line 61, "a on" should read -- on a --.

Column 12,
Line 9, "for" should be deleted;
Line 33, "apparatus,in" should read -- apparatus, in --;
Line 38, "data without fail" should read -- data, without fail, --; and
Line 52, "formed,in" should read -- formed in --.

Column 13,
Line 21, "to" should read -- to the --.

Column 17,
Line 53, "a to be" should read -- as to be --.

Column 22,
Line 39, "for designates" should read -- for designating --; and
Line 57, ":document" should read -- "document --.

Column 23,
Line 2 "505" should read -- 505. --;
Line 20, "information,and" should read -- information, and --; and
Line 26, "221, 22" should read -- 221, 222 --.

Column 25,
Line 27, "bane" should read -- band --.

Column 30,
Line 18, "a on" should read -- on a --.

UNITED STATES PATENT AND TRADEMARK OFFICE
CERTIFICATE OF CORRECTION

PATENT NO. : 6,538,764 B2
DATED : March 25, 2003
INVENTOR(S) : Shigeru Ueda

It is certified that error appears in the above-identified patent and that said Letters Patent is hereby corrected as shown below:

Column 32,
Line 18, "have been" should read -- were --; and
Line 62, "is the" should read -- if the --.

Column 34,
Line 49, "image" should read -- image data --.

Column 38,
Line 49, "Thus,according" should read -- Thus, according --.

Column 40,
Line 65, "FIGS. 5, 9, 7 and 8" should read -- FIGS. 5, 7, 8, and 9 --.

Column 43,
Line 5, "shown,for" should read -- shown, for --; and
Line 55, "later," should read -- later. --.

Column 46,
Line 11, "f;ag" should read -- flag --; and
Line 43, "ell" should read -- well --.

Column 49,
Line 6, "protocol,and" should read -- protocol, and --; and
Line 10, "device." should read -- device --.

Column 50,
Line 39, "so a" should read -- so as --.

Column 51,
Line 34, "imAge" should read -- image --.

Column 52,
Line 36, "hist" should read -- host --;
Line 44, "whole the" should read -- the whole --;
Line 53, "of" should read -- if --; and
Line 59, "process process" should read -- process proceeds --.

UNITED STATES PATENT AND TRADEMARK OFFICE
CERTIFICATE OF CORRECTION

PATENT NO. : 6,538,764 B2
DATED : March 25, 2003
INVENTOR(S) : Shigeru Ueda

It is certified that error appears in the above-identified patent and that said Letters Patent is hereby corrected as shown below:

Column 53,
Line 27, "step" should read -- Step --; and
Line 34, "And," should read -- and, --.

Column 56,
Line 12, "(10)has" should read -- (10) has --.

Column 57,
Line 8, "(24)which" should read -- (24) which --.

Column 58,
Line 47, "(41)forms" should read -- (41) forms --.

Column 61,
Line 62, "mans" should read -- means --.

Column 62,
Line 53, "invention,so" should read -- invention, so --.

Signed and Sealed this

Twenty-seventh Day of January, 2004

JON W. DUDAS
*Acting Director of the United States Patent and Trademark Office*